(12) United States Patent
Ikonin et al.

(10) Patent No.: US 12,506,891 B2
(45) Date of Patent: Dec. 23, 2025

(54) DECODING WITH SIGNALING OF SEGMENTATION INFORMATION

(71) Applicant: HUAWEI TECHNOLOGIES CO., LTD., Shenzhen (CN)

(72) Inventors: Sergey Yurievich Ikonin, Moscow (RU); Mikhail Vyacheslavovich Sosulnikov, Munich (DE); Alexander Alexandrovich Karabutov, Munich (DE); Timofey Mikhailovich Solovyev, Munich (DE); Biao Wang, Shenzhen (CN); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/339,783

(22) Filed: Jun. 22, 2023

(65) Prior Publication Data
US 2023/0336759 A1 Oct. 19, 2023

Related U.S. Application Data

(63) Continuation of application No. PCT/RU2020/000750, filed on Dec. 24, 2020.

(51) Int. Cl.
*H04N 19/46* (2014.01)
*G06N 3/045* (2023.01)
(Continued)

(52) U.S. Cl.
CPC ............ *H04N 19/46* (2014.11); *G06N 3/045* (2023.01); *G06N 3/0455* (2023.01); *G06N 3/088* (2013.01);
(Continued)

(58) Field of Classification Search
CPC .... H04N 19/46; H04N 19/132; H04N 19/117; H04N 19/119; H04N 19/82; H04N 19/33;
(Continued)

(56) References Cited

U.S. PATENT DOCUMENTS

2017/0124409 A1\* 5/2017 Choi .................. G06V 10/25
2017/0316312 A1\* 11/2017 Goyal ................ G06F 17/16
(Continued)

FOREIGN PATENT DOCUMENTS

CN 108986124 A 12/2018
CN 111801945 A 10/2020
(Continued)

OTHER PUBLICATIONS

Shannon, "A Mathematical Theory of Communication," Reprinted with corrections from The Bell System Technical Journal, vol. 27, Total 55 pages (Jul., Oct. 1948).
(Continued)

*Primary Examiner* — Mohammed Jebari
(74) *Attorney, Agent, or Firm* — Leydig, Voit & Mayer, Ltd.

(57) ABSTRACT

The present disclosure relates to methods and apparatuses for decoding data for (still or video processing into a bitstream). Two or more sets of segmentation information elements are obtained from the bitstream. Then, each of the two or more sets of segmentation information elements are inputted respectively into two or more segmentation information processing layers out of a plurality of cascaded layers. In each of the two or more segmentation information processing layers, the respective sets of segmentation information are processed. The decoded data for picture or video processing are obtained based on the segmentation information processed by the plurality of cascaded layers. Accord-
(Continued)

ingly, the data may be decoded from the bitstream in an efficient manner in the layered structure.

13 Claims, 40 Drawing Sheets

(51) Int. Cl.
| | |
|---|---|
| G06N 3/0455 | (2023.01) |
| G06N 3/047 | (2023.01) |
| G06N 3/048 | (2023.01) |
| G06N 3/088 | (2023.01) |
| G06T 9/00 | (2006.01) |
| H04N 19/105 | (2014.01) |
| H04N 19/107 | (2014.01) |
| H04N 19/117 | (2014.01) |
| H04N 19/119 | (2014.01) |
| H04N 19/124 | (2014.01) |
| H04N 19/132 | (2014.01) |
| H04N 19/33 | (2014.01) |
| H04N 19/70 | (2014.01) |
| H04N 19/82 | (2014.01) |

(52) U.S. Cl.
CPC ........... *G06T 9/002* (2013.01); *H04N 19/105* (2014.11); *H04N 19/107* (2014.11); *H04N 19/117* (2014.11); *H04N 19/119* (2014.11); *H04N 19/124* (2014.11); *H04N 19/132* (2014.11); *H04N 19/33* (2014.11); *H04N 19/82* (2014.11); *G06N 3/047* (2023.01); *G06N 3/048* (2023.01); *H04N 19/70* (2014.11)

(58) Field of Classification Search
CPC .. H04N 19/105; H04N 19/107; H04N 19/124; H04N 19/70; G06N 3/045; G06N 3/047; G06N 3/048; G06N 3/088; G06N 3/0455; G06T 9/002
See application file for complete search history.

(56) References Cited

U.S. PATENT DOCUMENTS

| | | | |
|---|---|---|---|
| 2018/0350110 A1* | 12/2018 | Cho | G06F 7/08 |
| 2019/0042923 A1* | 2/2019 | Janedula | G06N 3/044 |
| 2019/0251360 A1 | 8/2019 | Cricri et al. | |
| 2019/0373293 A1* | 12/2019 | Bortman | H04N 19/176 |
| 2020/0143457 A1* | 5/2020 | Manmatha | G06F 3/04812 |
| 2020/0242774 A1 | 7/2020 | Park et al. | |
| 2021/0279519 A1* | 9/2021 | Krim | G06V 10/764 |
| 2021/0366123 A1* | 11/2021 | Wang | G06T 7/149 |

FOREIGN PATENT DOCUMENTS

| | | |
|---|---|---|
| JP | 2020191630 A | 11/2020 |
| WO | 2005043882 A2 | 5/2005 |

OTHER PUBLICATIONS

Balle et al., "End-to-end Optimized Image Compression," Published as a conference paper ICLR 2017, Total 27 pages (Mar. 2017).
Kingma et al., "Auto-Encoding Variational Bayes," arXiv e-prints, arXiv:1312.6114, Total 14 pages (Dec. 2022).
Rezende et al., "Stochastic Backpropagation and Approximate Inference in Deep Generative Models," Proceedings of the 31st International Conference on Machine Learning, arXiv e-prints, Total 9 pages (Jan. 2014).
Wiegand et al., "Overview of the H.264/AVC video coding standard," IEEE Transactions on Circuits and Systems for Video Technology, vol. 13, No. 7, Total 17 pages, Institute of Electrical and Electronics Engineers, New York, New York (Jul. 2003).
Sullivan et al., "Overview of the high efficiency video coding (HEVC) standard," TCSVT, IEEE Transactions on Circuits and Systems for Video Technology, vol. 22, No. 12, Total 20 pages (Dec. 2012).
Bross et al., "Versatile Video Coding (Draft 7)," Joint Video Experts Team (JVET) of ITU-T SG 16 WP 3 and ISO/IEC JTC 1/SC 29/WG 11, JVET-P2001vE, Total 494 pages (Oct. 1-11, 2019).
Choi et al., "Near-Lossless Deep Feature Compression for Collaborative Intelligence," 2018 IEEE 20th International Workshop on Multimedia Signal Processing (MMSP), Vancouver, BC, Total 6 pages (Jun. 2018).
Kang et al., "Neurosurgeon: Collaborative intelligence between the cloud and mobile edge," Proc. 22nd ACM Int. Conf. Arch. Support Programming Languages and Operating Syst., Total 15 pages (Apr. 2017).
Eshratifar et al., "JointDNN: An efficient training and inference engine for intelligent mobile cloud computing services," arXiv preprint, arXiv:1801.08618, Submitted 2018, Total 12 pages (Last Revised Feb. 2020).
Choi et al., "Deep feature compression for collaborative object detection," arXiv:1802.03931v1 [cs.CV], Total 5 pages (Feb. 2018).
Redmon et al., "YOLO9000: Better, Faster, Stronger," arXiv:1612.08242v1 [cs.CV], Total 9 pages (Dec. 2016).
Bossen et al., "HEVC Complexity and Implementation Analysis," IEEE Transactions on Circuits Systems for Video Technology, vol. 22, No. 12, Total 12 pages (Dec. 2012).
Luo et al., "DeepSIC: Deep semantic image compression," arXiv preprint, arXiv:1801.09468, Total 8 pages (Jan. 2018).
Marpe et al., "Context-based adaptive binary arithmetic coding in the H.264/AVC video compression standard," IEEE Transactions on Circuits Systems for Video Technology, vol. 13, No. 7, Total 17 pages (Jul. 2003).
"Cisco Visual Networking Index: Forecast and Methodology," White paper, CISCO, San Jose, CA, USA, Total 17 pages (Jun. 6, 2017).
Wu et al., "Compressed video action recognition," Computer Vision and Pattern Recognition, CVPR, Total 14 pages (Mar. 2018).
Han et al., "Deep compression: Compressing deep neural networks with pruning, trained quantization and huffman coding," arXiv preprint, arXiv:1510.00149v5, Submitted 2015, Total 14 pages (Last Revised Feb. 2016).
Toderici et al., "Variable rate image compression with recurrent neural networks," arXiv preprint, arXiv:1511.06085v5, Total 12 pages (Mar. 2016).
Toderici et al., "Full resolution image compression with recurrent neural networks," CVPR, Total 9 pages (Jul. 2017).
Agustsson et al., "Soft-to-hard vector quantization for end-to-end learning compressible representations," NIPS, Total 16 pages (Jun. 2017).
Balle et al., "Variational image compression with a scale hyperprior," Published as a conference paper at ICLR 2015, arXiv preprint, arXiv: 1802.01436v2, Total 23 pages (May 2018).
Johnston et al., "Improved lossy image compression with priming and spatially adaptive bit rates for recurrent networks," Computer Vision and Pattern Recognition, CVPR, Jun. 2018, Total 9 pages (May 2017).
Theis et al., "Lossy image compression with compressive autoencoders," arXiv preprint, arXiv:1703.00395v1, Total 19 pages (Mar. 2017).
Li et al., "Learning convolutional networks for content-weighted image compression," Computer Vision and Pattern Recognition, CVPR, arXiv: 1703.10553v2 [cs.CV], Total 11 pages (Sep. 2017).
Rippel et al., "Real-time adaptive image compression," ICML, arXiv:1705.05823v1 [stat.ML], Total 16 pages (May 2017).
Agustsson et al., "Generative adversarial networks for extreme learned image compression," arXiv preprint, arXiv:1804.02958, Total 26 pages (Aug. 2019).
Wallace et al., "The JPEG still picture compression standard," IEEE Transactions on Consumer Electronics, vol. 38, Issue 1, Total 17 pages (Feb. 1992).

(56) References Cited

OTHER PUBLICATIONS

Skodras et al., "The JPEG 2000 still image compression standard," IEEE Signal Processing Magazine, vol. 18, Issue 5, Total 23 pages (Sep. 2001).
Bellarde et al., "BPG Image format," http://bellard.org/bpg/, Accessed: Oct. 30, 2018, Total 2 pages (Apr. 2018).
Xue et al., "Video enhancement with task-oriented flow," arXiv preprint, arXiv:1711.09078v2, Total 19 pages (Mar. 2019).
Bross et al., "Versatile Video Coding (Draft 10)," Joint Video Experts Team (JVET) of ITU-T SG 16 WP 3 and ISO/IEC JTC 1/SC 29/WG 11, JVET-S2001-v, Total 548 pages (Jun. 22-Jul. 1, 2020).
PyTorch Master Documentation, "Torch.Masked_Select," URL:https://pytorch.org/docs/master/generated/torch.masked_select.html, Total 1 pages (2023).
PyTorch Master Documentation, "Torch.Tensor," URL:https://pytorch.org/docs/master/tensors.html, Total 23 pages (2023).
PyTorch 2.4 Documentation, "torch.gather," URL:https://pytorch.org/docs/stable/generated/torch.gather.html, Total 2 pages (2023).
Garg et al., "Unsupervised CNN for Single View Depth Estimation: Geometry to the Rescue," arXiv: 1603.04992v2 [cs.CV] Total 16 pages (Jul. 29, 2016).
Wu et al., "End-to-end Optimized Video Compression with MV-Residual Prediction," mage and Video Processing, arXiv:2005.12945v1 [eess.IV], Total 4 pages (May 2020).
Wintz, "Transform Picture Coding," Proceedings of the IEEE vol. 60, No. 7, Total 18 pages (Jul. 1972).
"Autoencoder," WIKIPEDIA, The Free Encyclopedia, URL:https://en.wikipedia.org/wiki/Autoencoder, Total 15 pages, Sep. 2006 (Last edited on Sep. 19, 2024).
WIKIPEDIA The Free Encyclopedia, "Residual neural network", URL: https://en.wikipedia.org/wiki/Convolutional_neural_network, total 7 pages, Nov. 2017 (Last edited Sep. 22, 2024).
Netravali et al., "Picture Coding: A Review," Proceedings of the IEEE vol. 68, No. 3, Total 48 pages (Mar. 1980).
Choi et al., "Text of ISO/IEC CD 23094-1, Essential Video Coding," ISO/IEC CD 23094-1, JTC1/SC29/WG11 N18568, Gothenburg, Sweden, Total 292 pages (Jul. 2019).
Gersho et al., "Vector Quantization and Signal Compression," Springer Link, Kluwer Academic Publishers, Total 3 pages (Nov. 1991).
Akbari et al., "DSSLIC: Deep Semantic Segmentation-based Layered Image Compression," Cornell University Library, 201 Online Library, Cornell University, Ithaca, NY, arXiv:1806.03348v3 [cs.CV], Total 12 pages (Apr. 18, 2019).
Lu et al., "DVC: An End-to-end Deep Video Compression Framework," arXiv:1812.00101v3, total 14 pages (Apr. 7, 2019).
Balléet al., "Density Modeling of Images using a Generalized Normalization Transformation," Published as a conference paper at ICLR 2016, arXiv:1511.06281v4, total 14 pages (Feb. 29, 2016).
Alshina et al., JPEG AI CfP response by Huawei: "Device agnostic learnable image coding using primary component extraction and conditional coding," ISO/IEC JTC 1/SC29/WG1 M96016 (ITU-T SG16), 96th JPEG Meeting, Online, Coding of Still Pictures, Total 23 pages (Jul. 25-29, 2022).

\* cited by examiner

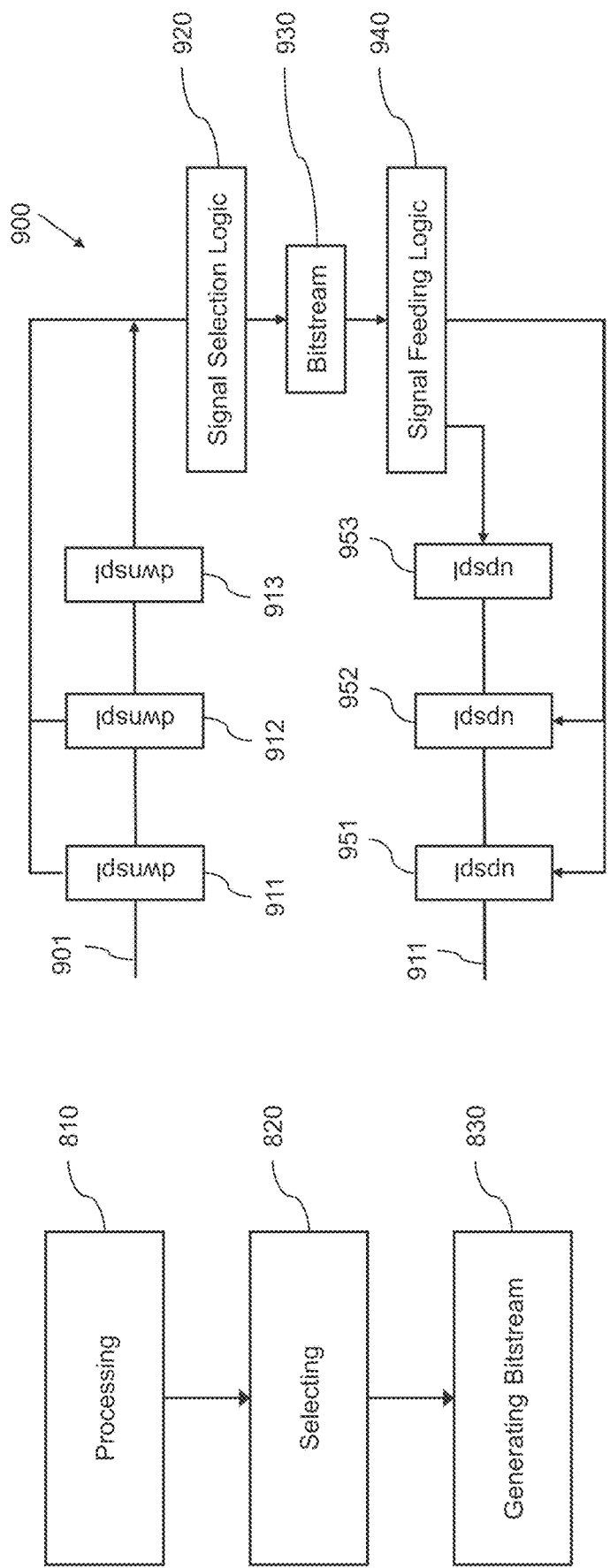

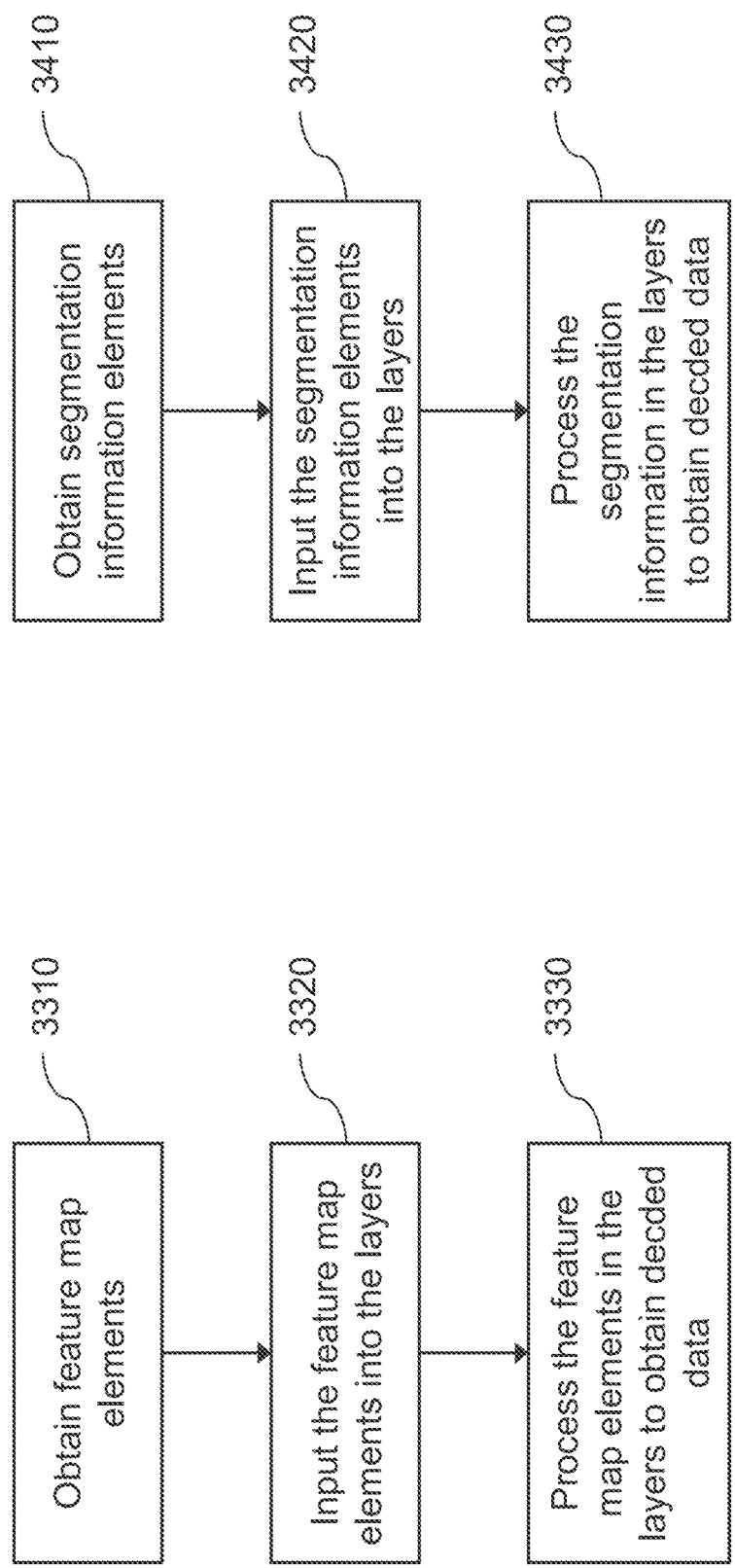

DECODING WITH SIGNALING OF SEGMENTATION INFORMATION

CROSS-REFERENCE TO RELATED APPLICATIONS

This application is a continuation of International Application No. PCT/RU2020/000750, filed on Dec. 24, 2020, the disclosure of which is hereby incorporated by reference in its entirety.

TECHNICAL FIELD

Embodiments of the present disclosure generally relate to the field of decoding data for image or video processing from a bitstream using a plurality of processing layers. In particular some embodiments relate to methods and apparatuses for such decoding.

BACKGROUND

Hybrid image and video codecs have been used for decades to compress image and video data. In such codecs, signal is typically encoded block-wisely by predicting a block and by further coding only the difference between the original bock and its prediction. In particular, such coding may include transformation, quantization and generating the bitstream, usually including some entropy coding. Typically, the three components of hybrid coding methods—transformation, quantization, and entropy coding—are separately optimized. Modern video compression standards like High-Efficiency Video Coding (HEVC), Versatile Video Coding (VVC) and Essential Video Coding (EVC) also use transformed representation to code residual signal after prediction.

Recently, machine learning has been applied to image and video coding. In general, machine learning can be applied in various different ways to the image and video coding. For example, some end-to-end optimized image or video coding schemes have been discussed. Moreover, machine learning has been used to determine or optimize some parts of the end-to-end coding such as selection or compression of prediction parameters or the like. These applications have in common that they produce some feature map data, which is to be conveyed between encoder and decoder. An efficient structure of the bitstream may greatly contribute to reduction of the number of bits that encode the image/video source signal.

A neural network usually comprises two or more layers. A feature map is an output of a layer. In a neural network that is split between devices, e.g. between encoder and decoder, a device and a cloud or between different devices, a feature map at the output of the place of splitting (e.g. a first device) is compressed and transmitted to the remaining layers of the neural network (e.g. to a second device).

Further improvement of encoding and decoding using trained network architectures may be desirable.

SUMMARY

Some embodiments of the present disclosure provide methods and apparatuses for decoding of a picture in an efficient manner and enabling some scalability to adapt to the desired parameters and to the content.

The foregoing and other objects are achieved by the subject matter of the independent claims. Further implementation forms are apparent from the dependent claims, the description, and the figures.

According to an aspect, a method is provided for decoding data for picture or video processing from a bitstream, the method comprising: obtaining, from the bitstream, two or more sets of segmentation information elements; inputting each of the two or more sets of segmentation information elements respectively into two or more segmentation information processing layers out of a plurality of cascaded layers; in each of the two or more segmentation information processing layers, processing the respective sets of segmentation information; wherein obtaining said decoded data for picture or video processing is based on the segmentation information processed by the plurality of cascaded layers.

Such method may provide an improved efficiency, as it enables decoding of the data in various segments configurable on a layer basis in a layered structure. Provision of segments may take into account the characteristics of the decoded data.

For example, the obtaining of the sets of segmentation information elements is based on segmentation information processed by at least one segmentation information processing layer out of the plurality of cascaded layers.

In some exemplary embodiments, the inputting of the sets of segmentation information elements is based on the processed segmentation information outputted by at least one of the plurality of cascaded layers.

Cascaded segmentation information processing enables efficient parsing of the segmentation information.

For example, the segmentation information processed respectively in the two or more segmentation information processing layers differ in resolution.

In some embodiments and examples, the processing of the segmentation information in the two or more segmentation information processing layers includes upsampling.

Hierarchic structure of segmentation information may provide small amount of side information to be inserted into the bitstream, thus increasing efficiency and/or processing time.

In particular, said upsampling of the segmentation information comprises a nearest neighbor upsampling. Nearest neighbor upsampling has a low computational complexity and may be implemented easily. Still, it is efficient, especially for logic indications such as flags. For example, said upsampling of the segmentation information comprises a transposed convolution. Performing upsampling may improve the upsampling quality. Moreover, such convolution upsampling layers may be provided as trainable, or, at the decoder as configurable, so that the convolution kernel may be controlled by an indication parsed from the bitstream or derived otherwise.

In an exemplary implementation, for each segmentation information processing layer j of the plurality of N segmentation information processing layers out of the plurality of cascaded layers: the inputting comprises, inputting initial segmentation information from the bitstream if j=1, and otherwise inputting segmentation information processed by the (j−1)-th segmentation information processing layer; and outputting the processed segmentation information.

For example, the processing of the inputted segmentation information by each layer j<N of the plurality of N segmentation information processing layers further comprises: parsing, from the bitstream, a segmentation information element and associating the parsed segmentation information element with the segmentation information outputted by a preceding layer, wherein the position of the parsed segmentation information element in the associated segmentation information is determined based on the segmentation information outputted by the preceding layer. In particular, the amount of segmentation information elements parsed from the bitstream is determined based on segmentation information outputted by the preceding layer For instance, the parsed segmentation information elements are represented by a set of binary flags.

Such layered structure provides processing which may be parallelizable and may easily run on GPU/NPU and enable exploiting parallelism. A fully trainable scheme transferring gradients allows to use it in end-to-end trainable video coding solutions.

In some exemplary embodiments and examples, obtaining decoded data for picture or video processing comprises determining of at least one of: intra- or inter-picture prediction mode; picture reference index; single-reference or multiple-reference prediction (including bi-prediction); presence or absence prediction residual information; quantization step size; motion information prediction type; length of the motion vector; motion vector resolution; motion vector prediction index; motion vector difference size; motion vector difference resolution; motion interpolation filter; in-loop filter parameters; and post-filter parameters; based on segmentation information. The decoding of the present disclosure is applicable very generally for any kinds of data related to the picture or video coding.

The method of the above embodiments or examples ma further comprise obtaining, from the bitstream, sets of feature map elements and inputting the sets of feature map elements respectively into a feature map processing layer out of the plurality of layers based on the segmentation information processed by a segmentation information processing layer; and obtaining the decoded data for picture or video processing based on a feature map processed by the plurality of cascaded layers.

In particular, at least one out of the plurality of cascaded layers is a segmentation information processing layer and a feature map processing layer. In other embodiments, each layer out of the plurality of layers is either a segmentation information processing layer or a feature map processing layer.

Separated layer functionality provides for a clean design and functionality separation. However, the present disclosure may also work if a layer implements both functions.

According to an aspect, a computer program product is provided stored on a non-transitory medium, which when executed on one or more processors performs the method according to any of the above mentioned examples and embodiments.

According to an aspect, a device is provided for decoding an image or video including a processing circuitry which is configured to perform the method according to any of the above mentioned examples and embodiments.

According to an aspect, a device is provided for decoding data for picture or video processing from a bitstream, the device comprising: an obtaining unit configured to obtain, from the bitstream, two or more sets of segmentation information elements; an inputting unit configured to input each of the two or more sets of segmentation information elements respectively into two or more segmentation information processing layers out of a plurality of cascaded layers; a processing unit, configured to process, in each of the two or more segmentation information processing layers, the respective sets of segmentation information; and a decoded data obtaining unit configured to obtain said decoded data for picture or video processing based on the segmentation information processed in the plurality of cascaded layers.

Any of the above mentioned apparatuses may be embodied on an integrated chip. The invention can be implemented in hardware (HW) and/or software (SW). Moreover, HW-based implementations may be combined with SW-based implementations.

It is noted that the present disclosure is not limited to a particular framework. Moreover, the present disclosure is not restricted to image or video compression, and may be applied to object detection, image generation, and recognition systems as well.

For the purpose of clarity, any one of the foregoing embodiments may be combined with any one or more of the other foregoing embodiments to create a new embodiment within the scope of the present disclosure.

BRIEF DESCRIPTION OF THE DRAWINGS

In the following embodiments of the invention are described in more detail with reference to the attached figures and drawings, in which

FIG. 8 is a flow chart illustrating an exemplary method for encoding data for picture/video processing such as encoding;

FIG. 9 is a block diagram illustrating a structure of a network transferring information from layers of different resolution in the bitstream;

FIG. 10A is a schematic drawing illustrating maximum pooling;

FIG. 10B is a schematic drawing illustrating average pooling;

FIG. 33 is a flow chart of an exemplary method for decoding data such as feature map information used in decoding of a picture or video;

FIG. 34 is a flow chart of an exemplary method for encoding data such as segmentation information used in encoding of a picture or video;

DETAILED DESCRIPTION OF THE EMBODIMENTS

Figure 1:
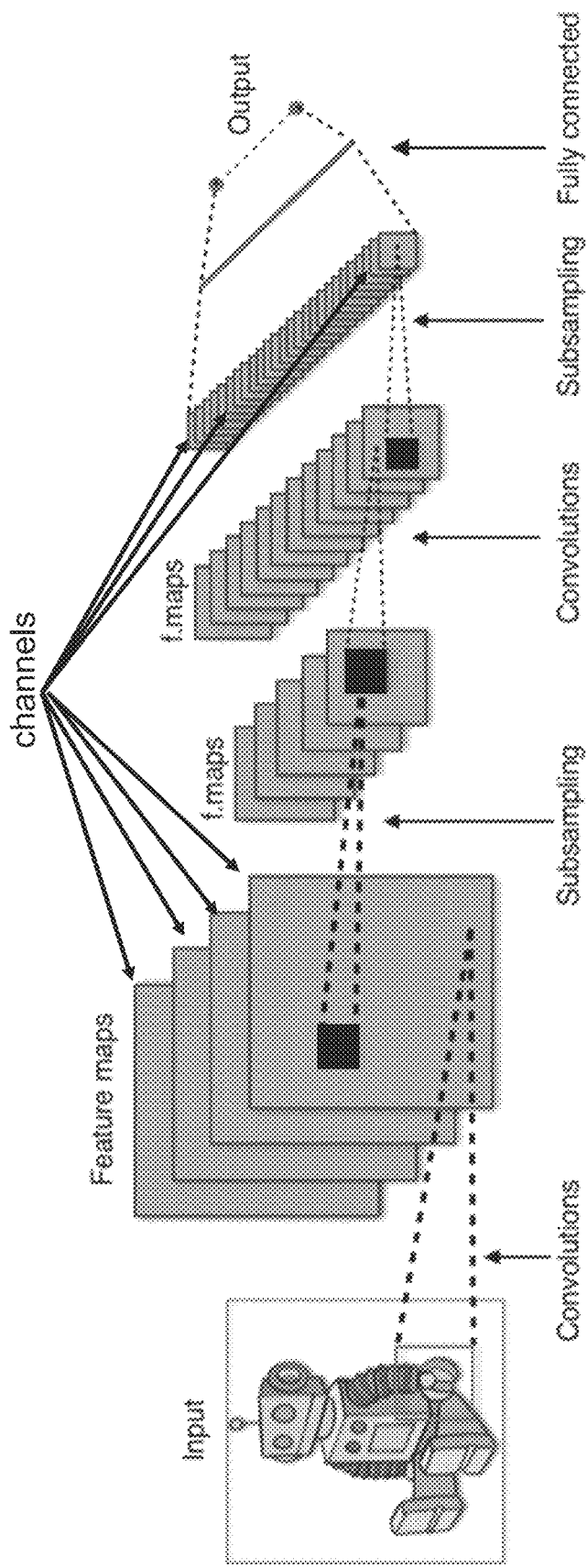
FIG. 1 is a schematic drawing illustrating channels processed by layers of a neural network.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Some embodiments aim at improving the quality of encoded and decoded picture or video data and/or reducing the amount of data required to represent the encoded picture or video data. Some embodiments provide an efficient selection of information to be signaled from an encoder to a decoder. In the following, an overview over some of the used technical terms and framework within which the embodiments of the present disclosure may be employed is provided.

Artificial Neural Networks

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

The name "convolutional neural network" (CNN) indicates that the network employs a mathematical operation called convolution. Convolution is a specialized kind of linear operation. Convolutional networks are neural networks that use convolution in place of a general matrix multiplication in at least one of their layers.

FIG. 1 schematically illustrates a general concept of processing by a neural network such as the CNN. A convolutional neural network consists of an input and an output layer, as well as multiple hidden layers. Input layer is the layer to which the input (such as a portion of an image as shown in FIG. 1) is provided for processing. The hidden layers of a CNN typically consist of a series of convolutional layers that convolve with a multiplication or other dot product. The result of a layer is one or more feature maps (f.maps in FIG. 1), sometimes also referred to as channels. There may be a subsampling involved in some or all of the layers. As a consequence, the feature maps may become smaller, as illustrated in FIG. 1. The activation function in a CNN is usually a ReLU (Rectified Linear Unit) layer, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how the weight is determined at a specific index point.

When programming a CNN for processing images, as shown in FIG. 1, the input is a tensor with shape (number of images)×(image width)×(image height)×(image depth). Then after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. These models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 at every depth slice in the input by 2 along both width and height, discarding 75% of the activations. In this case, every max operation is over 4 numbers. The depth dimension remains unchanged. In addition to max pooling, pooling units can use other functions, such as average pooling or l2-norm pooling. Average pooling was often used historically but has recently fallen out of favor compared to max pooling, which often performs better in practice. Due to the aggressive reduction in the size of the representation, there is a recent trend towards using smaller filters or discarding pooling layers altogether. "Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" (including calculating of a loss function) specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

In summary, FIG. 1 shows the data flow in a typical convolutional neural network. First, the input image is passed through convolutional layers and becomes abstracted to a feature map comprising several channels, corresponding to a number of filters in a set of learnable filters of this layer. Then, the feature map is subsampled using e.g. a pooling layer, which reduces the dimension of each channel in the feature map. Next, the data comes to another convolutional layer, which may have different numbers of output channels. As was mentioned above, the number of input channels and output channels are hyper-parameters of the layer. To establish connectivity of the network, those parameters need to be synchronized between two connected layers, such that the number of input channels for the current layers should be equal to the number of output channels of the previous layer. For the first layer which processes input data, e.g. an image, the number of input channels is normally equal to the number of channels of data representation, for instance 3 channels for RGB or YUV representation of images or video, or 1 channel for grayscale image or video representation.

Autoencoders and Unsupervised Learning

Figure 2:
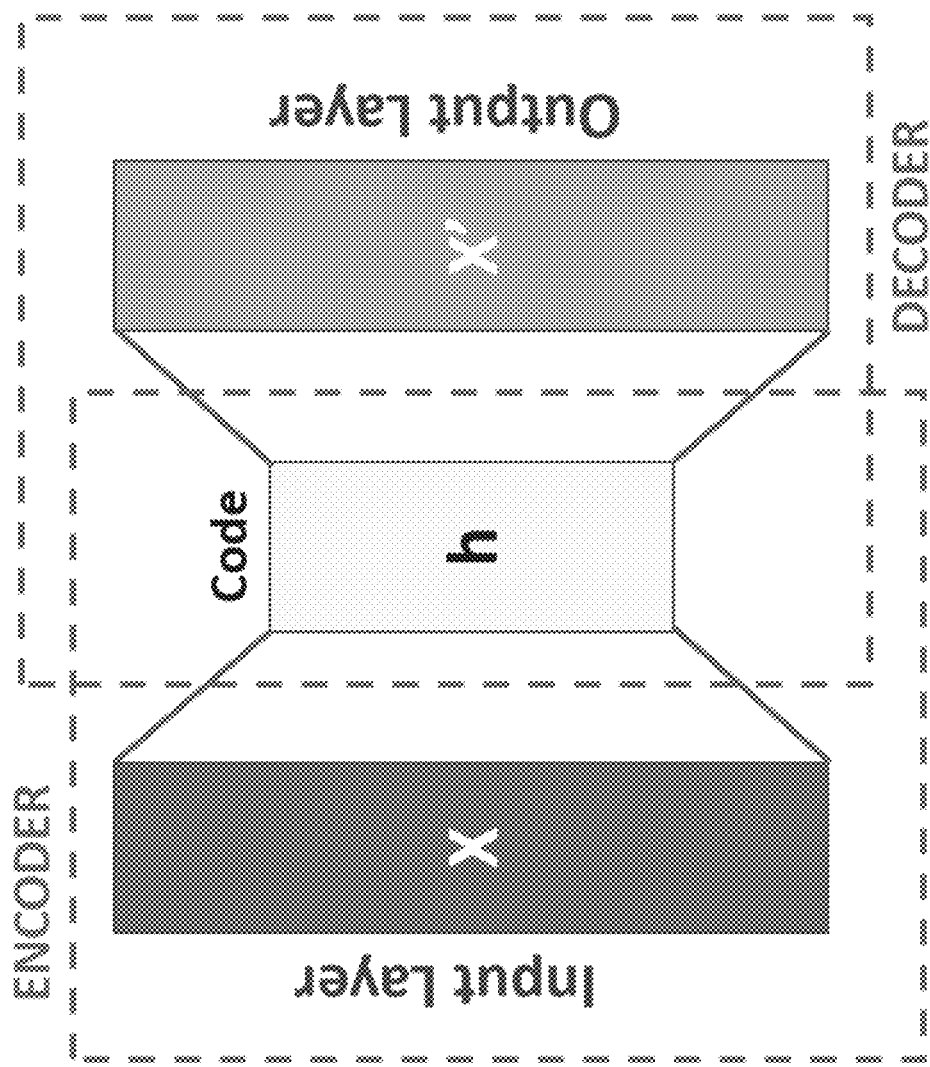
FIG. 2 is a schematic drawing illustrating an autoencoder type of a neural network.

An autoencoder is a type of artificial neural network used to learn efficient data codings in an unsupervised manner. A schematic drawing thereof is shown in FIG. 2. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name. In the simplest case, given one hidden layer, the encoder stage of an autoencoder takes the input x and maps it to h $$h = \sigma(Wx+b).$$

This image h is usually referred to as code, latent variables, or latent representation. Here, σ is an element-wise activation function such as a sigmoid function or a rectified linear unit. W is a weight matrix b is a bias vector. Weights and biases are usually initialized randomly, and then updated iteratively during training through Backpropagation. After that, the decoder stage of the autoencoder maps h to the reconstruction x' of the same shape as x:

$$x' = \sigma'(W'h'+b')$$

where σ', W' and b' for the decoder may be unrelated to the corresponding σ, W and b for the encoder.

Variational autoencoder models make strong assumptions concerning the distribution of latent variables. They use a variational approach for latent representation learning, which results in an additional loss component and a specific estimator for the training algorithm called the Stochastic Gradient Variational Bayes (SGVB) estimator. It assumes that the data is generated by a directed graphical model $p_\theta(x|h)$ and that the encoder is learning an approximation $q_\phi(h|x)$ to the posterior distribution $p_\theta(h|x)$ where φ and θ denote the parameters of the encoder (recognition model) and decoder (generative model) respectively. The probability distribution of the latent vector of a VAE typically matches that of the training data much closer than a standard autoencoder. The objective of VAE has the following form:

$$\mathcal{L}(\phi, \theta, x) = D_{KL}(q_\phi(h|x) \| p_\theta(h)) - E_{q_\phi(h|x)}(\log p_\theta(x|h))$$

Here, $D_{KL}$ stands for the Kullback-Leibler divergence. The prior over the latent variables is usually set to be the centered isotropic multivariate Gaussian $p_\theta(h) = N(0, I)$. Commonly, the shape of the variational and the likelihood distributions are chosen such that they are factorized Gaussians:

$$q_\phi(h|x) = \mathcal{N}(\rho(x), \omega^2(x)I)$$
$$p_\phi(x|h) = \mathcal{N}(\mu(h), \sigma^2(h)I)$$

where ρ(x) and $\omega_2(x)$ are the encoder output, while μ(h) and $\sigma^2(h)$ are the decoder outputs.

Recent progress in artificial neural networks area and especially in convolutional neural networks enables researchers' interest of applying neural networks based technologies to the task of image and video compression.

For example, End-to-end Optimized Image Compression has been proposed, which uses a network based on a variational autoencoder.

Accordingly, data compression is considered as a fundamental and well-studied problem in engineering, and is commonly formulated with the goal of designing codes for a given discrete data ensemble with minimal entropy. The solution relies heavily on knowledge of the probabilistic structure of the data, and thus the problem is closely related to probabilistic source modeling. However, since all practical codes must have finite entropy, continuous-valued data (such as vectors of image pixel intensities) must be quantized to a finite set of discrete values, which introduces an error.

In this context, known as the lossy compression problem, one must trade off two competing costs: the entropy of the discretized representation (rate) and the error arising from the quantization (distortion). Different compression applications, such as data storage or transmission over limited-capacity channels, demand different rate-distortion trade-offs.

Joint optimization of rate and distortion is difficult. Without further constraints, the general problem of optimal quantization in high-dimensional spaces is intractable. For this reason, most existing image compression methods operate by linearly transforming the data vector into a suitable continuous-valued representation, quantizing its elements independently, and then encoding the resulting discrete representation using a lossless entropy code. This scheme is called transform coding due to the central role of the transformation.

For example, JPEG uses a discrete cosine transform on blocks of pixels, and JPEG 2000 uses a multi-scale orthogonal wavelet decomposition. Typically, the three components of transform coding methods-transform, quantizer, and entropy code—are separately optimized (often through manual parameter adjustment). Modern video compression standards like HEVC, VVC and EVC also use transformed representation to code residual signal after prediction. The several transforms are used for that purpose such as discrete cosine and sine transforms (DCT, DST), as well as low frequency non-separable manually optimized transforms (LFNST).

Variational Image Compression

Variable Auto-Encoder (VAE) framework can be considered as a nonlinear transforming coding model. The transforming process can be mainly divided into four parts. This is exemplified in FIG. 3A showing a VAE framework.

The transforming process can be mainly divided into four parts: FIG. 3A exemplifies the VAE framework. In FIG. 3A, the encoder 101 maps an input image x into a latent representation (denoted by y) via the function y=f(x). This latent representation may also be referred to as a part of or a point within a "latent space" in the following. The function f( ) is a transformation function that converts the input signal x into a more compressible representation y. The quantizer 102 transforms the latent representation y into the quantized latent representation $\hat{y}$ with (discrete) values by y=Q(y), with Q representing the quantizer function. The entropy model, or the hyper encoder/decoder (also known as hyperprior) 103 estimates the distribution of the quantized latent representation $\hat{y}$ to get the minimum rate achievable with a lossless entropy source coding.

The latent space can be understood as a representation of compressed data in which similar data points are closer together in the latent space. Latent space is useful for learning data features and for finding simpler representations of data for analysis. The quantized latent representation T, $\hat{y}$ and the side information $\hat{z}$ of the hyperprior 3 are included into a bitstream 2 (are binarized) using arithmetic coding (AE). Furthermore, a decoder 104 is provided that transforms the quantized latent representation to the reconstructed image $\hat{x}$, $\hat{x}$=g($\hat{y}$). The signal $\hat{x}$ is the estimation of the input image x. It is desirable that x is as close to $\hat{x}$ as possible, in other words the reconstruction quality is as high as possible. However, the higher the similarity between $\hat{x}$ and x, the higher the amount of side information necessary to be transmitted. The side information includes bitstream1 and bitstream2 shown in FIG. 3A, which are generated by the encoder and transmitted to the decoder. Normally, the higher the amount of side information, the higher the reconstruction quality. However, a high amount of side information means that the compression ratio is low. Therefore, one purpose of the system described in FIG. 3A is to balance the reconstruction quality and the amount of side information conveyed in the bitstream.

Figure 3A:
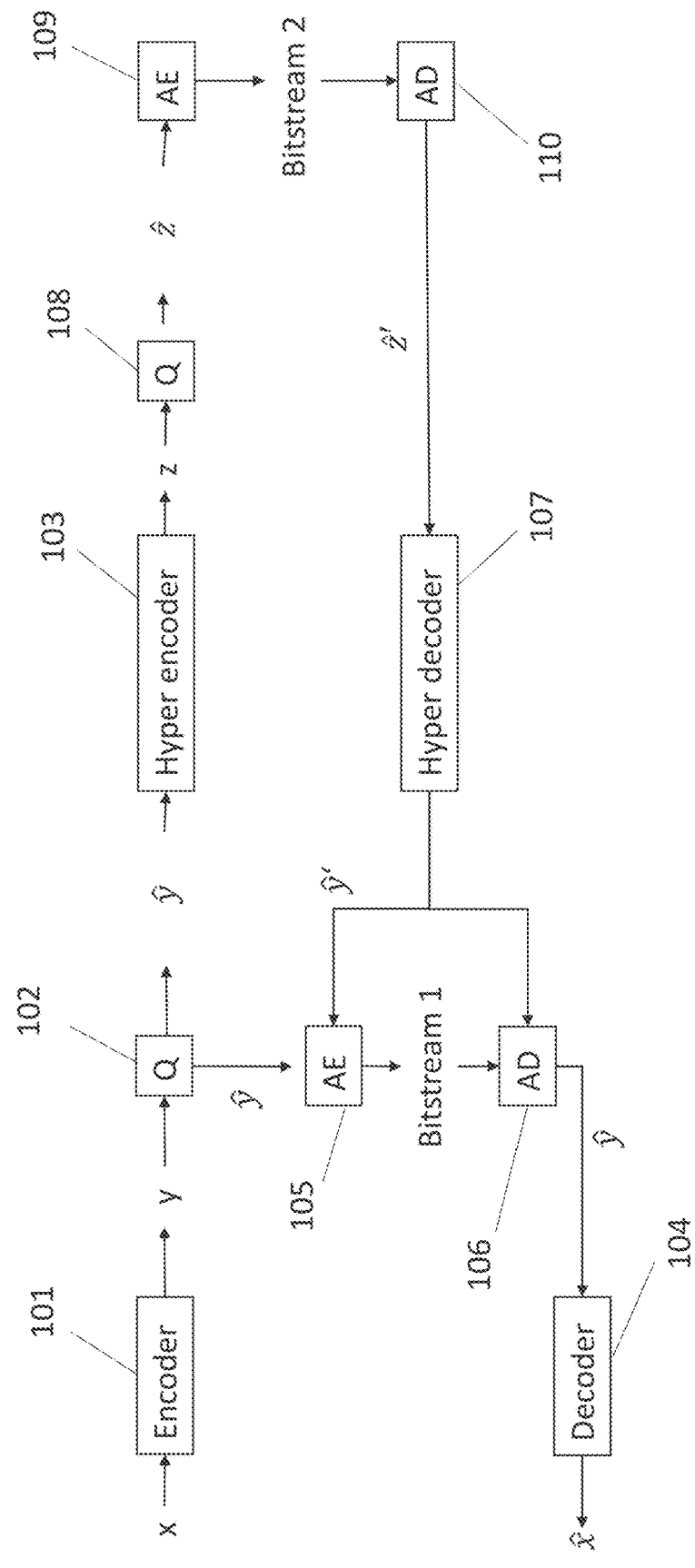
FIG. 3A is a schematic drawing illustrating an exemplary network architecture for encoder and decoder side including a hyperprior model.

In FIG. 3A the component AE 105 is the Arithmetic Encoding module, which converts samples of the quantized latent representation $\hat{y}$ and the side information $\hat{z}$ into a binary representation bitstream 1. The samples of $\hat{y}$ and $\hat{z}$ might for example comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 106 is the process of reverting the binarization process, where binary digits are converted back to sample values. The arithmetic decoding is provided by the arithmetic decoding module 106.

It is noted that the present disclosure is not limited to this particular framework. Moreover the present disclosure is not restricted to image or video compression, and can be applied to object detection, image generation, and recognition systems as well.

In FIG. 3A there are two sub networks concatenated to each other. A subnetwork in this context is a logical division between the parts of the total network. For example, in FIG. 3A the modules 101, 102, 104, 105 and 106 are called the "Encoder/Decoder" subnetwork. The "Encoder/Decoder" subnetwork is responsible for encoding (generating) and decoding (parsing) of the first bitstream "bitstream1". The second network in FIG. 3A comprises modules 103, 108, 109, 110 and 107 and is called "hyper encoder/decoder" subnetwork. The second subnetwork is responsible for generating the second bitstream "bitstream2". The purposes of the two subnetworks are different.

The first subnetwork is responsible for:
the transformation 101 of the input image x into its latent representation y (which is easier to compress that x),
quantizing 102 the latent representation y into a quantized latent representation $\hat{y}$,
compressing the quantized latent representation y using the AE by the arithmetic encoding module 105 to obtain bitstream "bitstream 1",".
parsing the bitstream 1 via AD using the arithmetic decoding module 106, and
reconstructing 104 the reconstructed image ($\hat{x}$) using the parsed data.

The purpose of the second subnetwork is to obtain statistical properties (e.g. mean value, variance and correlations between samples of bitstream 1) of the samples of "bitstream1", such that the compressing of bitstream 1 by first subnetwork is more efficient. The second subnetwork generates a second bitstream "bitstream2", which comprises the said information (e.g. mean value, variance and correlations between samples of bitstream1).

The second network includes an encoding part which comprises transforming 103 of the quantized latent representation $\hat{y}$ into side information z, quantizing the side information z into quantized side information, and encoding (e.g. binarizing) 109 the quantized side information $\hat{z}$ into bitstream2. In this example, the binarization is performed by an arithmetic encoding (AE). A decoding part of the second network includes arithmetic decoding (AD) 110, which transforms the input bitstream2 into decoded quantized side information $\hat{z}'$. The $\hat{z}'$ might be identical to $\hat{z}$, since the arithmetic encoding end decoding operations are lossless compression methods. The decoded quantized side information $\hat{z}'$ is then transformed 107 into decoded side information $\hat{y}'$. $\hat{y}'$ represents the statistical properties of $\hat{y}$ (e.g. mean value of samples of $\hat{y}$, or the variance of sample values or like). The decoded latent representation $\hat{y}'$ is then provided to the above-mentioned Arithmetic Encoder 105 and Arithmetic Decoder 106 to control the probability model of $\hat{y}$.

The FIG. 3A describes an example of VAE (variational auto encoder), details of which might be different in different implementations. For example in a specific implementation additional components might be present to more efficiently obtain the statistical properties of the samples of bitstream 1. In one such implementation a context modeler might be present, which targets extracting cross-correlation information of the bitstream 1. The statistical information provided by the second subnetwork might be used by AE (arithmetic encoder) 105 and AD (arithmetic decoder) 106 components.

FIG. 3A depicts the encoder and decoder in a single figure. As is clear to those skilled in the art, the encoder and the decoder may be, and very often are, embedded in mutually different devices.

Figure 3B:
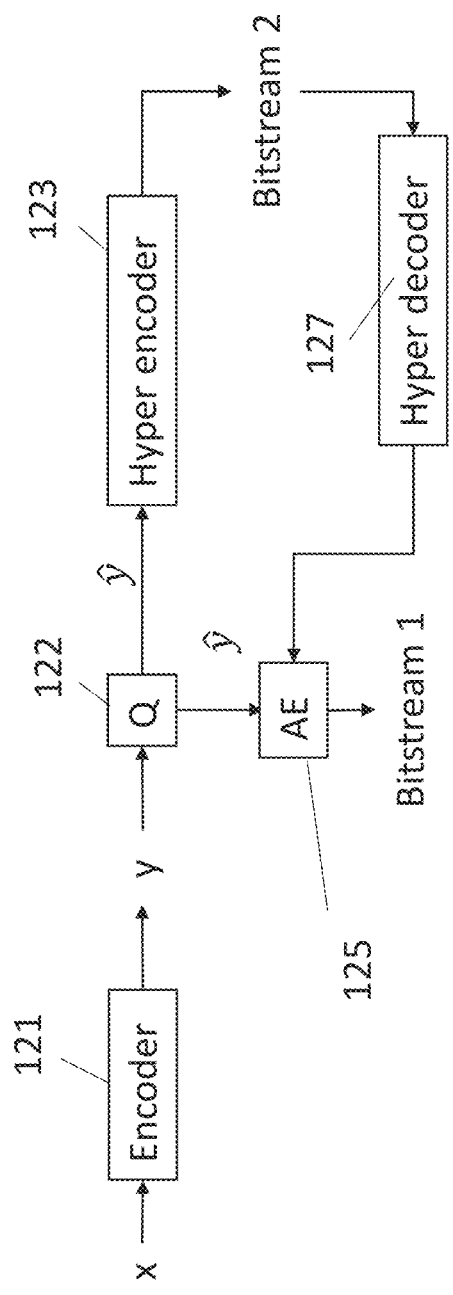
FIG. 3B is a schematic drawing illustrating a general network architecture for encoder side including a hyperprior model.
Figure 3C:
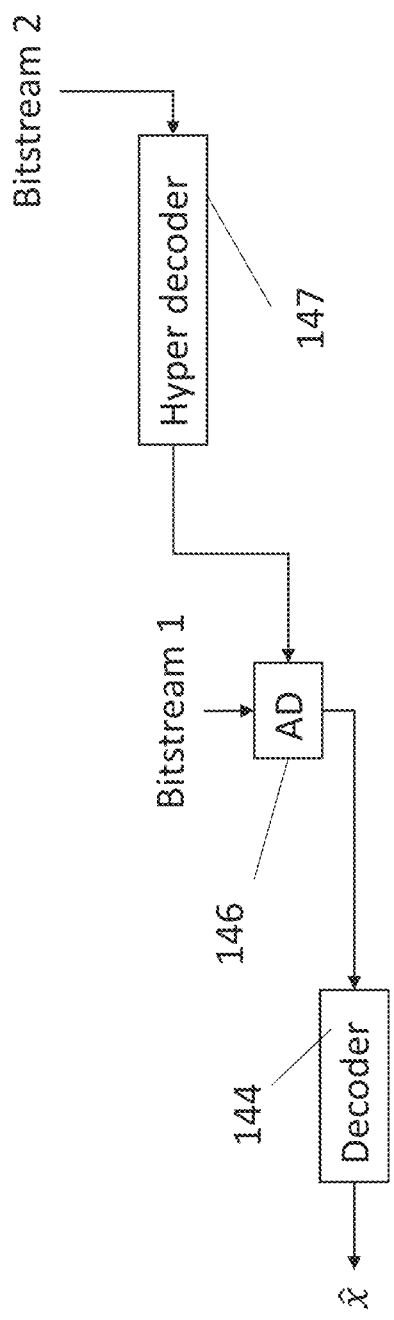
FIG. 3C is a schematic drawing illustrating a general network architecture for decoder side including a hyperprior model.

FIG. 3B depicts the encoder and FIG. 3C depicts the decoder components of the VAE framework in isolation. As input, the encoder receives, according to some embodiments, a picture. The input picture may include one or more channels, such as color channels or other kind of channels, e.g. depth channel or motion information channel, or the like. The output of the encoder (as shown in FIG. 3B) is a bitstream1 and a bitstream2. The bitstream1 is the output of the first sub-network of the encoder and the bitstream2 is the output of the second subnetwork of the encoder.

Similarly, in FIG. 3C, the two bitstreams, bitstream1 and bitstream2, are received as input and $\hat{z}$, which is the reconstructed (decoded) image, is generated at the output. As indicated above, the VAE can be split into different logical units that perform different actions. This is exemplified in FIGS. 3B and 3C so that FIG. 3B depicts components that participate in the encoding of a signal, like a video and provided encoded information. This encoded information is then received by the decoder components depicted in FIG. 3C for encoding, for example. It is noted that the components of the encoder and decoder denoted with numerals 12x and 14x may correspond in their function to the components referred to above in FIG. 3A and denoted with numerals 10x.

Specifically, as is seen in FIG. 3B, the encoder comprises the encoder 121 that transforms an input x into a signal y which is then provided to the quantizer 322. The quantizer 122 provides information to the arithmetic encoding module 125 and the hyper encoder 123. The hyper encoder 123 provides the bitstream2 already discussed above to the hyper decoder 147 that in turn provides the information to the arithmetic encoding module 105 (125).

The output of the arithmetic encoding module is the bitstream1. The bitstream1 and bitstream2 are the output of the encoding of the signal, which are then provided (transmitted) to the decoding process. Although the unit 101 (121) is called "encoder", it is also possible to call the complete subnetwork described in FIG. 3B as "encoder". The process of encoding in general means the unit (module) that converts an input to an encoded (e.g. compressed) output. It can be seen from FIG. 3B, that the unit 121 can be actually considered as a core of the whole subnetwork, since it performs the conversion of the input x into y, which is the compressed version of the x. The compression in the encoder 121 may be achieved, e.g. by applying a neural network, or in general any processing network with one or more layers. In such network, the compression may be performed by cascaded processing including downsampling which reduces size and/or number of channels of the input. Thus, the encoder may be referred to, e.g. as a neural network (NN) based encoder, or the like.

The remaining parts in the figure (quantization unit, hyper encoder, hyper decoder, arithmetic encoder/decoder) are all parts that either improve the efficiency of the encoding process or are responsible for converting the compressed output y into a series of bits (bitstream). Quantization may be provided to further compress the output of the NN encoder 121 by a lossy compression. The AE 125 in combination with the hyper encoder 123 and hyper decoder 127 used to configure the AE 125 may perform the binarization which may further compress the quantized signal by a lossless compression. Therefore, it is also possible to call the whole subnetwork in FIG. 3B an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

In J. Balle, L. Valero Laparra, and E. P. Simoncelli (2015). "Density Modeling of Images Using a Generalized Normalization Transformation", In: arXiv e-prints, Presented at the 4th Int. Conf. for Learning Representations, 2016 (referred to in the following as "Balle") the authors proposed a framework for end-to-end optimization of an image compression model based on nonlinear transforms. The authors optimize for Mean Squared Error (MSE), but use a more flexible transforms built from cascades of linear convolutions and nonlinearities. Specifically, authors use a generalized divisive normalization (GDN) joint nonlinearity that is inspired by models of neurons in biological visual systems, and has proven effective in Gaussianizing image densities. This cascaded transformation is followed by uniform scalar quantization (i.e., each element is rounded to the nearest integer), which effectively implements a parametric form of vector quantization on the original image space. The compressed image is reconstructed from these quantized values using an approximate parametric nonlinear inverse transform.

Figure 4:
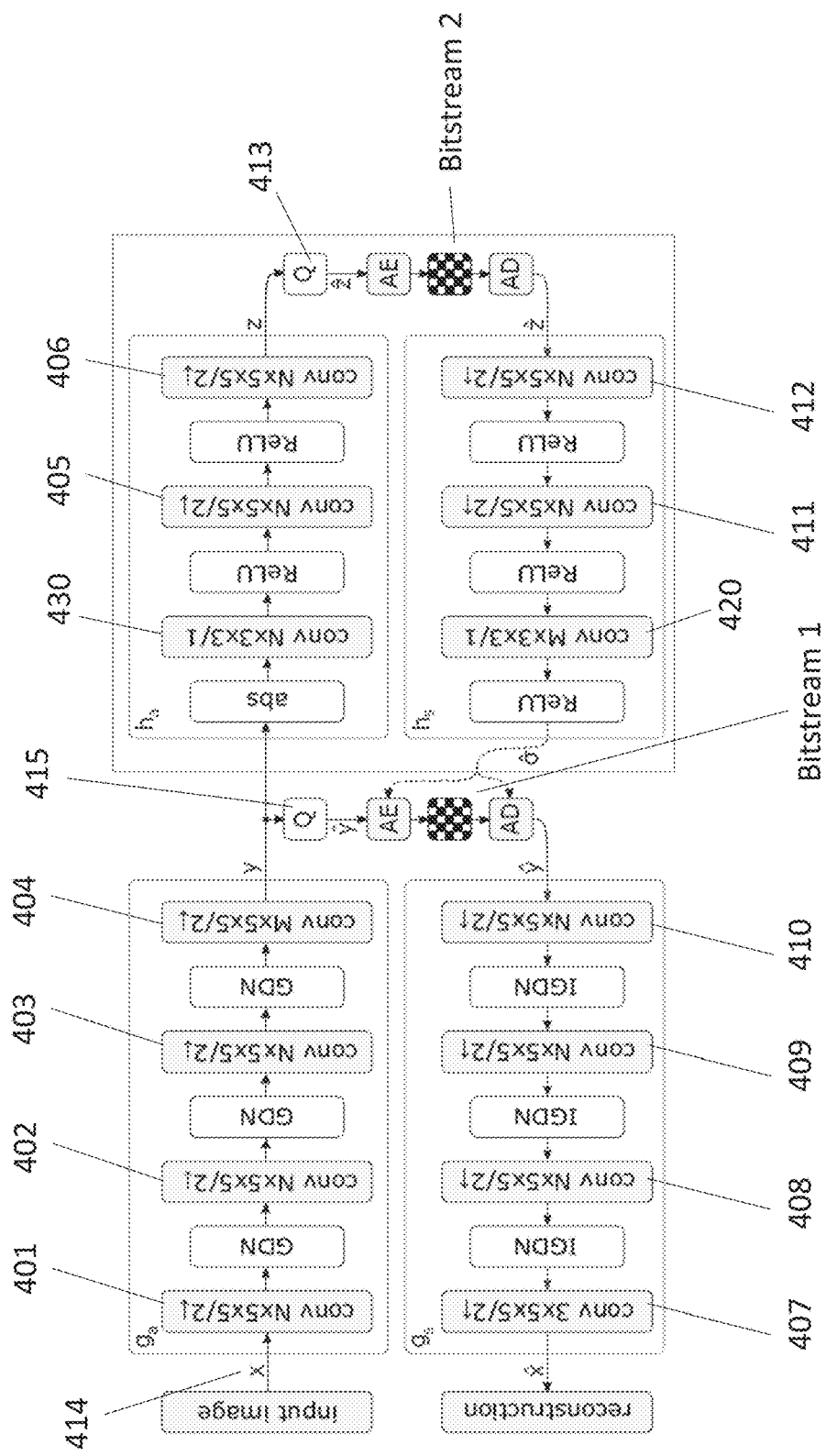
FIG. 4 is a schematic drawing illustrating an exemplary network architecture for encoder and decoder side including a hyperprior model.

Such example of the VAE framework is shown in FIG. 4, and it utilizes 6 downsampling layers that are marked with 401 to 406. The network architecture includes a hyperprior model. The left side ($g_a$, $g_s$) shows an image autoencoder architecture, the right side ($h_a$, $h_s$) corresponds to the autoencoder implementing the hyperprior. The factorized-prior model uses the identical architecture for the analysis and synthesis transforms $g_a$ and $g_s$. Q represents quantization, and AE, AD represent arithmetic encoder and arithmetic decoder, respectively. The encoder subjects the input image x to $g_a$, yielding the responses y (latent representation) with spatially varying standard deviations. The encoding $g_a$ includes a plurality of convolution layers with subsampling and, as an activation function, generalized divisive normalization (GDN).

The responses are fed into $h_a$, summarizing the distribution of standard deviations in z. z is then quantized, compressed, and transmitted as side information. The encoder then uses the quantized vector $\hat{z}$ to estimate $\hat{\sigma}$, the spatial distribution of standard deviations which is used for obtaining probability values (or frequency values) for arithmetic coding (AE), and uses it to compress and transmit the quantized image representation $\hat{y}$ (or latent representation). The decoder first recovers $\hat{z}$ from the compressed signal. It then uses $h_s$ to obtain $\hat{y}$, which provides it with the correct probability estimates to successfully recover $\hat{y}$ as well. It then feeds $\hat{y}$ into $g_s$ to obtain the reconstructed image.

The layers that include downsampling is indicated with the downward arrow in the layer description. The layer description "Conv N×5×5/2↓" means that the layer is a convolution layer, with N channels and the convolution kernel is 5×5 in size. As stated, the 2↓ means that a downsampling with a factor of 2 is performed in this layer. Downsampling by a factor of 2 results in one of the dimensions of the input signal being reduced by half at the output. In FIG. 4, the 2↓ indicates that both width and height of the input image is reduced by a factor of 2. Since there are 6 downsampling layers, if the width and height of the input image 414 (also denoted with x) is given by w and h, the output signal z^413 is has width and height equal to w/64 and h/64 respectively. Modules denoted by AE and AD are arithmetic encoder and arithmetic decoder, which are explained with reference to FIGS. 3A to 3C. The arithmetic encoder and decoder are specific implementations of entropy coding. AE and AD can be replaced by other means of entropy coding. In information theory, an entropy encoding is a lossless data compression scheme that is used to convert the values of a symbol into a binary representation which is a revertible process. Also, the "Q" in the figure corresponds to the quantization operation that was also referred to above in relation to FIG. 4 and is further explained above in the section "Quantization". Also, the quantization operation and a corresponding quantization unit as part of the component 413 or 415 is not necessarily present and/or can be replaced with another unit.

In FIG. 4, there is also shown the decoder comprising upsampling layers 407 to 412. A further layer 420 is provided between the upsampling layers 411 and 410 in the processing order of an input that is implemented as convolutional layer but does not provide an upsampling to the input received. A corresponding convolutional layer 430 is also shown for the decoder. Such layers can be provided in NNs for performing operations on the input that do not alter the size of the input but change specific characteristics. However, it is not necessary that such a layer is provided.

When seen in the processing order of bitstream2 through the decoder, the upsampling layers are run through in reverse order, i.e. from upsampling layer 412 to upsampling layer 407. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 407 to 412 are implemented as convolutional layers (conv). Specifically, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

In the first subnetwork, some convolutional layers (401 to 403) are followed by generalized divisive normalization (GDN) at the encoder side and by the inverse GDN (IGDN) at the decoder side. In the second subnetwork, the activation function applied is ReLu. It is noted that the present disclosure is not limited to such implementation and in general, other activation functions may be used instead of GDN or ReLu.

End-to-End Image or Video Compression

DNN based image compression methods can exploit large scale end-to-end training and highly non-linear transform, which are not used in the traditional approaches. However, it is non-trivial to directly apply these techniques to build an end-to-end learning system for video compression. First, it remains an open problem to learn how to generate and compress the motion information tailored for video compression. Video compression methods heavily rely on motion information to reduce temporal redundancy in video sequences.

A straightforward solution is to use the learning based optical flow to represent motion information. However, current learning based optical flow approaches aim at generating flow fields as accurate as possible. The precise optical flow is often not optimal for a particular video task. In addition, the data volume of optical flow increases significantly when compared with motion information in the traditional compression systems and directly applying the existing compression approaches to compress optical flow values will significantly increase the number of bits required for storing motion information. Second, it is unclear how to build a DNN based video compression system by minimizing the rate-distortion based objective for both residual and motion information. Rate-distortion optimization (RDO) aims at achieving higher quality of reconstructed frame (i.e., less distortion) when the number of bits (or bit rate) for compression is given. RDO is important for video compression performance. In order to exploit the power of end-to-end training for learning based compression system, the RDO strategy is required to optimize the whole system.

In Guo Lu, Wanli Ouyang, Dong Xu, Xiaoyun Zhang, Chunlei Cai, Zhiyong Gao; *"DVC: An End-to-end Deep Video Compression Framework"*. Proceedings of the IEEE/CVF Conference on Computer Vision and Pattern Recognition (CVPR), 2019, pp. 11006-11015, authors proposed the end-to-end deep video compression (DVC) model that jointly learns motion estimation, motion compression, and residual coding.

Figure 5A:
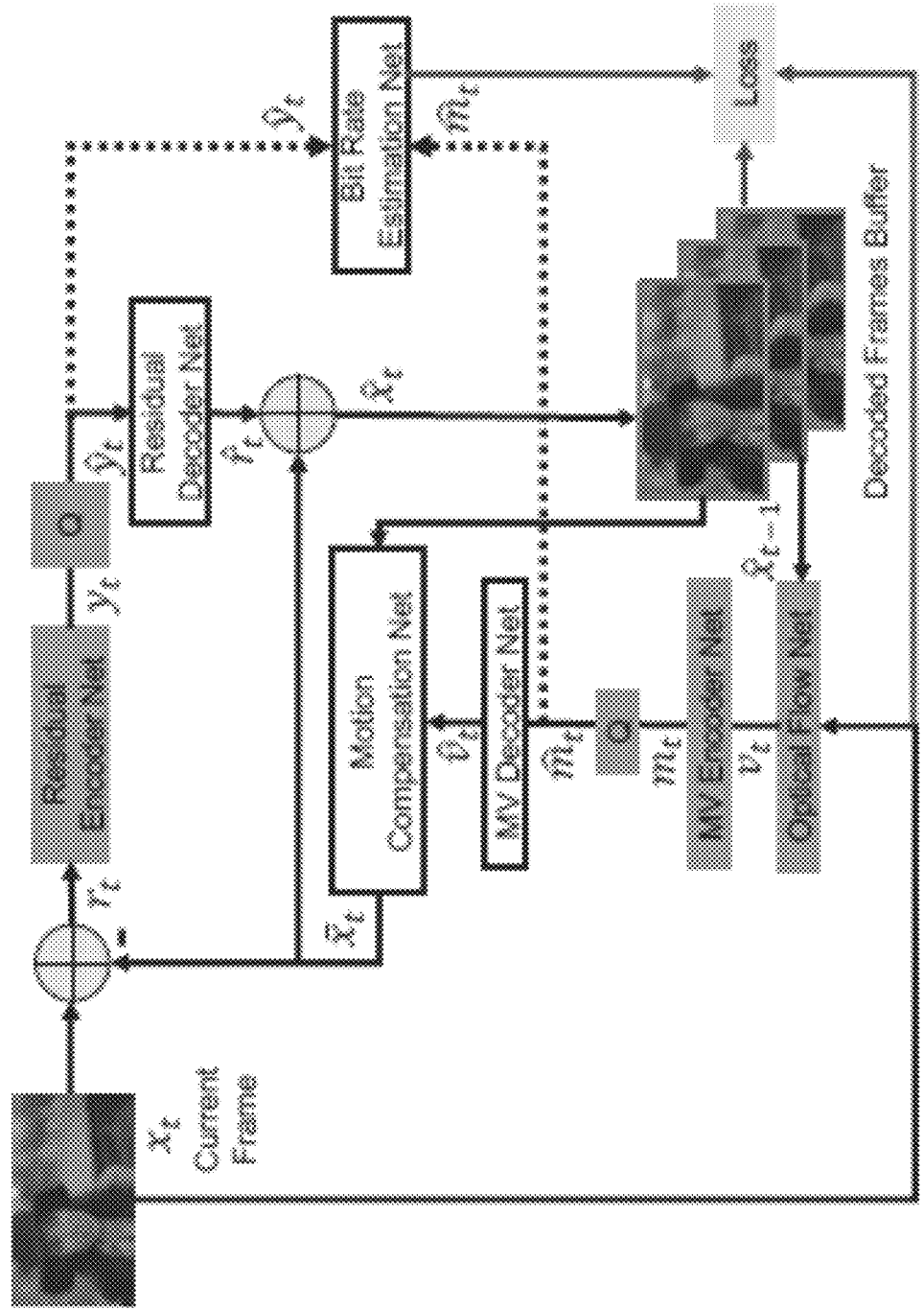
FIG. 5A is a block diagram illustrating end-to-end video compression framework based on a neural networks.
Figure 5B:
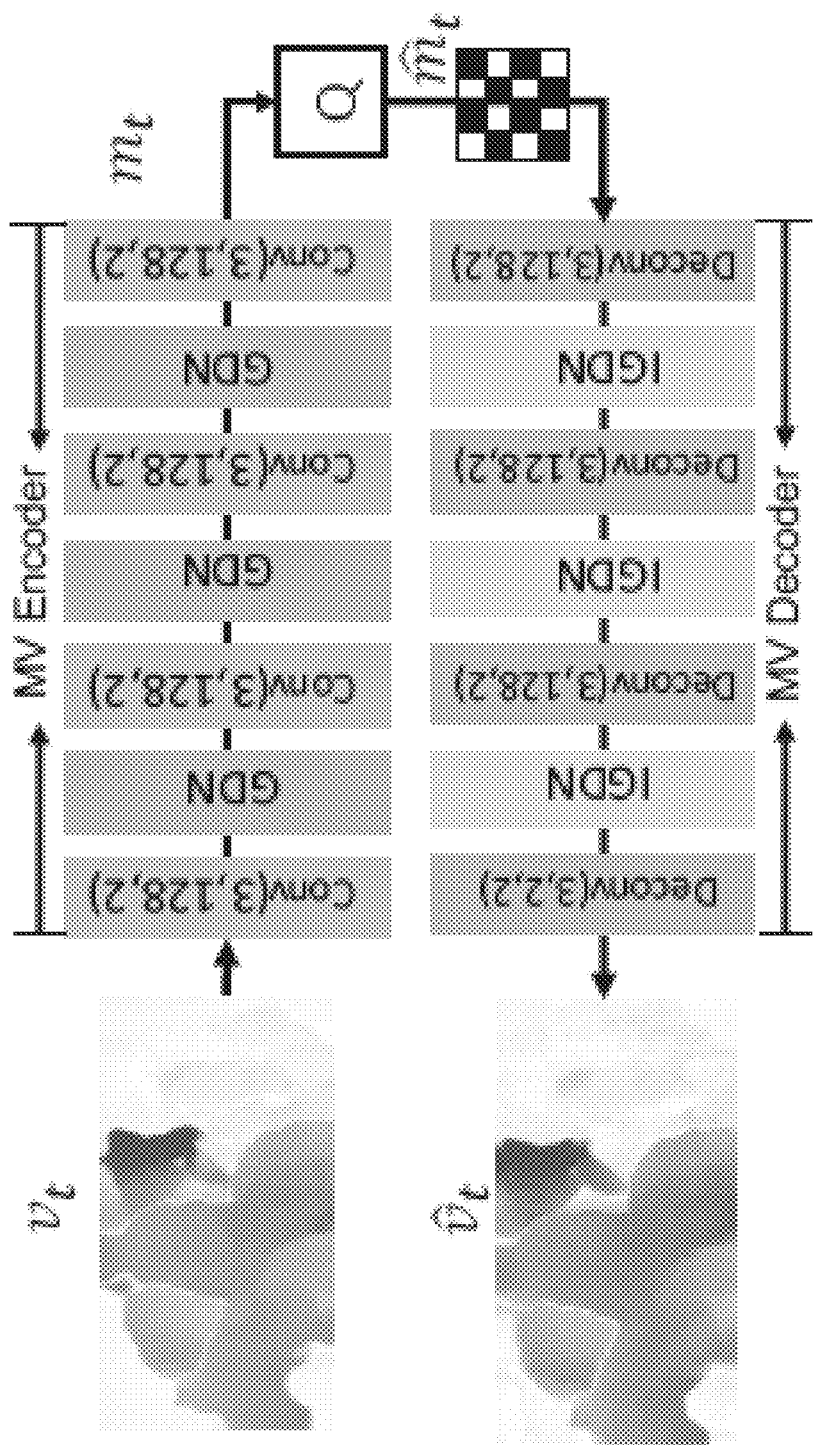
FIG. 5B is a block diagram illustrating some exemplary details of application of a neural network for motion field compression.

Such encoder is illustrated in FIG. 5A. In particular, FIG. 5A shows an overall structure of end-to-end trainable video compression framework. In order to compress motion information, a CNN was designated to transform the optical flow to the corresponding representations suitable for better compression. Specifically, an auto-encoder style network is used to compress the optical flow. The motion vectors (MV)

compression network is shown in FIG. 5B. The network architecture is somewhat similar to the ga/gs of FIG. 4. In particular, the optical flow is fed into a series of convolution operation and nonlinear transform including GDN and IGDN. The number of output channels for convolution (deconvolution) is 128 except for the last deconvolution layer, which is equal to 2. Given optical flow with the size of M×N×x2, the MV encoder will generate the motion representation with the size of M/16×N/16×128. Then motion representation is quantized, entropy coded and sent to bitstream. The MV decoder receives the quantized representation and reconstruct motion information using MV encoder.

Figure 5C:
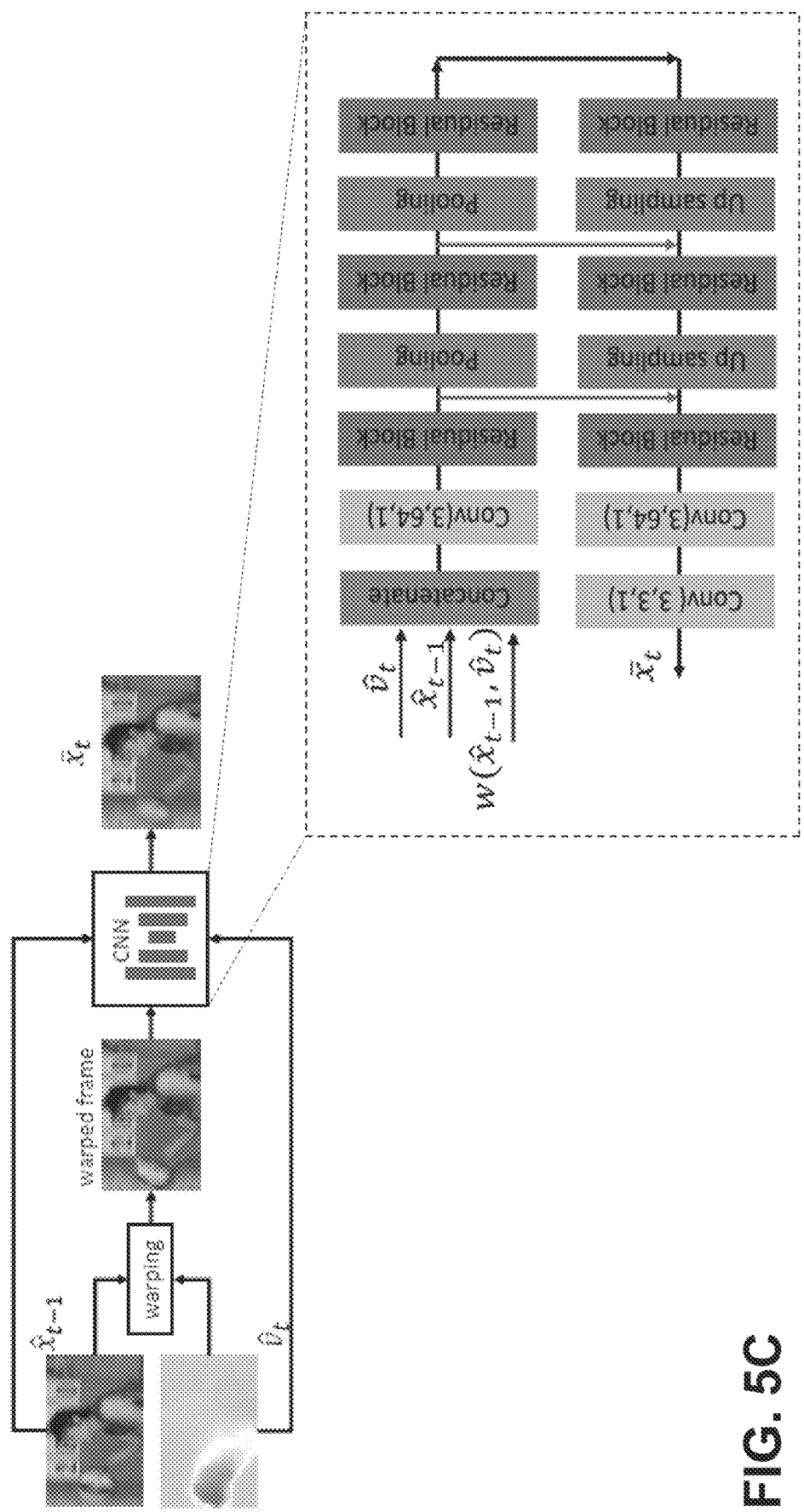
FIG. 5C is a block diagram illustrating some exemplary details of application of a neural network for motion compensation.

FIG. 5C shows a structure of the motion compensation part. Here, using previous reconstructed frame $x_{t-1}$ and reconstructed motion information, the warping unit generates the warped frame (normally, with help of interpolation filter such as bi-linear interpolation filter). Then a separate CNN with three inputs generates the predicted picture. The architecture of the motion compensation CNN is also shown in FIG. 5C.

The residual information between the original frame and the predicted frame is encoded by the residual encoder network. A highly non-linear neural network is used to transform the residuals to the corresponding latent representation. Compared with discrete cosine transform in the traditional video compression system, this approach can better exploit the power of non-linear transform and achieve higher compression efficiency.

From above overview it can be seen that CNN based architecture can be applied both for image and video compression, considering different parts of video framework including motion estimation, motion compensation and residual coding. Entropy coding is popular method used for data compression, which is widely adopted by the industry and is also applicable for feature map compression either for human perception or for computer vision tasks.

Video Coding for Machines

The Video Coding for Machines (VCM) is another computer science direction being popular nowadays. The main idea behind this approach is to transmit the coded representation of image or video information targeted to further processing by computer vision (CV) algorithms, like object segmentation, detection and recognition. In contrast to traditional image and video coding targeted to human perception the quality characteristic is the performance of computer vision task, e.g. object detection accuracy, rather than reconstructed quality.

A recent study proposed a new deployment paradigm called collaborative intelligence, whereby a deep model is split between the mobile and the cloud. Extensive experiments under various hardware configurations and wireless connectivity modes revealed that the optimal operating point in terms of energy consumption and/or computational latency involves splitting the model, usually at a point deep in the network. Today's common solutions, where the model sits fully in the cloud or fully at the mobile, were found to be rarely (if ever) optimal. The notion of collaborative intelligence has been extended to model training as well. In this case, data flows both ways: from the cloud to the mobile during back-propagation in training, and from the mobile to the cloud during forward passes in training, as well as inference.

Lossy compression of deep feature data has been studied based on HEVC intra coding, in the context of a recent deep model for object detection. It was noted the degradation of detection performance with increased compression levels and proposed compression-augmented training to minimize this loss by producing a model that is more robust to quantization noise in feature values. However, this is still a sub-optimal solution, because the codec employed is highly complex and optimized for natural scene compression rather than deep feature compression.

The problem of deep feature compression for the collaborative intelligence has been addressed by an approach for object detection task using popular YOLOv2 network for the study of compression efficiency and recognition accuracy trade-off. Here the term deep feature has the same meaning as feature map. The word 'deep' comes from the collaborative intelligence idea when the output feature map of some hidden (deep) layer is captured and transferred to the cloud to perform inference. That appears to be more efficient rather than sending compressed natural image data to the cloud and perform the object detection using reconstructed images.

The efficient compression of feature maps benefits the image and video compression and reconstruction both for human perception and for machine vision. Said about disadvantages of state-of-the art autoencoder based approach to compression are also valid for machine vision tasks.

Artificial Neural Networks with Skip Connections

A residual neural network (ResNet) is an artificial neural network (ANN) of a kind that builds on constructs known from pyramidal cells in the cerebral cortex. Residual neural networks do this by utilizing skip connections, or shortcuts to jump over some layers. Typical ResNet models are implemented with double- or triple-layer skips that contain nonlinearities (ReLU) and batch normalization in between. An additional weight matrix may be used to learn the skip weights; these models are known as HighwayNets. Models with several parallel skips are referred to as DenseNets. In the context of residual neural networks, a non-residual network may be described as a plain network.

One motivation for skipping over layers is to avoid the problem of vanishing gradients, by reusing activations from a previous layer until the adjacent layer learns its weights. During training, the weights adapt to mute the upstream layer, and amplify the previously-skipped layer. In the simplest case, only the weights for the adjacent layer's connection are adapted, with no explicit weights for the upstream layer. This works best when a single nonlinear layer is stepped over, or when the intermediate layers are all linear. If not, then an explicit weight matrix should be learned for the skipped connection (a HighwayNet should be used).

Skipping effectively simplifies the network, using fewer layers in the initial training stages. This speeds learning by reducing the impact of vanishing gradients, as there are fewer layers to propagate through. The network then gradually restores the skipped layers as it learns the feature space. Towards the end of training, when all layers are expanded, it stays closer to the manifold and thus learns faster. A neural network without residual parts explores more of the feature space. This makes it more vulnerable to perturbations that cause it to leave the manifold, and necessitates extra training data to recover.

Figure 6:
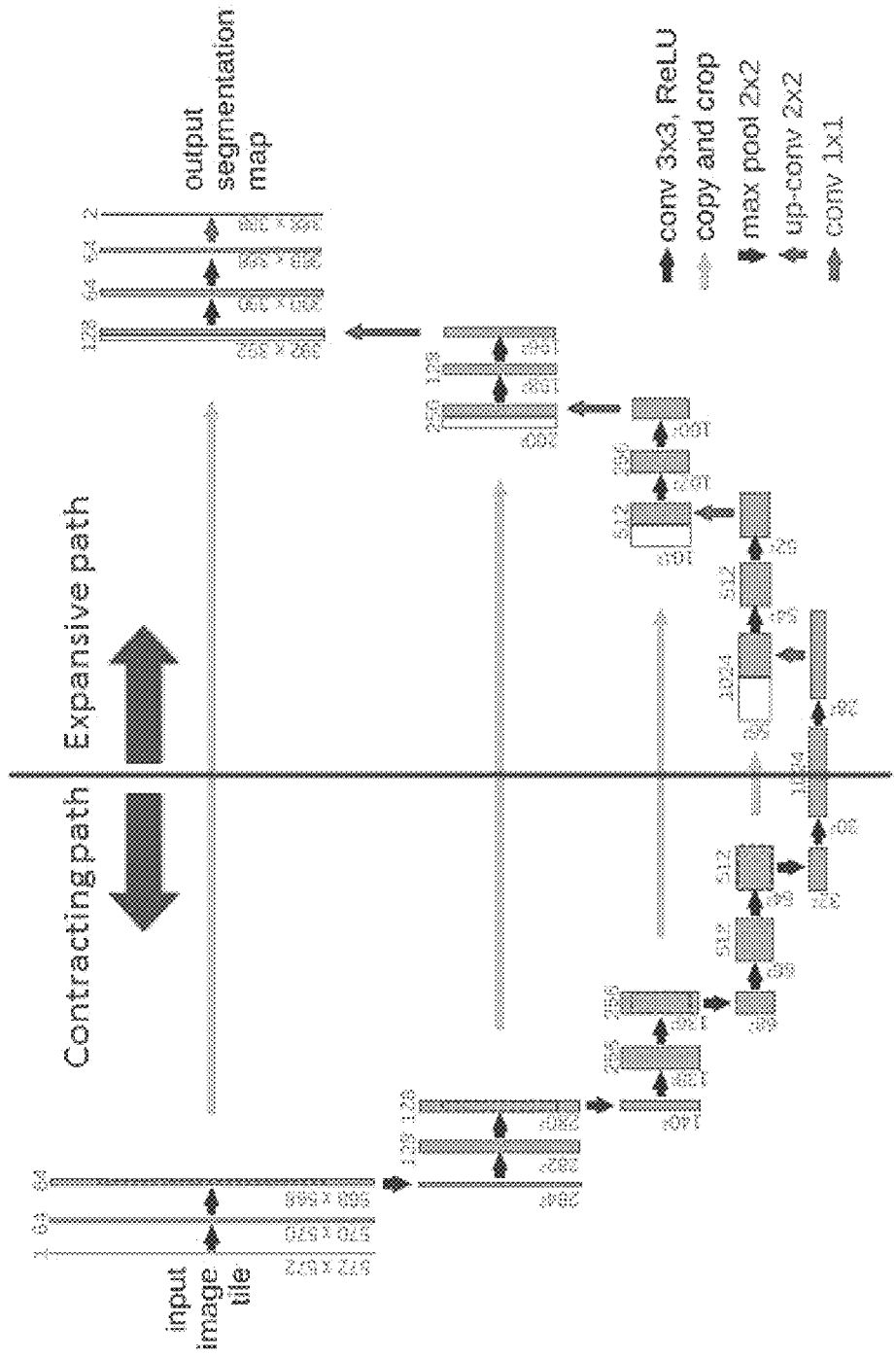
FIG. 6 is a schematic drawing of layers of an U-net.

Longer skip-connections were introduced in U-Net, illustrated in FIG. 6. The U-Net architecture stems from the so-called "fully convolutional network" first proposed by Long and Shelhamer. The main idea is to supplement a usual contracting network by successive layers, where pooling operations are replaced by upsampling operators. Hence these layers increase the resolution of the output. Moreover, a successive convolutional layer can then learn to assemble a precise output based on this information.

One important modification in U-Net is that there are a large number of feature channels in the upsampling part, which allow the network to propagate context information to higher resolution layers. As a consequence, the expansive path is more or less symmetric to the contracting path, and yields a u-shaped architecture. The network only uses the valid part of each convolution without any fully connected layers. To predict the pixels in the border region of the image, the missing context is extrapolated by mirroring the input image. This tiling strategy is important to apply the network to large images, since otherwise the resolution would be limited by the GPU memory.

Introducing skip connections allows to better capture features of different spatial resolution, which is successfully applied for computer vision tasks such as object detection and segmentation. However, implying such skip connections for the image or video compression is not trivial task since information from encoding side needs to be transferred in communication channels, and direct connection of the layers would require significant amount of data to be transferred.

Traditional Hybrid Video Encoding and Decoding

Neural network framework may be also employed in combination or within the traditional hybrid encoding and decoding as will be exemplified later. In the following a very brief overview is given regarding an exemplary hybrid encoding and decoding.

Figure 7A:
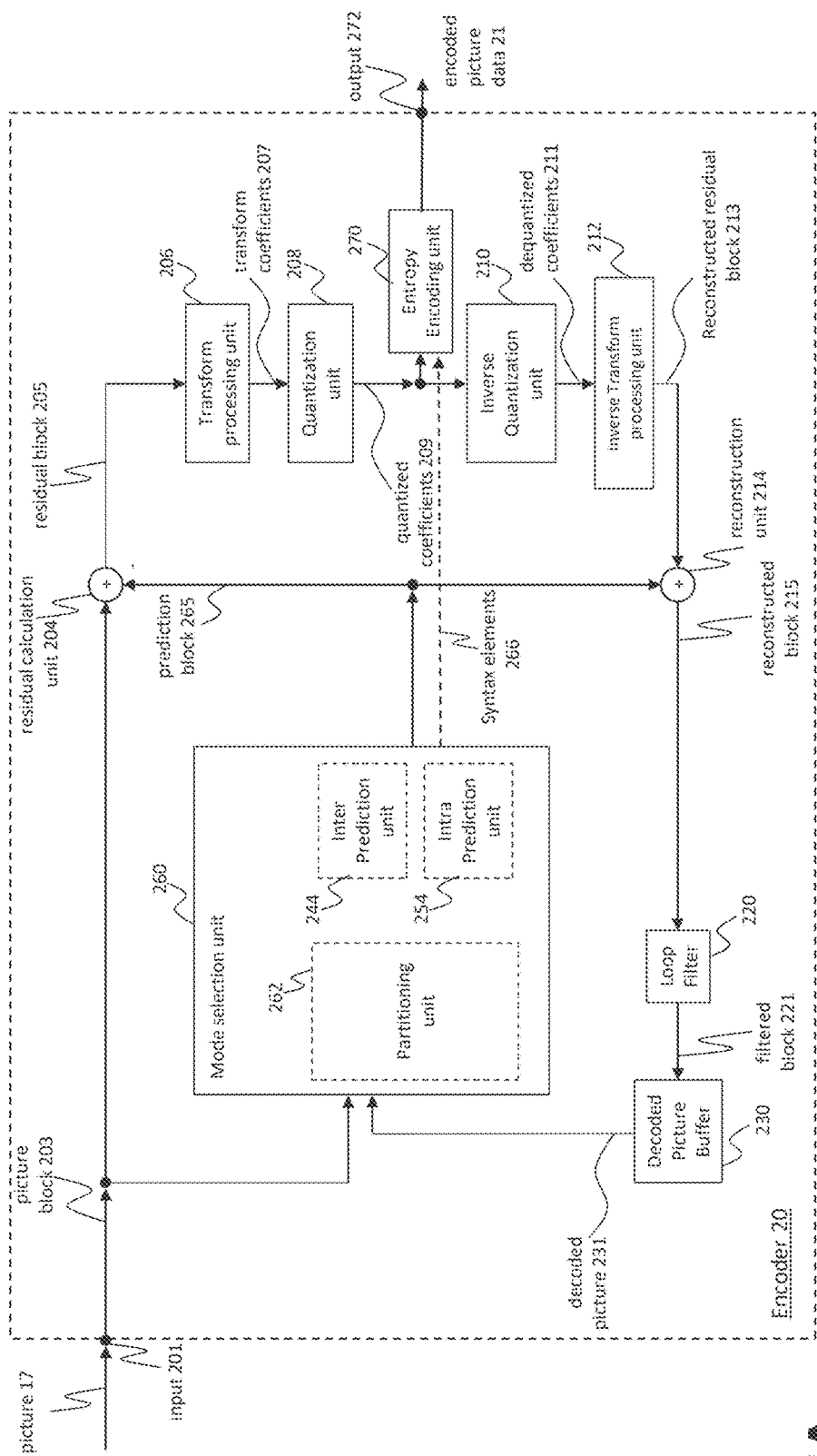
FIG. 7A is a block diagram illustrating an exemplary hybrid encoder.

FIG. 7A shows a schematic block diagram of an example video encoder 20 that is configured to implement the techniques of the present application. In the example of FIG. 7A, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 7A may also be referred to as hybrid video encoder or a video encoder according to a hybrid video codec.

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 7A) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks. The abbreviation AVC stands for Advanced Video Coding.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 7A may be configured to encode the picture 17 block by block, e.g. the encoding and prediction is performed per block 203.

Embodiments of the video encoder 20 as shown in FIG. 7A may be further configured to partition and/or encode the picture using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 7A may be further configured to partition and/or encode the picture using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Figure 7B:
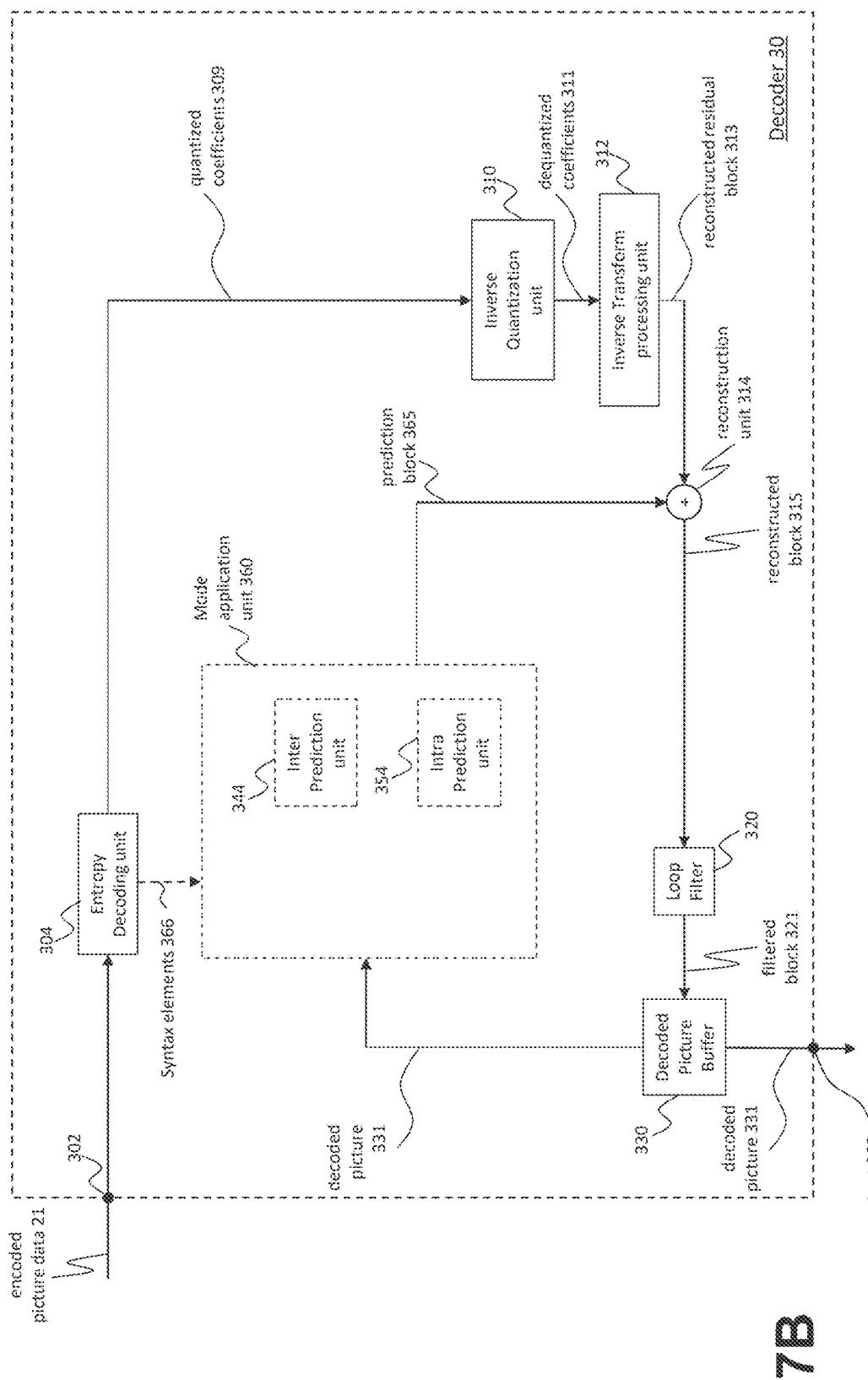
FIG. 7B is a block diagram illustrating an exemplary hybrid decoder.

FIG. 7B shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Embodiments of the video decoder 30 as shown in FIG. 7B may be configured to partition and/or decode the picture using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 7B may be configured to partition and/or decode the picture using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Increasing Coding Efficiency

As was mentioned above the image and video compression methods based on variational autoencoder approach suffers from absence of spatial adaptive processing and object segmentation targeting to capture real object boundaries. Therefore, the content adaptivity is limited. Moreover, for some types of video information such as motion information or residual information the sparse representation and coding is desirable to keep the signaling overhead at a reasonable level.

Thus, some embodiments of the present disclosure introduce the segmentation information coding and feature map coding from different spatial resolution layers of an autoencoder to enable content adaptivity and sparse signal representation and transmission.

In some exemplary implementation, connections are introduced between layers of encoder and decoder of other than lower resolution layer (latent space), which are transmitted in the bitstream. In some exemplary implementations, only part of feature maps of different resolution layers is provided in the bitstream to save the bandwidth. For example, signal selection and signal feeding logic is introduced to select, transmit and use parts of feature maps from different resolution layers. On the receiver side, tensor combination logic is introduced which combines output from previous resolution layer with information received from the bitstream corresponding to current resolution layer.

In the following, some detailed embodiments and exampled related to encoder side and decoder side are provided.

Encoding Methods and Devices

According to an embodiment, a method is provided for encoding data for picture or video processing into a bitstream. Such method comprises a step of processing the data, and this processing of the data comprises, in a plurality of cascaded layers, generating feature maps, each feature map comprising a respective resolution, wherein the resolutions of at least two of the generated feature maps differ from each other.

In other words, the resolutions of two or more of the cascaded layers may mutually differ. Here, when referring to a resolution of a layer, what is meant is a resolution of the feature map processed by the layer. In an exemplary implementation it is the resolution of the feature map output by the layer. A feature map comprising a resolution means that at least a part of the feature map has said resolution. In some implementation, the entire feature map may have the same resolution. Resolution of a feature map may be given, for example, by a number of feature map elements in the feature map. However, it may also be more specifically defined by number of feature map elements in one or more dimensions (such as x, y; alternatively or in addition, number of channels may be considered).

The term layer here refers to a processing layer. It does not have to be a layer with trainable or trained parameters (weights) as the layers of some neural networks mentioned above. Rather, a layer may represent a specific processing of the layer input to obtain a layer output. In some embodiments, the layer(s) may be trained or trainable. Training here refers to machine learning or deep learning.

When referring to cascaded layers, what is meant is that the layers have a certain predefined order (sequence) and an input to the first layer (in said given order) is sequentially processed by the first and then further layers according to the given order. In other words, an output of layer j is an input of layer j+1, with j being an integer from 1 to the total number of cascaded layers. In a specific and non-limiting example, layer j+1 comprises (or has) the same or lower resolution than layer j for all possible j values. In other words, the resolution of the layers does not increase (e.g. at the encoder side) with the sequence (order) of cascade (processing order). However, it is noted that the present disclosure is not limited to such specific cascaded layers. In some embodiments, the layers of the cascaded processing may also include layers which increase resolution. In any case, there may be layer which do not change resolution.

Lower resolution of a feature map may mean e.g. less feature elements per feature map. Higher resolution of a feature map may mean e.g. more feature elements per feature map.

The method further comprises a step of selecting, among the plurality of layers, a layer different from the layer generating the feature map of the lowest resolution and generating the bitstream including inserting into the bitstream information related to the selected layer.

In other words, in addition (or alternatively) to outputting into the bitstream the result of processing by all layers in the cascade, information to another (selected) layer is provided. There may be one or more selected layers. The information related to the selected layer may be any kind of information such as the output of the layer or some segmentation information of the layer (as will be discussed later) or other information also related to the feature map processed by the layer and/or to the processing performed by the layer. In other words, in some examples, the information can be elements of feature map and/or positions of the elements within the feature map (within the layer).

The input to the cascaded processing is the data for picture or video processing. Such data may be for example related to prediction coding such as inter or intra prediction. It may be motion vectors or other parameters of prediction, such as prediction modes or reference pictures or directions or other parts of coding apart from prediction such as transformation, filtering, entropy coding or quantization. The bitstream generating may include any conversion of the values into bits (binarization) including fixed-codeword, variable length code, or arithmetic coding.

Here, a picture may be a still picture or a video picture. Picture refers to a one or more samples such as samples captured by a camera or generated e.g. by computer graphics or the like. The picture may comprise samples which represent brightness level in gray scale, or may have several channels including one or more of luminance channel, chrominance channel(s), depth channel or other channels. The picture or video encoding may be any of hybrid coding (e.g. similar to HEVC or VVC or the like) or autoencoder as described above.

FIG. 8 is a flow diagram illustrating the above-mentioned method. Accordingly, the method includes a step 810 of processing of the input data. From the processed data, a portion is selected in a selection step 820 and included into the bitstream in a generating step 830. Not all data that are generated in the processing step have to be included into the bitstream.

According to an exemplary implementation, the processing further comprising downsampling by one or more of the cascaded layers. An exemplary network 900 implementing (in operation performing) such processing is shown in FIG. 9.

In particular, FIG. 9 shows an input data for image or video processing 901 entering the network 900. The input data for image or video processing may be any kind of data used for such processing, such as directly the samples of the image (picture) or video, prediction mode, motion vectors, etc. as already mentioned above. The processing in FIG. 9 applied to the input 901 takes place by a plurality of processing layers 911 to 913, each of which reduces the resolution of each motion vector array. In other words, the cascaded layers 911 to 913 are downsampling layers. It is noted that when a layer is referred to as a downsampling layer, then it performs downsampling. There are embodiments in which the downsampling layers 911 to 913 perform the downsampling as the only task; and there may embodiments in which the downsampling layers 911 to 913 do not perform the downsampling as the only task. Rather, the downsampling layer may also perform other kind of processing in general.

As can be seen in FIG. 9, the downsampling layers 911 to 913 have, apart from the processed data input and output, also an additional selection output leading to a signal selection logic 920. It is noted that the term "logic" here refers to any circuitry which implements the function (here the signal selection). The signal selection logic 920 selects information from the selection outputs of any of the layers, to be included into the bitstream 930. In the example of FIG. 9, each layer 911 to 913 downsamples the layer input. However, there may also be layers added in between the downsampling layers that do not apply downsampling. For instance, these layers may process the input by filtering or other operations.

In the example shown in FIG. 9, the signal selection logic 920 selects, from the output of layers 911 to 913 information that is included into the bitstream. A goal of this selection may be to select, from the plurality of feature maps outputted by the different layers, information that are relevant for reconstructing an image or video. In other words, the downsampling layers and the signal selection logic may be implemented as a part of an encoder (picture or video encoder). For example, the encoder may be encoder 101 shown in FIG. 3A, encoder 121 of FIG. 3B, MV Encoder Net (part of the End-to-end compression in FIG. 5A, MV encoder of FIG. 5B, or some part of the encoder according to FIG. 7A (e.g. part of loop filtering 220 or mode selection unit 260 or a prediction unit 244, 254), or the like.

FIG. 9 further includes a decoder-side part (which may be referred to as expansive path) including a signal feeding logic 940 and upsampling layers 951 to 953. Input of the encoder side is the bitstream 930. Output 911 is, e.g., the reconstructed input 901. Decoder side will be described in greater delay below.

Figures 10A, 10B:
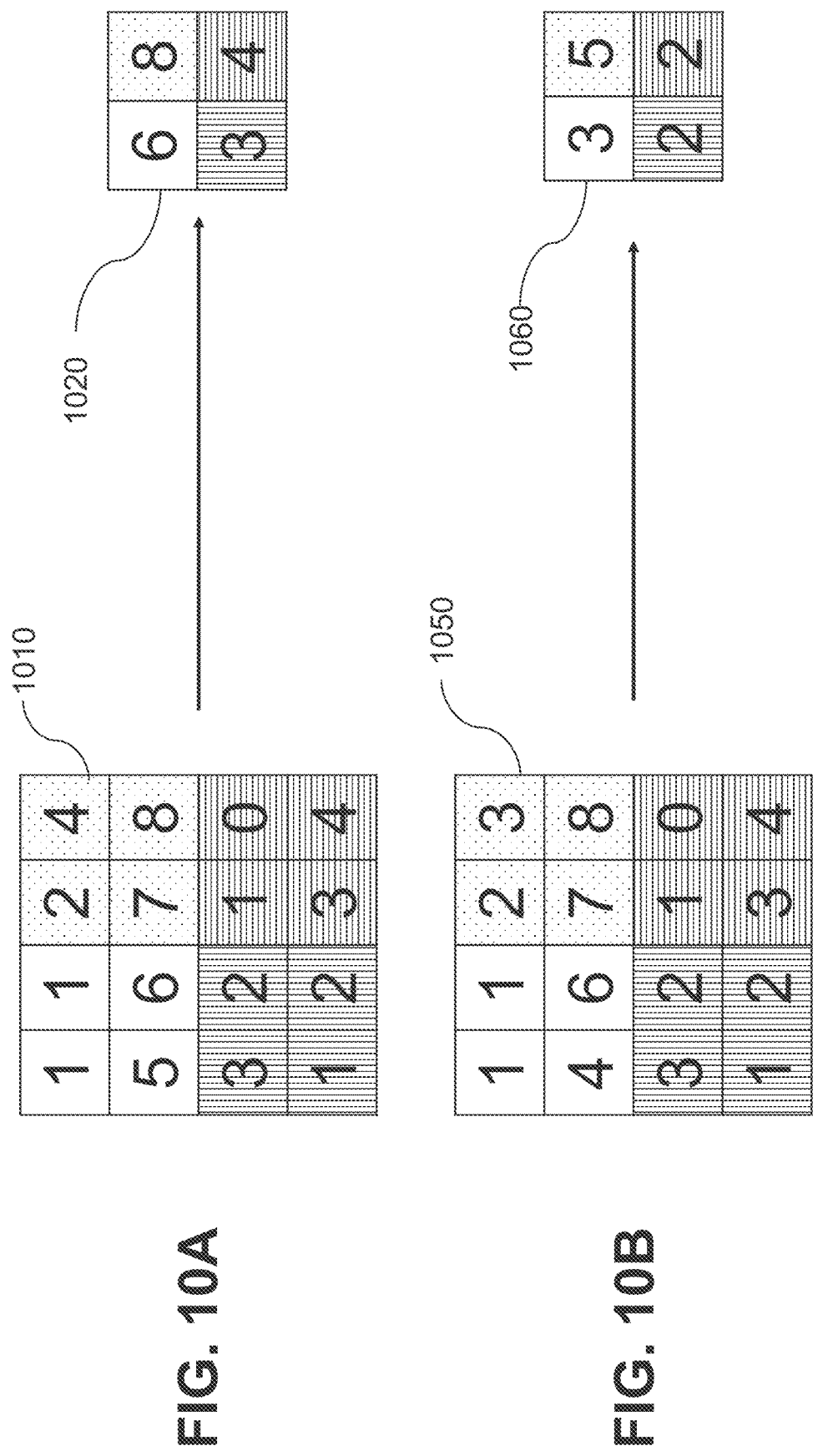

Downsampling may be done, for instance, via maximum (max) pooling, average pooling or any other operation that results in downsampling. Another examples of such operation include convolutional operations. FIG. 10A shows an example of max pooling. In this example, each (neighboring 2×2 square) four elements of an array 1010 are grouped and used to determine one element in array 1020. The arrays 1020 and 1010 may correspond to feature maps in some embodiments of the present disclosure. However, the arrays may also correspond to parts of feature maps of the present embodiment. The fields (elements) in the arrays 1020 and 1010 may correspond to elements of the feature maps. In this picture, feature map 1020 is determined by downsampling feature map 1010. The numbers in the fields of the arrays 1010 and 1020 are just exemplary. Instead of numbers, the fields may also, for instance, contain motion vectors. In the example of max pooling shown in FIG. 10A, the four fields in the upper left of array 1010 are grouped and the largest of their values is selected. This group of values determines the upper left field of array 1020 by assigning this field said largest value. In other words, the largest of the four upper left values of array 1010 are inserted into the upper left field of array 1020.

Alternatively, in some implementations, min pooling may be used. Instead of choosing the field with the largest value, the field with the smallest value is selected in min pooling. However, these downsampling techniques are just examples and various downsampling strategies can be used in different embodiments. Some implementations may use different downsampling techniques in different layers, in different regions within a feature map, and/or for different kind of input data.

In some implementations, the downsampling is performed with average pooling. In average pooling, the average of a group of feature map elements is calculated and associated with the corresponding field in the feature map of the downsampled feature map.

An example for average pooling is shown in FIG. 10B. In this example, the for feature map elements in the upper left of feature map 1050 are averaged, and the upper left element of feature map 1060 takes this averaged value. The same is shown for the three groups: upper right, lower right and lower left in FIG. 10B.

In another embodiment, convolutional operations are used for the downsampling in some or all of the layers. In convolutions, a filter kernel is applied to a group or block of elements in the input feature map. The kernel may itself be an array of elements with the same size as the block of input elements wherein each element of the kernel stores a weight for the filter operation. In the downsampling, the sum of the elements from the input block, each weighted with the corresponding value taken from the kernel, is calculated. If the weights for all elements in the kernel are fixed, such a convolution may correspond to a filter operation described above. For instance, a convolution with a kernel with identical, fixed weights and a stride of the size of the kernel corresponds to an average pooling operation. However, the stride of a convolution used in the present embodiment may be different from the kernel size and the weights may be different. In an example, the kernel weights may be such that certain features in the input feature map may be enhanced or distinguished from each. Furthermore, the weights of the kernel may be learnable or learned beforehand.

According to an embodiment, the information related to the selected layer includes an element 1120 of a feature map of that layer. For example, the information may convey feature map information. In general, the feature map may include any features related to the motion picture.

Figure 11:
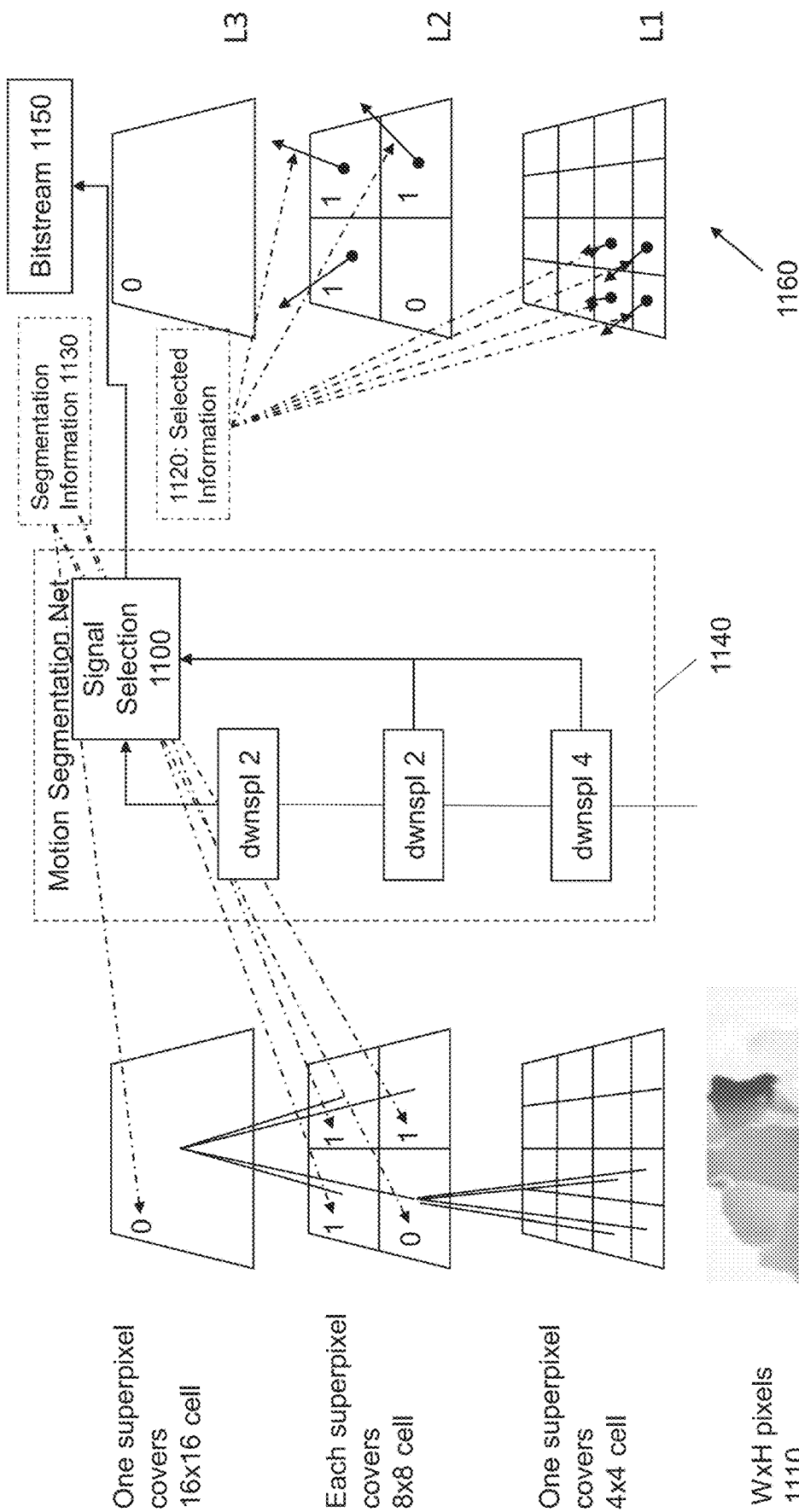
FIG. 11 is a schematic drawing illustrating processing of a feature map and segmentation information by an exemplary encoder side.

FIG. 11 illustrates an exemplary implementation, in which the feature map 1110 is a dense optical flow of motion vectors with a width W and a height H. Motion segmentation net 1140 includes three downsampling layers (e.g. corresponding to the downsampling layers 911-913 in FIG. 9) and a signal selection circuitry (logic) 1100 (e.g. corresponding to the signal selection logic 920). FIG. 11 shows an example for the outputs (L1-L3) of different layers in the contracting path on the right hand side.

In this example, the output (L1-L3) of each layer is a feature map with a gradually lower resolution. The input to L1 is the dense optical flow 1110. In this example, one element of a feature map output from L1 is determined from sixteen (4×4) elements of the dense optical flow 1110. Each square in the L1 output (bottom right of FIG. 11) corresponds to a motion vector obtained by downsampling (downspl4) from the sixteen motion vectors of the dense optical flow. Such downsampling may be for instance an average pooling or another operation, as discussed above. In this exemplary implementation, only a part of the feature map L1 of that layer is included in the information 1120. Layer L1 is selected and the part, corresponding to four motion vectors (feature map elements) related to the selected layer, is signaled within the selected information 1120.

Then the output L1 of the first layer is input to the second layer (downspl2). An output L2 feature map element of the second layer is determined from four elements of L1. However, in other examples, each element of feature map with a lower resolution may also be determined by a group consisting of any other number of elements of the feature map with the next higher resolution. For instance the number of elements in a group that determine one element in the next layer may also be any power of 2. In the present example, the output L2 feature map corresponds to three motion vectors which are also included in the selected information 1120 and thus the second layer is a selected layer, too. A third layer (downspl2) downsamples the output L2 from the second layer by 2 in each of the two dimensions. Accordingly, one feature map element of the output L3 of the third layer is obtained based on four elements of L2. In the feature map L3, no element is signaled, i.e. the third layer is not a selected layer in this example.

Signal selection module 1100 of the motion segmentation net 1140 selects the above mentioned motion vectors (elements of feature maps from the outputs of the first and second layer) and provides them to the bitstream 1150. The provision may be a simple binarization, which may, but does not have to include entropy coding.

Groups of elements may be arranged in a square shape as in the example of FIG. 11. However, the groups may also be arranged in any other shape like, for instance, a rectangular shape wherein the longer sides of the rectangular shape may be arranged in a horizontal or in a vertical direction. These shapes are just examples. In an implementation an arbitrary shape may be used. This shape may be signaled within the bitstream 1150, too. The signaling may be implemented by a map of flags indicating which feature elements belong to the shape and which do not. Alternatively, the signaling may be done using a more abstract description of the shape.

In this exemplary implementation, the feature map elements are grouped such that every element belongs to exactly one group of elements that determine one element of a feature map of the next layer. In other words, the feature map element groups are non-overlapping and only one group contributes to a feature map element of a higher (later in the cascaded processing order) layer. However, it is conceivable that elements of one layer may contribute to more than one element of the next layer. In other words, in the processing 810, when a new layer output, for instance layer output L2, is generated based on a layer output L1 with a higher resolution, a filter operation may be used.

In the present embodiment, the selecting 820 (e.g. by means of a signal selection 1100) selects, from the plurality of output feature maps (L1-L3), elements to be included into the bitstream. The selection may be implemented such that the amount of data that are needed to signal the selected data is low while keeping the amount of information that are relevant for decoding as large as possible. For instance, rate-distortion optimization, or other optimization may be employed.

The above-described example shows processing by three layers. In general, the method is not limited thereto. Any number of processing layers (one or more) may be employed. In other words, according to a more generalized example, the method comprises obtaining the data to be encoded. This may be the dense flow 1110 of motion vector, as shown above. However, the present disclosure is not limited thereto, and instead or in addition to motion vectors, other data may be processed, such as prediction modes, prediction directions, filtering parameters, or even spatial picture information (samples) or depth information or the like.

The processing 810 of the data to be encoded includes in this example processing by each layer j of the plurality N of cascaded layers. The processing by the j-th layer comprises:
- obtaining as a layer input the data to be encoded if j=1, and otherwise obtaining as a layer input a feature map processed by the (j−1)-th layer (i.e. if j-th layer is a currently processed layer, then j−1 is the preceding layer);
- processing the obtained layer input, the processing including downsampling; and
- outputting the downsampled feature map.

In this example, j=1 is the highest-resolution layer among the N processing layers. It is noted that the input of this layer may be the dense optical flow (which may be also considered in a general manner as a feature map). Thus, in some specific embodiments, the j=1 layer may be the input layer. However, this is not necessarily the case, because it is conceivable that the N processing layers are preceded by some pre-processing layers. It is typically a feature of an encoder that the earlier processing layers have higher resolution than the later processing layers (contracting path). This may be correspondingly reversed at the decoder side. It is conceivable that some of the processing layers do not change the resolution or even enhance the resolution-still the present disclosure may be applicable.

In the above described example, the bitstream 1150 carries the selected information 1120. It can be, for instance the motion vectors or any other features. In other words, the bitstream 1150 carries feature map elements from at least one layer which is not the output layer of the processing network (encoder-side processing network). In the Example of FIG. 11, only a part of the selected feature map is conveyed within the bitstream. The part has one or more feature elements. In order to enable decoder to determine which part of the feature map is transmitted, a rule for determination may be defined. In some embodiments, a segmentation information may be conveyed in the bitstream 1150 to configure which parts of the feature map are conveyed. Such exemplary embodiments will be described in the following. However, it is noted that the above-described embodiment is only exemplary and that in general no such additional signalization is necessary, as there may be a rule for deriving the information and depending on other known or signaled parameters.

In an exemplary embodiment relating to the segmentation information, the information related to the selected layer includes (in addition or alternatively to the selected information 1120) information 1130 indicating from which layer and/or from which part of the feature map of that layer the element of the feature map of that layer was selected.

In the example shown in FIG. 11, the segmentation information is illustrated by means of binary flags. For example, on the right hand side, each lower resolution feature map or feature map part has either 0 or 1 assigned. For example, L3 has assigned a zero (0) because it is not selected and no motion vectors (feature elements) are signaled for L3. Feature map L2 has four parts. Layer processing L2 is a selected layer. Feature map elements (motion vectors) of three of the four parts are signaled, and, correspondingly, the flags are set to 1. The remaining one part of the feature map L2 does not include motion vector(s) and the flag is thus set to 0, because the motion vectors corresponding to that part are indicated by the L1 feature map. Since L1 is the first layer, it is implicit that the remaining motion vectors are provided in this layer. It is noted that the binary flag here takes a first value (e.g. 1) when the corresponding feature map part is part selected information and takes a second value (e.g. 0) when the corresponding feature map part is not part selected information. Since it is a binary flag, it can take one of only these two values.

Such segmentation information may be provided in the bitstream. Left hand side of FIG. 11 illustrates the processing of the segmentation information 1130. It is noted that the segmentation information 1130 may be also processed by layers of the motion segmentation net 1140. It may be processed in the same layers as the feature maps or in separate layers. The segmentation information 1130 may be also interpreted as follows. One superpixel of the layer with the lowest resolution covers 16×16 cell of a feature map obtained by downsampling downspl4 of the dense optical flow 1110. Since the flag assigned with the superpixel covering the 16×16 cell is set to 0, it means that feature map element(s)—here a motion vector—is not indicated for this layer (the layer is not selected). Thus, the feature map elements can be indicated in the area corresponding to 16×16 cell of the next layer, which is represented by four equally sized superpixels each covering a cell of 8×8 feature elements. Each of these four superpixels is associated a flag. For those superpixels associated with a flag having value 1, the feature map elements (motion vectors) are signaled. For the superpixel with flag set to 0, motion vectors are not signaled. The not signaled motion vectors are signaled for the layer with superpixels covering the cell of 4×4 elements.

In more general terms, the method for encoding data for picture/video decoding may further comprise selecting (segmentation) information for inserting into the bitstream. The information relates to a first area (superpixel) in a feature map processed by a layer j>1. The first area corresponds to an area in the feature map or initial data to be encoded in a layer smaller than j that includes a plurality of elements. The method further includes a step of excluding, from the selection in feature maps processed by layers k, wherein k is an integer equal to or larger than 1 and k<j, areas that correspond to the first area from being selected. The corresponding of areas between different layers means herein that the corresponding areas (superpixels) spatially cover the same feature elements (initial data elements) in the feature map (initial data) to be encoded. In the example of FIG. 11, the initial data which are segmented are the L1 data. However, the correspondence may be taken also with reference to the dense optical flow 1110.

With the particular arrangement in FIG. 11 it is ensured that each feature element of the initial feature map (e.g. L1) is covered by only one superpixel of only one among the N layers. This arrangement provide an advantage of efficiently coding the feature map as well as the segmentation information. The cascaded layer processing framework corresponds to neural network processing frameworks and can be used in this way to segment the data and providing the data of various segments with different resolution. In particular, advantages of downsampling in some of the layers may include reducing the amount of data that are needed to signal a representation of the initial feature map. Specifically, in the example of signaling motion vectors, groups of similar motion vectors may be signaled by one common motion vector due to the downsampling. However, the prediction error caused by grouping motion vectors should be small in order to achieve a good inter prediction. This may mean that for different areas of a picture a different level of grouping the motion vectors might be optimal for achieving a desired prediction quality and, at the same time, require a small amount of data for signaling the motion vectors. This may be achieved using a plurality of layers with different resolution.

In an embodiment where the feature map elements are motion vectors, the length and the direction of the motion vectors may be averaged for the purpose of downsampling, and the averaged motion vector is associated with the corresponding feature map element of the downsampled feature map. In a usual averaging, all elements of the group of elements that correspond to one element in the downsampled feature map have the same weight. This corresponds to applying a filter with equal weights to the group, or block, of elements to calculate the downsampled feature map element. However, in other implementations, such a filter may have different weights for different elements in the layer input. In other implementations, instead of calculating the average of a group or block of elements in the downsampling, the median of the group of respective elements may be calculated.

In the example of FIG. 11, downsampling filter operations use filter with a square shape of the size 2×2 of input elements and, depending on the chosen filter operation, calculates the filter output which is mapped to one element in the downsampled feature map. The filter operation uses a stride of two that equals to the edge length or the square-shaped filter. This means that, between two filtering operations, the filter is moved by a stride of the same size as the filter. As a consequence, in the downsampling the downsampled elements are calculated from non-overlapping blocks in the layer to which the downsampling filter is applied.

However, in some further conceivable embodiments, the stride may differ from the edge length of the filter. For instance, the stride might be smaller than the length of the edge of the filter. Consequently, the filter blocks used to determine the elements in the downsampled layer may overlap, meaning that one element from the feature map that is to be downsampled contributes to the calculation of more than one element in the downsampled feature map.

In general, the data related to the selected layer includes an indication of the position of the feature map element in the feature map of the selected layer. Here, similarly to the notion of FIG. 11 (feature maps L1-L3), the feature map of the selected layer refers to an output from the selected layer, i.e. to a feature map processed by the selected layer.

For example, the positions of selected and non-selected feature map elements are indicated by a plurality of binary flags, the indicating being based on the positions of the flags in the bitstream. In the above description referring to FIG. 11, the binary flags are included as segmentation information 1130 into the bitstream 1150. In order to enable a decoder to parse and correctly interpret the segmentation information, the assignment between the flags and layers and/or areas within the feature maps processed by the layers should be defined. This may be done by defining the order of binarizing the flags which would be known to both encoder and decoder.

The above examples have been provided for data used in encoding the picture/video being motion vectors. However, the present disclosure is not limited to such embodiments. In an embodiment, the data to be encoded comprises image information and/or prediction residual information and/or prediction information. Image information here means sample values of the original image (or image to be coded). The sample values may be samples of one or more color or other channels.

The information related to the selected layer is not necessarily a motion vector or a motion vector of a superpixel. In addition or alternatively, in some embodiments, the information includes prediction information. The prediction information may include a reference index and/or prediction mode. For example, the reference index may indicate, which particular picture from the reference picture set should be used for the inter prediction. The index may be relative to the current image in which the current block to be predicted is located. The prediction mode may indicate, e.g., whether to use single or multiple reference frames and/or combination of different predictions like combined intra-inter prediction or the like.

Figure 12:
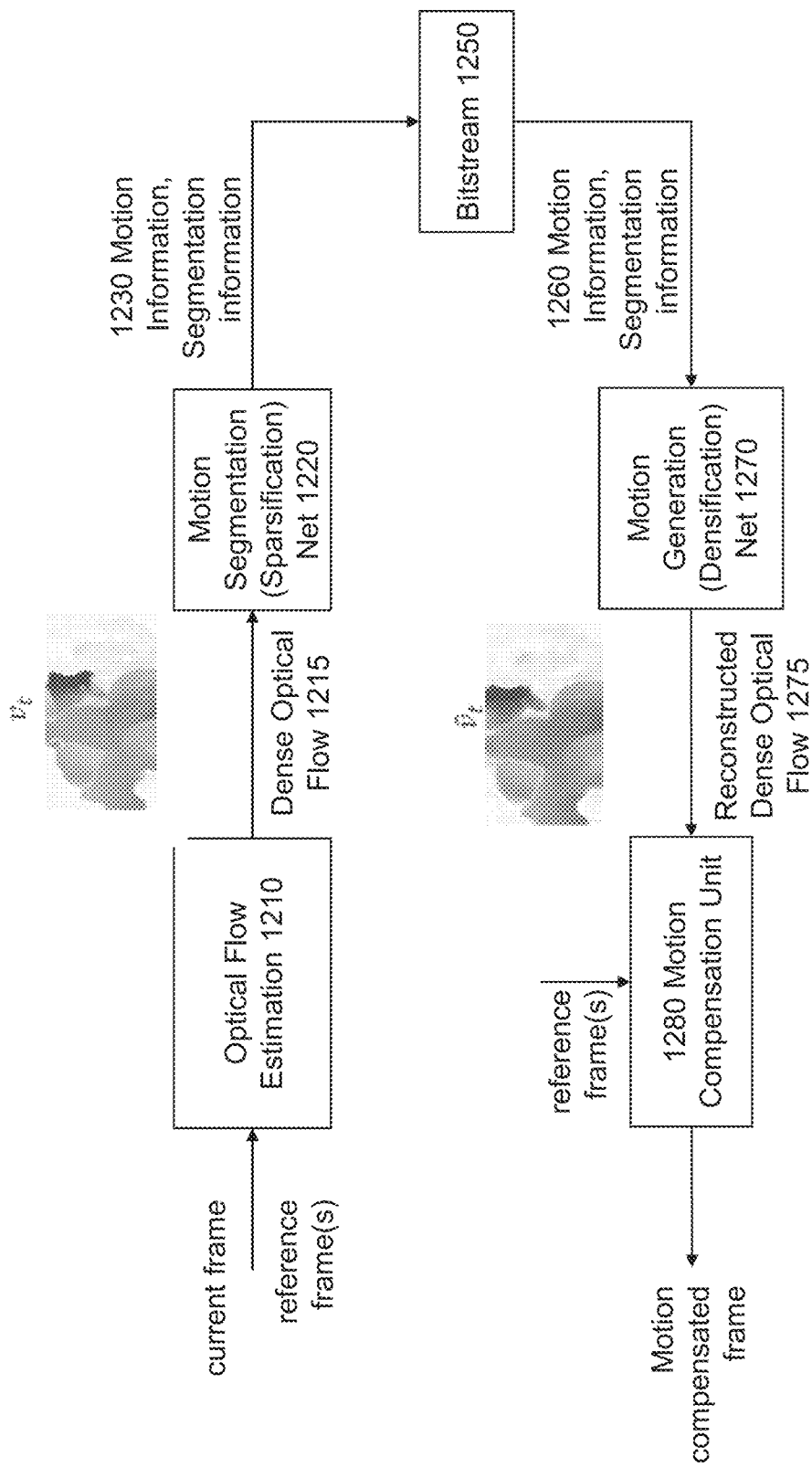
FIG. 12 is a block diagram illustrating a generalized processing of motion information feature map by an encoder side and a decoder side.

Nevertheless, when the data to be encoded is a motion vector field, an efficient motion vector field coding and reconstruction may be achieved. A corresponding general block scheme of a device which may performed such encoding and decoding of a motion field is illustrated in FIG. 12. On the encoding side the motion information is obtained using some motion estimation or an optical flow estimation module (unit) 1210. Input to the motion vector (optical flow) estimation is a current picture and one or more reference pictures (stored in reference picture buffer). In FIG. 12, picture is referred to as "frame" a term used sometimes for a picture of a video. The optical flow estimation unit 1210 outputs an optical flow 1215. In different implementations, the motion estimation unit may output motion information already with different spatial resolution, e.g. for some N×N block or for each pixel of original resolution, which can be called as dense optical flow. The motion vector information is intended to be transmitted (embedded into the bitstream 1250) to the decoding side and used for motion compensation. To obtain motion compensated regions each pixel of the region should have defined motion vector. Transmitting motion vector information for each pixel of original resolution may be too expensive. To reduce signaling overhead the motion specification (or segmentation) module 1220 is used. The corresponding module 1270 at the decoding side performs the motion generation (densification) task to reconstruct the motion vector field 1275. The motion specification (or segmentation) module 1220 outputs the motion information (e.g. motion vectors, and/or possibly reference pictures) and the segmentation information. This information is added (encoded) into the bitstream.

Figure 13:
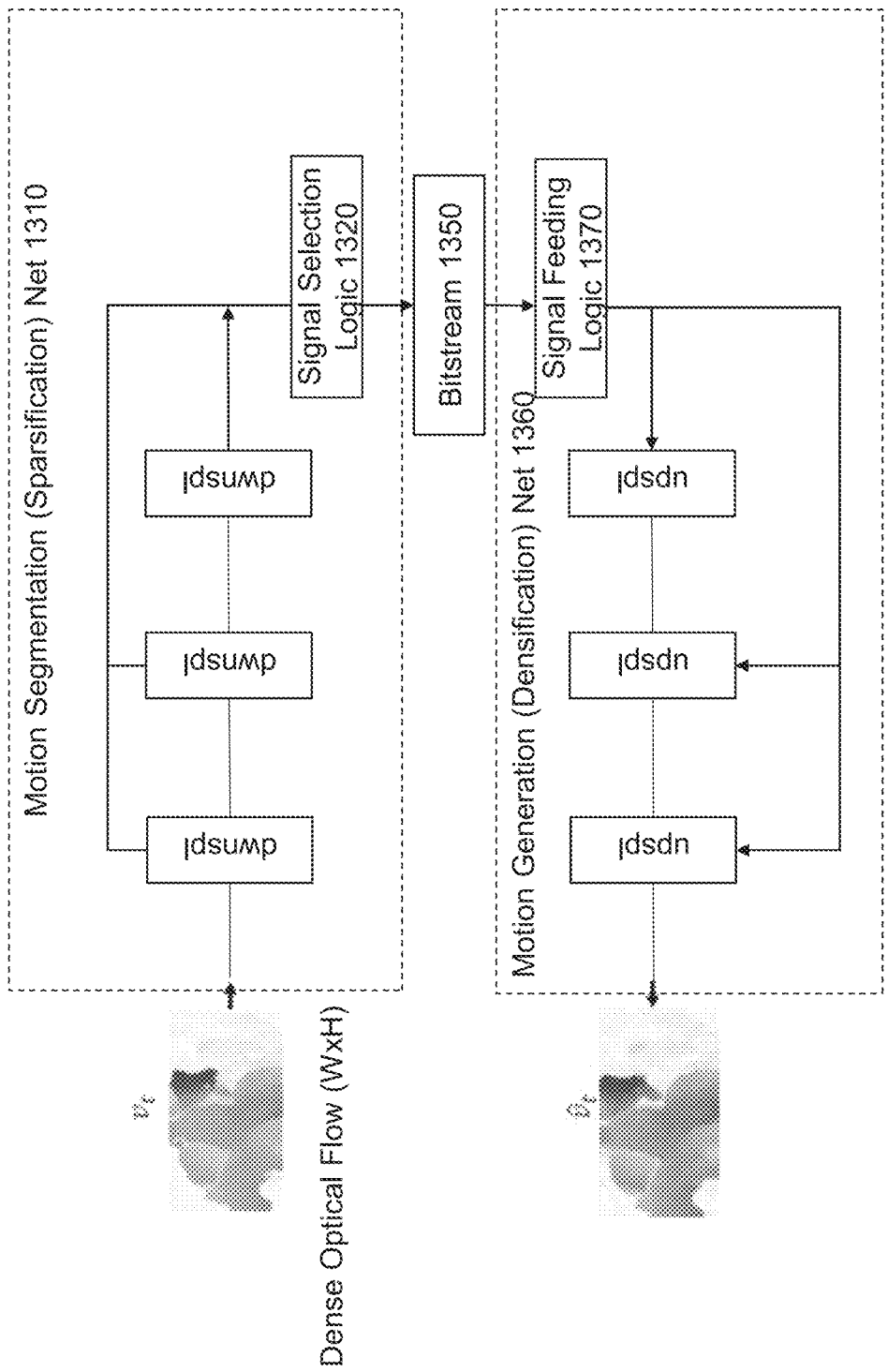
FIG. 13 is a block diagram illustrating a structure of a network transferring information from layers of different resolution in the bitstream for processing motion vector related information.

In this embodiment Motion Segmentation 1220 unit and Motion Generation 1270 unit contain only downsampling layers dwnspl and the corresponding upsampling layers upspl as is illustrated in FIG. 13. The nearest neighbor method may be used for downsampling and upsampling; and average pooling may be used for downsampling. The feature map data from the layers of different spatial resolutions are selected by the encoder and transmitted in the bitstream as the selected Information 1120 along with the segmentation information 1130, which instructs the decoder how to interpret and utilize the selected Information 1120. The Motion Segmentation (Sparsification) Net 1220 is illustrated in FIG. 13 as network 1310. Accordingly, the Dense Optical Flow 1215 is inserted into the Motion Segmentation (Sparsification) Net 1310. The net 1310 includes three downsampling layers and the Signal Selection Logic 1320 which selects information to be included into the bitstream 1350. The functionality is similar as already discussed with reference to the more general FIG. 9.

In the above-mentioned embodiments, signaling of information related to a layer different from the output layer improves the scalability of the system. Such information may be information relating to hidden layers. In the following, embodiments and examples are presented which concern exploiting the scalability and flexibility provided. In other words, some approaches on how to select the layer and how the information may look like are provided.

Some of the embodiments herein show image or video compression system which use autoencoder architecture that comprises one or several dimensionality (or spatial resolution) reduction steps (implemented by layers incorporating down-sampling operation) in the encoding part. Along with the reduction (encoding) side, a reconstructing (decoding) side is learnt, where the autoencoder tries to generate from the reduced encoding a representation as close as possible to its original input, which normally implies one or several resolution increasing steps (implemented by layers incorporating up-sampling operation) on the decoding side.

Here and after, under encoder, the encoding part of the autoencoder that generates the latent signal representation included into the bitstream is meant. Such encoder is, for example, 101 or 121 mentioned above. Under decoder, the generative part of autoencoder perceiving latent signal representation obtained from the bitstream is meant. Such decoder is, for instance, decoder 104 or 144 mentioned above.

As already described with reference to FIG. 11, the encoder selects a part (or parts) of feature map information (selected information 1120) from layers of different spatial resolution, according to the signal selection logic 1100 and transmits the selected Information 1120 in the bitstream 1150. The segmentation information 1130 indicates from which layer and which part of the feature map of corresponding layer the selected Information was taken.

According to an embodiment, the processing by a layer j of the plurality N of cascaded layers comprises:
- determining a first cost resulting from reconstructing a portion of a reconstructed picture using a feature map element output by the j-th layer,
- determining a second cost resulting from reconstructing the portion of the picture using feature map elements output by the (j−1)-th layer;
- if the first cost is higher than the second cost, selecting the (j−1)-th layer and selecting information relating to said portion in the (j−1)-th layer.

The decision which layer to select may be performed based on the distortion or based on a function of distortion. For example, for motion vector field coding the reconstructed picture (or picture part) may be motion compensated picture (or picture part).

To select the selected information in this exemplary implementation encoder comprises a cost calculation unit (module) which estimates a cost of transmitting motion information from a particular resolution layer at a certain position. The cost is calculated with distortion caused by motion compensation with the selected motion vector combined with estimation of amount of bits required for transmission the motion information multiplied by Lagrange multiplier. In other words, according to an embodiment, a rate-distortion optimization (RDO) is performed.

In other words, in some embodiments the first cost and the second cost include an amount of data and/or distortion. For example, the amount of data includes the amount of data required to transmit the data related to the selected layer. This may be motion information or other information. It can also be or include the overhead caused by the residuals coding. The distortion is calculated by comparing a reconstructed picture with a target picture (original picture to be encoded or a part of such picture to be encoded). It is noted that RDO is only one possibility. The present disclosure is not limited to such an approach. In addition, complexity or other factors may be included into the cost function.

Figure 14:
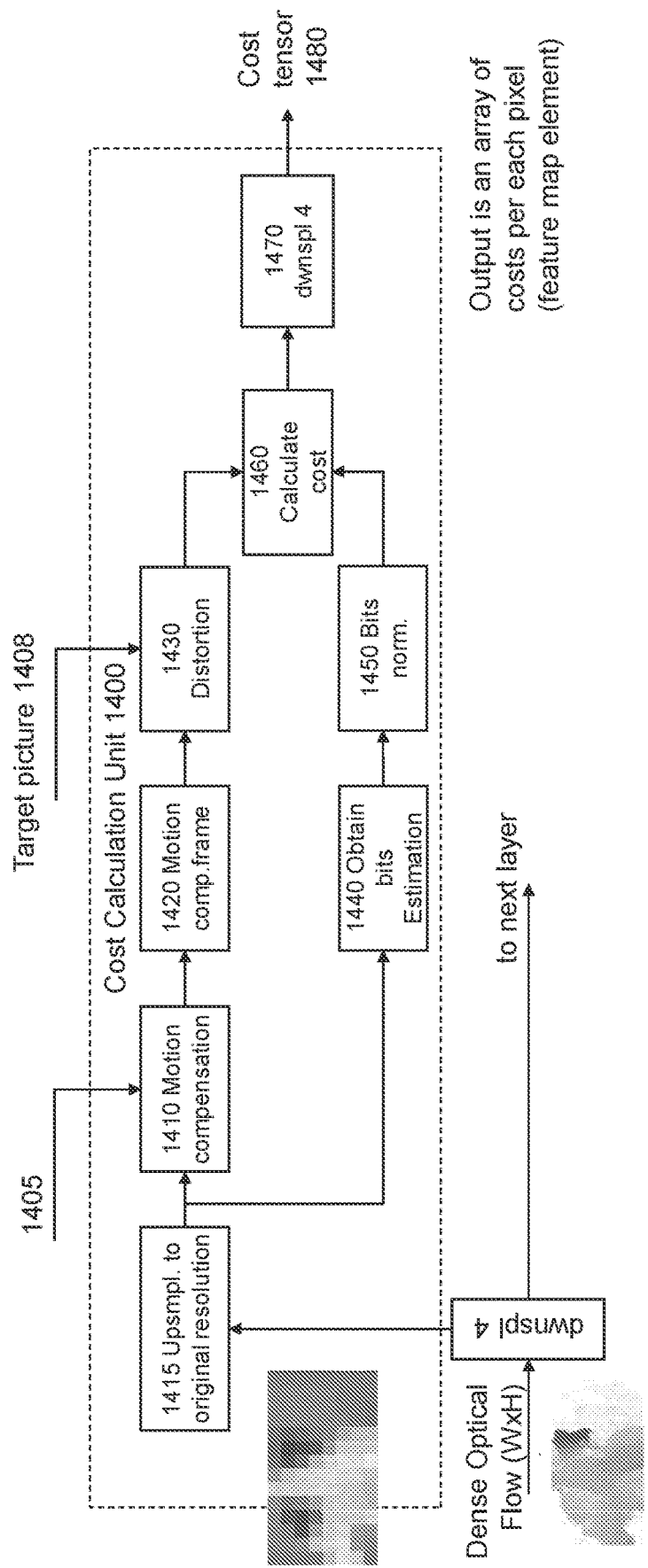
FIG. 14 is a block diagram illustrating an exemplary cost calculation unit with a higher cost tensor resolution.

FIG. 14 shows a first part of the cost calculation. In particular, the cost calculation (or estimation) unit 1400 obtains the optical flow L1 downsampled by a downsampling layer (downspl4) of the motion segmentation unit 1140. The cost calculation unit 1400 then upsamples 1415 the optical flow to its original resolution, e.g. in this case it is upsampling by 4 in each of the two directions (x and y). Then, perform motion compensation 1420 is performed using the upsampled motion vectors output from 1410 and reference picture(s) 1405 to obtain motion a compensated frame (picture) or a part of the motion compensated frame (picture) 1420. The distortion is then calculated 1430 by comparing the motion compensated picture (part) 1420 with a target picture 1408. The target picture 1408 may be, for instance, the picture to be coded (original picture). In some exemplary implementation, the comparison may be performed by calculating a mean squared error (MSE) or a sum of absolute differences (SAD) between the target picture 1408 and the motion compensated picture 1420. However, other types of measures/metrics may be used alternatively or in addition, such as more advanced metrics targeted to subjective perception like MS-SSIM or VMAF. The calculated distortion 1430 is then provided to the cost calculation module 1460.

Moreover, a rate estimation module 1440 calculates estimation of the amount of bits for each motion vector. The rate estimate may include not only bits used to signal the motion vectors, but also bits used for indicating segmentation information (in some embodiments). The so obtained number of bits may be normalized 1450, e.g. per pixel (feature map element). The resulting rate (amount of bits) is provided to the cost calculation module 1460. To obtain the rate (amount of bits) estimation, the evaluation of the amount of bits for each motion vector transmission is performed e.g. using a motion information coding module (e.g. by performing the coding and noting the resulting amount of bits) or in some simplified implementation using length of the motion vector of its x or y component as a rough estimation. Another estimation technique may be applied. To take into account segmentation information it may be evaluated by segmentation information coding module (e.g. by generating and coding the segmentation information and counting the number of the resulting bits) or in a simpler implementation by adding one bit to a total bits amount.

A next step of cost calculation in this example is cost calculation 1460 followed by a downsampling 1470 by four (downspl 4), to the resolution of corresponding downsampling layer of the motion segmentation unit 1100. Only one motion vector can possibly be transmitted for each point (picture sample value). The resulting cost tensor may thus have the corresponding size (dimensions). Thus, the bits evaluation value may be normalized by square of the downsampling filter shape (e.g. 4×4).

Then next, using the Lagrange multiplier, the cost estimation unit 1460 calculates the cost, e.g. using formula $$\text{Cost} = D + \lambda * R, \text{ or Cost} = R + \beta * D$$

wherein D denotes the distortion (calculated by 1430), R bits estimation (rate estimation output by 1440 or 1450), and A and B are Lagrange multipliers. The downsampling 1470 outputs a cost tensor 1480. As is known in the art, the Lagrange multipliers and A and B may be obtained empirically.

As a result the tensor 1480 with cost estimation for each position in the feature map (in this case W×H position of the dense optical flow) is obtained. It should be noted that using sequential average pooling and upsampling with nearest neighbor method results to averaging the motion vector in an N×N (e.g. 4×4) area where N×N is the average pooling filter shape and scaling factor for the upsampling operation. During upsampling using nearest neighbor method, the value from a lower resolution layer is duplicated (repeated) in all points of higher resolution layer corresponding to the filter shape. This corresponds to a translational motion model.

Figure 15:
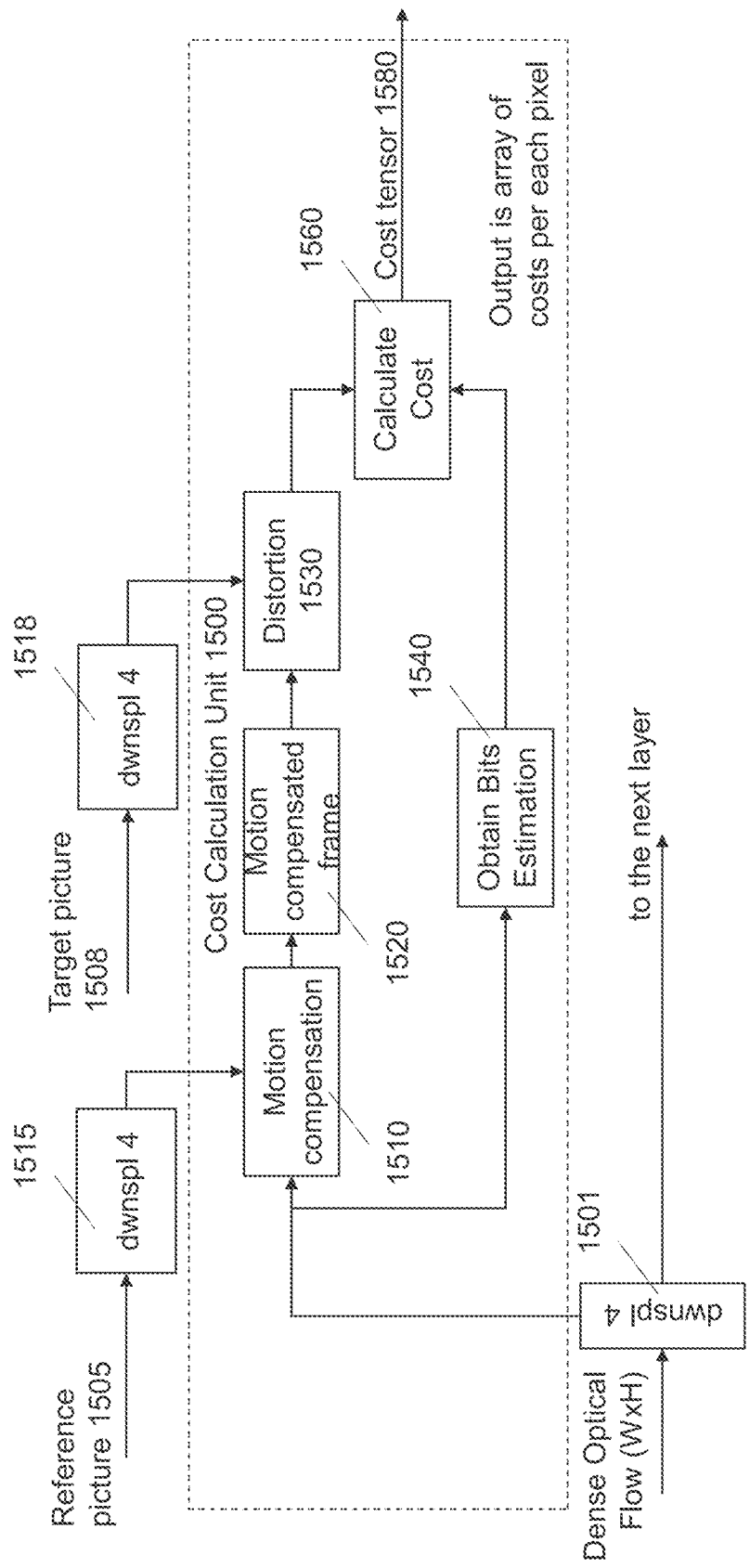
FIG. 15 is a block diagram illustrating an exemplary cost calculation unit with a lower cost tensor resolution.

Various implementations of cost selection unit are possible. For example, FIG. 15 shows another exemplary implementation. In this example, unlike FIG. 14, the motion vector field, obtained after downsampling 1501 of the dense optical flow by four in each of the x and y dimension, is not upsampled 1415. Rather, it is directly provided for motion compensation 1510 and for estimating rate 1540. Instead, the reference picture 1505 and the target picture 1505 can be downsampled 1515, 1518 to the corresponding resolution before motion compensation 1510 and distortion evaluation 1530. This leads to excluding of the step of initial motion field upsampling 1415 to original resolution in FIG. 14 as well as to excluding the concluding cost downsampling step 1470 of FIG. 14. That makes also unnecessary the bits normalization 1450. This implementation may require less memory to store the tensors during the processing, but may provide less accurate results. It is noted that in order to speed up or reduce complexity of the RDO, it is conceivable to downsample the dense optical flow as well as the reference and target picture even more than done by the L1. However, the accuracy of such RDO may be further reduced.

Figure 16:
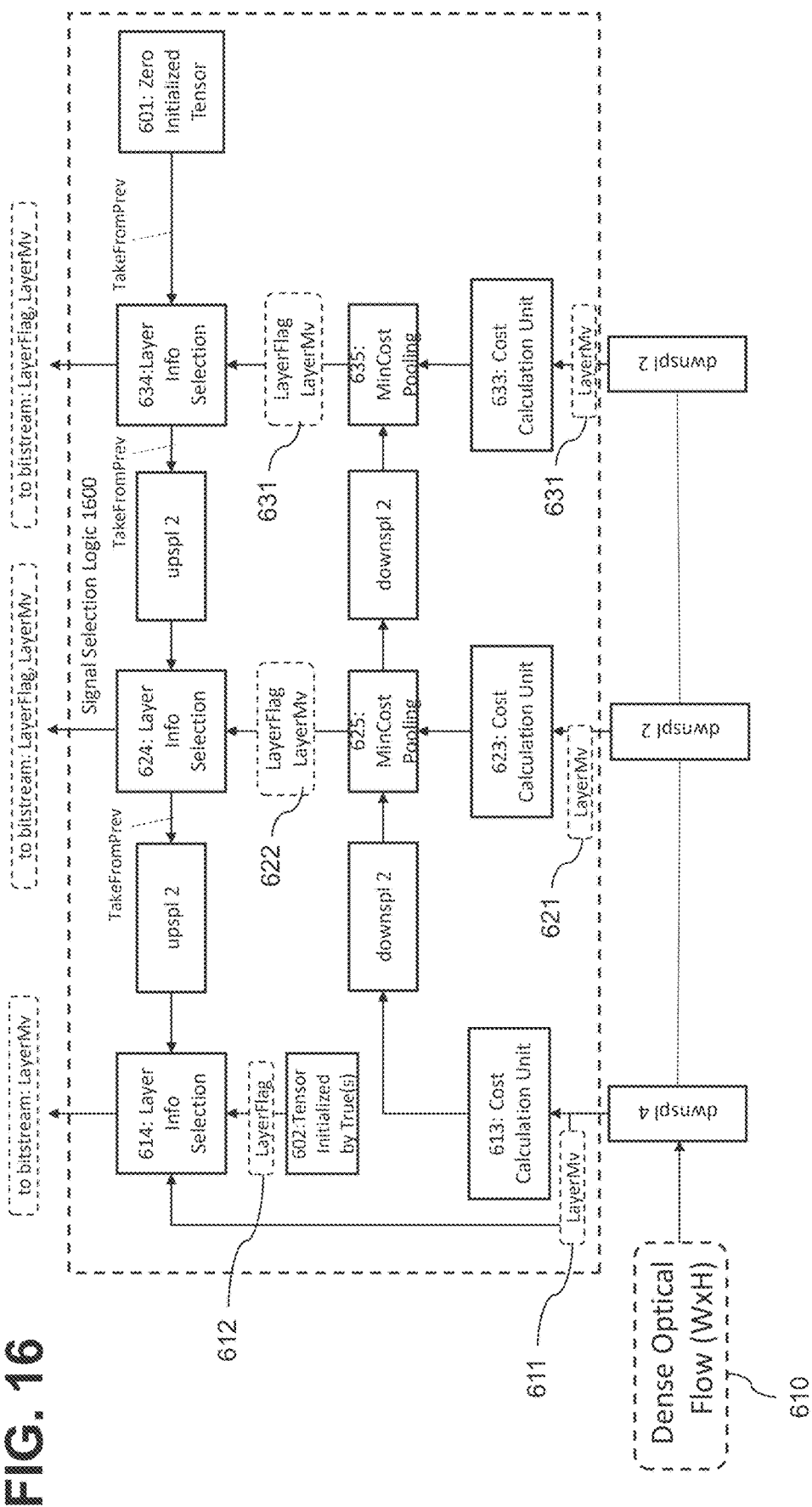
FIG. 16 is a block diagram exemplifying a functional structure of a signal selection logic.

Applying the cost estimation unit (1400, 1500) to each downsampling layer of the motion segmentation unit (1220, 1310) results to obtaining the cost with different level of motion vector averaging (different spatial resolution). As a next step, a signal selection logic 1100 uses the cost information from each downsampling layer to select motion information of different spatial resolution. To achieve that the signal selection logic 1100 performs pair-wise comparison of cost from sequential (cascaded) downsampling layers, the signal selection logic 1100 selects minimum cost at each spatial position, and propagates it to the next (in the sequence of processing) downsampling layer. FIG. 16 illustrates an exemplary architecture of the signal selection unit 1600.

The dense optical flow 610 enters three downsampling layers downspl4, downspl2 and downspl2, similar to those shown in FIG. 11. The signal election logic 1600 in FIG. 16 is an exemplary implementation of the signal selection logic 1100 of FIG. 11. In particular, the LayerMv tensor 611 is the subsampled motion vector field (feature map) which enters the cost calculation unit 613. The LayerMv tensor 611 also enters a layer information selection unit 614 of the first layer. The layer information selection unit 614 provides to the bitstream selected motion vectors in case there are selected motion vectors on this (first) layer. Its function will be further described below.

The cost calculation unit 613 calculates the cost, for instance, as described for the cost calculation unit 1400 with reference to FIG. 14. It outputs a cost tensor which is then downsampled by two to match the resolution on which the second layer operates. After processing by the second downsampling layer downspl 2, the LayerMV tensor 621 is provided to the next (third layer) as well as to the cost calculation unit 623 of the second layer. The cost calculation unit 623 operates in a similar manner as the cost calculation unit 1400. Instead of upsamplings/downsamplings by 4 as in the example described with reference to FIG. 14, as is clear to those skilled in the art, the downsampling by 2 in each direction is applied.

To perform pair-wise comparison of the cost tensors from the cost calculation units 613 and 623, the cost tensor from previous (first) downsampling layer has been downsampled (by two) to the current resolution layer (second). Then a pooling operation 625 is performed between two cost tensors. In other words, the pooling operation 625 keeps in the cost tensor per element the lower cost. The selection of the layer with the lower cost is captured as per element indices of pooling operation result. For instance, if in one particular tensor element cost of first tensor has lower value than cost of corresponding element of second tensor, then index is equal to zero, otherwise the index is equal to one.

To ensure gradient propagation for training purposes soft arg max can be used to obtain the pooled indices with gradients. If gradient propagation is not required, regular pooling with indices can be used. As a result 622 of the pooling operation 625 the indices indicating whether motion vector from the current or previous resolution layer were selected (LayerFlag tensor) along with motion vectors from the corresponding downsampling layer of the motion segmentation unit (LayerMv tensor) are transferred to a layer info selection unit 624 of the current (here second) layer. The best pooled cost tensor is propagated to the next downsampling level (downspl2), then the operations are repeated for the third layer.

In particular, the output LayerMv 621 of the second layer is further downsampled (downspl 2) by the third layer and the resulting motion vector field LayerMv 631 is provided to the cost calculation unit 633 of the third layer. The calculated cost tensor is compared 635 element-wise with a downsampled cost tensor propagated from the second layer and provided by the MinCost pooling unit 625. After the processing by the MinCost pooling 635, the indices indicating whether motion vector from the current (third) or previous (second) resolution layer were selected (LayerFlag tensor) along with motion vectors from the corresponding downsampling layer of the motion segmentation unit (LayerMv tensor) are transferred to a layer info selection unit 634 of the current (here third) layer. In the present example, there are only three layers for the exemplary purpose. However, in general, there may be more than the three layers, in which the further layers and the signal selection logic for these layers have a similar functionality as shown for the second and the third layers.

To collect pooled information from each spatial resolution layer, the next processing is performed in the reverse order—from a lower resolution layer to a higher resolution layer using the layer info selection units 634, 624, and 614. First, a TakeFromPrev tensor of same size as a lowest resolution layer (here the third layer) is initialized 601 by zeros. Then the same operations are repeated for the layers of different resolution as follows. The values of the LayerFlag tensor (in the current layer) at the position where values of the tensor (NOT TakeFromPrev) are equal to 1, are selected to be transmitted in the bitstream as segmentation information. The (NOT TakeFromPrev) tensor is an element-wise negation of the TakeFromPrev tensor. In the third (here last) layer, the (NOT TakeFromPrev) tensor thus has all values set to one (negated zeros set by 601). Accordingly, the segmentation information 1130 (LayerFlag) of the last (here third) layer is always transmitted.

A TakeFromCurrent tensor is obtained using logical operations TakeFromCurrent=(NOT TakeFromPrev) AND LayerFlag. The flags of this tensor TakeFromCurrent indicate whether or not the motion vector information is selected to be transmitted in the bitstream from the current resolution layer. The layer info selection unit (634, 624, 614) selects motion vector information from the corresponding downsampling layer of the motion segmentation unit by taking values of LayerMv tensor where value of TakeFromCurrent tensor is equal to one. This information is transmitted in the bitstream as the selected information 1120.

For the third (first in the reversed order) processing layer, corresponding to the lowest resolution, all flags are transmitted since TakeFromPrev was initialized by zeros and then all values of (NOT TakeFromPrev) will be equal to one. For the last processing layer corresponding to highest resolution layer, the LayerFlag flags do not need to be transmitted. It is assumed that for all the positions for which motion information was not selected from the previous layers, the positions should be selected from the current or next (highest-resolution) layers.

It is noted that the cost calculation as shown in FIG. 16 is a parallelizable scheme that may run on a GPU/NPU. The scheme is also trainable, as it is transferring gradients which allows to use it in end-to-end trainable video coding solutions.

It is noted that the reverse order processing is similar as performed by the decoder when parsing the segmentation information and the motion vector information as will be shown below when discussing the decoder functionality.

Figure 17:
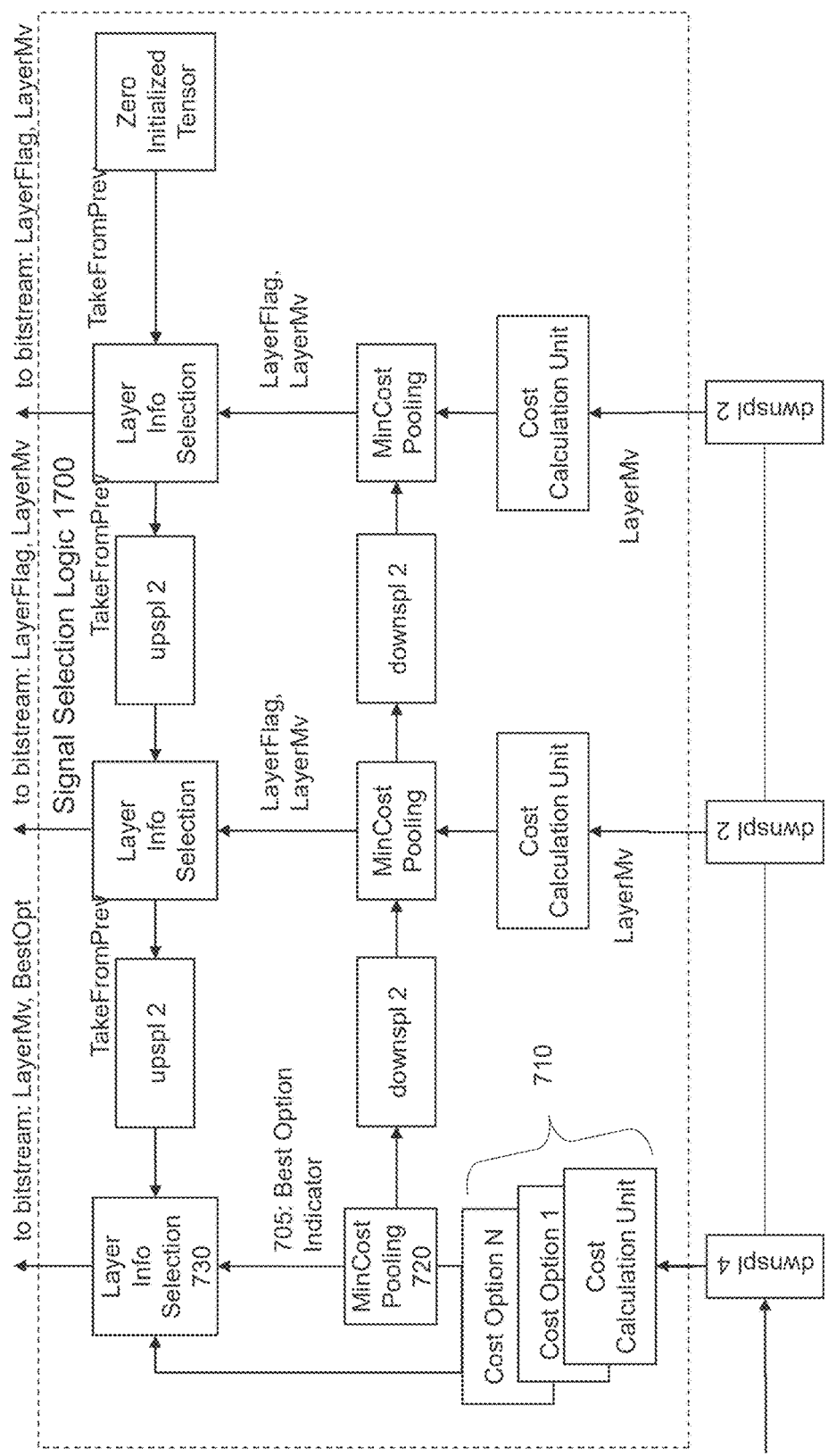
FIG. 17 is a block diagram exemplifying a functional structure of a signal selection logic with cost calculation unit or units providing several coding options.

Another exemplary implementation of the signal selection logic 1700 is illustrated in FIG. 17. In comparison with FIG. 16, the block diagram of FIG. 17 introduces multiple coding options at the same resolution layer. This is illustrated by options 1 to N in layer-1 cost calculation unit 710. It is noted that in general one or more or all layers may include more options. In other words, any of the cost calculation units 613, 623, 633 may provide more options. These options can be for example one or more or all of the following: different reference pictures used for motion estimation/compensation, uni-, bi- or multi-hypothesis prediction, different prediction method e.g. inter- or intra-frame prediction, direct coding without prediction, multi-hypothesis prediction, presence or absence of residual information, quantization level of residuals etc. The cost is calculated for each coding option in the cost calculation unit 710. Then the best option is selected using the minimum cost pooling 720. The indicator (e.g. index) 705 of a best selected option is transmitted into layer info selection module 730, and then, if corresponding points of current layer will be selected to transmit the information, the indicator BestOpt is transferred in the bitstream. In given example options are illustrated for first layer only, however it should be understood that similar options selection logic can be applied to other layers of different resolution as well, or to all layers.

The above-mentioned approach is also suitable to segmentation and transfer of logical information such as flags or switchers controlling the picture reconstruction process, as well as for information intended to remain unchanged after decoding and kept the same as on the encoding side. In other words, instead of the motion vector field (dense optical flow) processed in the exemplary implementation of FIG. 16, any one or more other parameters may be encoded in a similar manner, including segmentation. It might be one or more or all of the following: indicator indicating, e.g.: different reference pictures used for motion estimation/compensation, uni-, bi- or multi-hypothesis prediction indicator, different prediction method e.g. inter- or intra-frame prediction, indicator of direct coding without prediction, multi-hypothesis prediction, presence or absence of residual information, quantization level of residuals, parameters of in-loop filters, etc.

Further Modifications of the Above Embodiments and Examples

Figure 18:
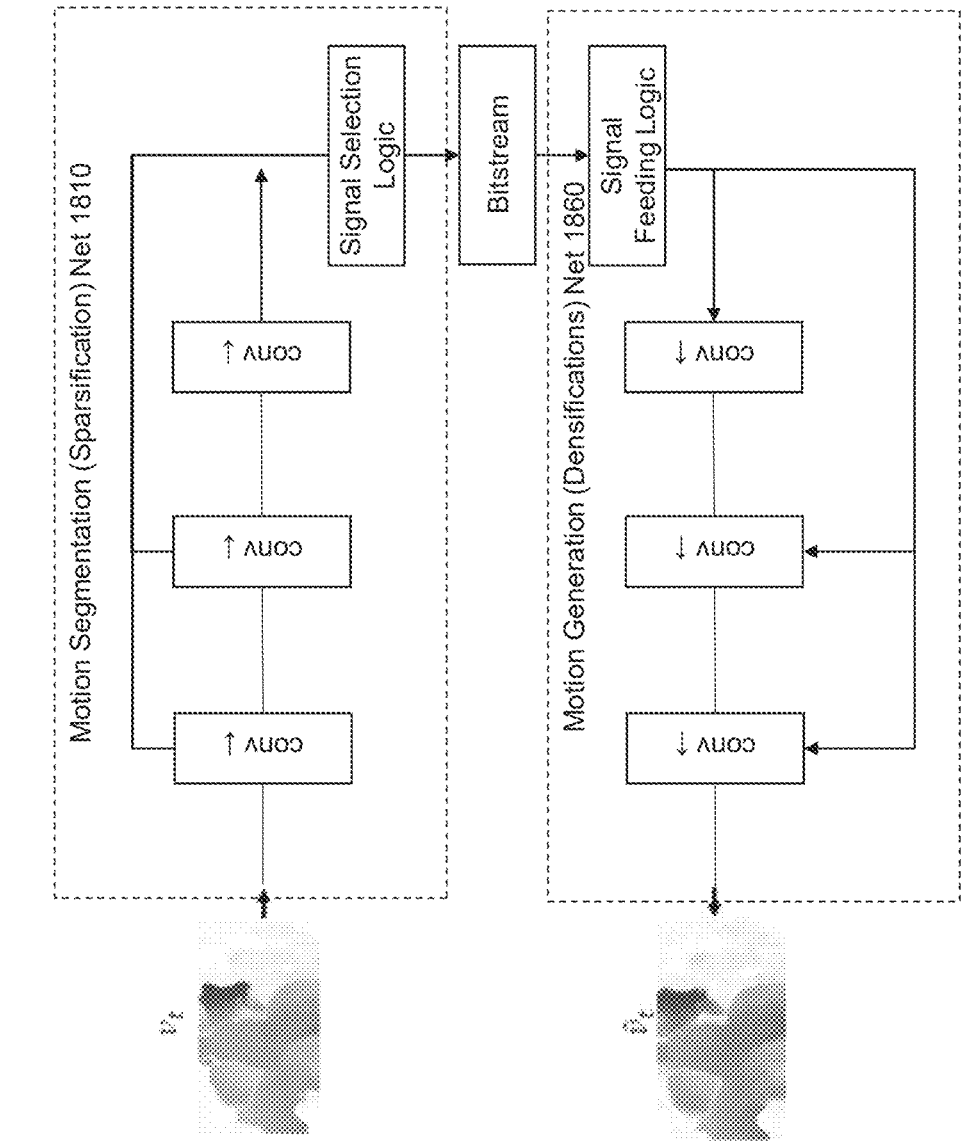
FIG. 18 is a block diagram illustrating a structure of a network transferring information from layers of different resolution in the bitstream with convolutional downsampling and upsampling layers.

According to a first modification, the downsampling layers of the motion segmentation unit 1310 and/or the upsampling layers of the motion generation unit 1360 comprises convolutional operation. This is illustrated in FIG. 18. As can be seen in FIG. 18, in comparison with FIG. 13, the downsampling layers "dwnspl" and the upsampling layers "upspl" have been respectively replaced with downsampling convolutional layers "conv ↓" in the motion segmentation unit 1810 and with upsampling convolutional layers "conv ↑" in the motion generation unit 1860. Some of the advantages of convolutional rescaling (downsampling, upsampling) layers is enabling a learnable downsampling and upsampling process. This, for example in case of usage for motion information densification, allows to find optimal upsampling transformation and may thus reduce blocking effects caused by motion compensation using block-wise averaged motion vector information as was described in the above-mentioned embodiments and examples. The same is applicable for texture restoration process, e.g. for original image intensity values or prediction residual generation processed by the cascaded layers.

In the above example of FIG. 18, all the downsampling and upsampling layers are convolutional layers. In general, the present disclosure is not limited to such implementations. In general, within the segmentation unit (1310, 1810) and/or within the generation unit (1360, 1860), a subset (one or more) of the downsampling and the corresponding upsampling operations may be implemented as convolutions.

Please recall that even though the examples described herein are provided for the dense optical flow/motion vector field processing and thus refer to the motion segmentation unit (1310, 1810) and/or the motion generation unit (1360, 1860), the present disclosure is not limited to such data/feature maps. Rather, any coding parameters or even texture such as the samples of the image, or prediction residuals (prediction error) or the like may be processed instead or in addition to the motion vector fields in any of the embodiments and examples herein.

It is noted that for instance, an encoder with motion information averaging as downsampling can be used in combination with a decoder comprising convolution upsampling layers. Moreover, an encoder with convolutional layers aimed to find better latent representation can be combined with motion generation network (decoder) implementing nearest neighbor based upsampling layers.

Further combinations are possible. In other words, the upsampling layers and the downsampling layers do not have to be of a similar type.

Figure 19:
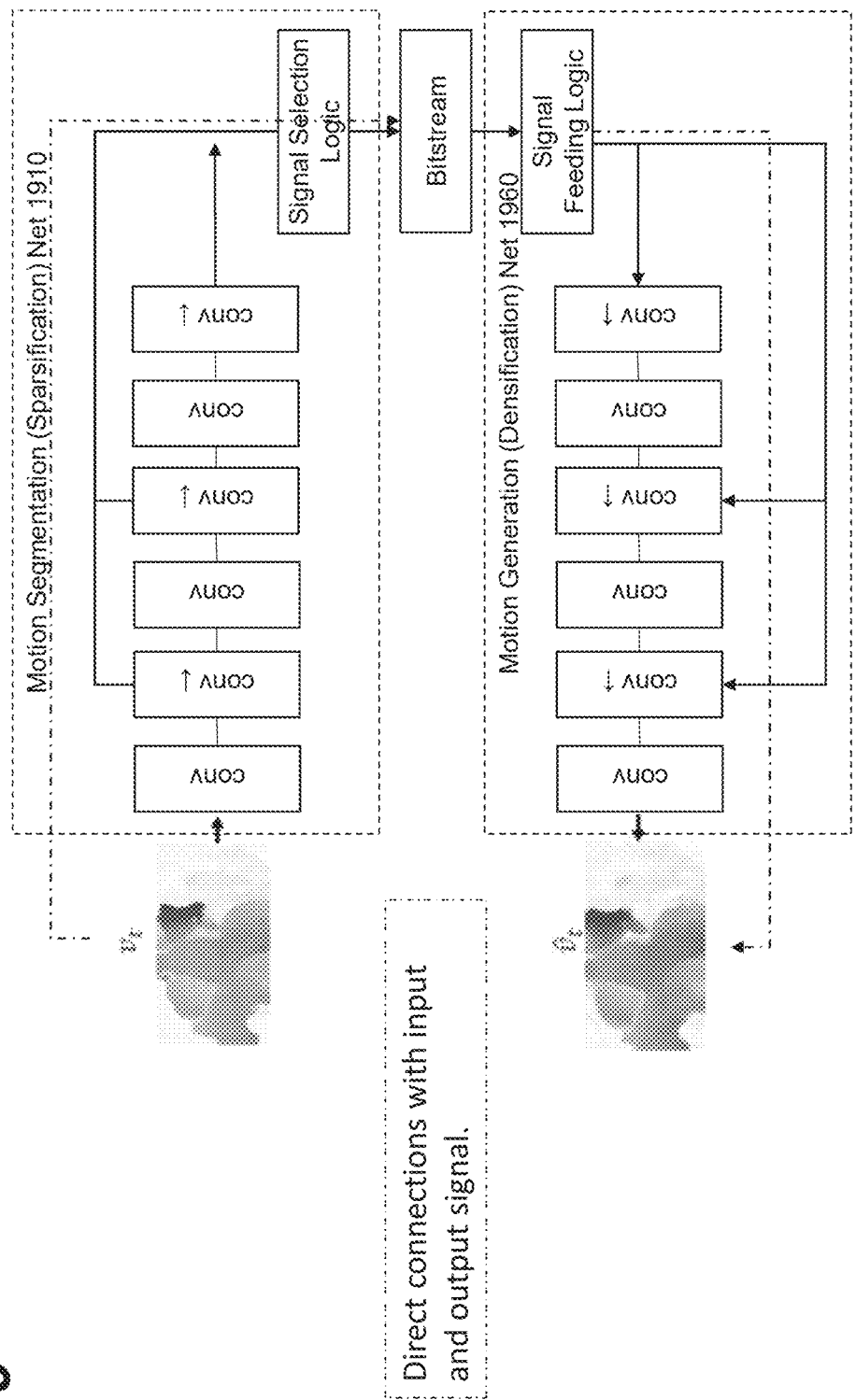
FIG. 19 is a block diagram illustrating a structure of a transferring information from layers of different resolution in the bitstream with additional layers.

According to a second modification, which is combinable with any of the preceding embodiments and examples (as well as with the first modification), the processing by the network comprises one or more additional convolutional layers between the cascaded layers with different resolutions mentioned above. For example, the motion segmentation unit 1310 and/or motion generation unit 1360 further comprises one or more intermediate convolutional layers between some or all of the downsampling and upsampling layers. This is illustrated in FIG. 19 which shows an exemplary implementation of such a motion segmentation network (module) 1910 and a motion generation network (module) 1860. It is noted that the terms "module" and "unit" are used herein interchangeably to denote a functional unit. In this specific embodiment, the units 1910 and 1960 are, more specifically, network structures with a plurality of cascaded layers.

For example, the motion segmentation unit 1910 has, in comparison with the motion segmentation unit 1310, additional convolution layer "conv" before each downsampling layer "conv ↓" (which could also be other type of downsampling). Moreover, the motion generation unit 1960 has, in comparison with the motion generation unit 1360, additional convolution layer "conv" before each upsampling layer "conv ↑" (which could also be other type of upsampling).

This may further reduce blocking artifacts caused by sparsification of motion information and increase generalization effect of finding better latent representations. Similar to what was mentioned above regarding the first modification, the encoder and the decoder from different embodiments/modifications described above can be combined in one compression system. For example, it is possible to have only an encoder with additional layers between the downsampling layers and having decoder without such additional layers or vice versa. Alternatively or in addition, it possible to have different number and location of such additional layers at the encoder and at the decoder.

According to a third modification, a direct connection is provided with the input and the output signal as also shown in FIG. 19. It is noted that even though illustrated in the same figure here, the second and the third modifications are independent. They may be applied together or separately to the previously described embodiments and examples and other modifications. The direct connection is illustrated by a dash-dotted line.

In addition to bottleneck information of autoencoder's latent representation (output of the lowest resolution layer), information from higher resolution layer(s) is added into the bitstream in some of the embodiments. To optimize signaling overhead, only a part of the information from different resolution layers is inserted into the bitstream, controlled by the signal selection logic. On the receiving (decoder) side, the corresponding signal feeding logic feeds information from the bitstream to the layers of different spatial resolution as will be described in more detail below. Additionally, information from input signal prior the downsampling layer can be added into bitstream, by which the variability and flexibility may be further increased. For example, the coding may be aligned to real object boundaries and segments with higher spatial resolution, adjusted to features of a particular sequence.

Figure 20:
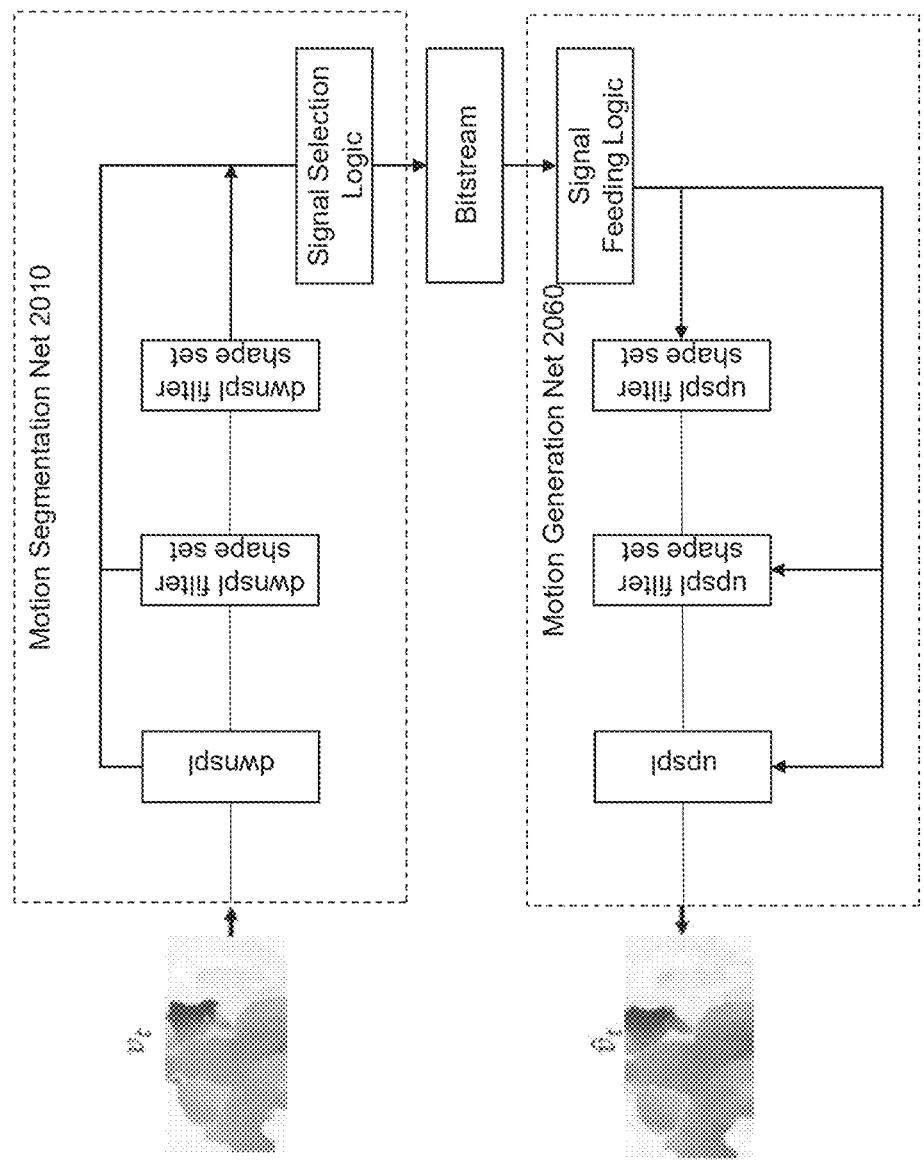
FIG. 20 is a block diagram illustrating a structure of a transferring information from layers of different resolution in the bitstream with layers enabling downsampling or upsampling filter selection.

According to a fourth modification, the shape of the downsampling and upsampling filters may have other than square shape, e.g. rectangular, having horizontal or vertical orientation, asymmetric shape or further more arbitrary shape by employing a mask operation. This allows to further increase variability of the segmentation process for better capturing the real object boundaries. This modification is illustrated in FIG. 20. In the motion segmentation unit 2010, after the first downsampling layer which may be same as in any of the preceding embodiments, two further downsampling layers follow which employ a selected filter out of a filter shape set. This modification is not limited to processing of motion vector information.

In general, in the downsampling by a layer, what is applied is downsampling the input feature map using a first filter to obtain a first feature map, and downsampling the input feature map using a second filter to obtain a second feature map. The cost calculation includes determining a third cost resulting from reconstructing a portion of a reconstructed picture using the first feature map and determining a fourth cost resulting from reconstructing the portion of reconstructed picture using the second feature map. Then, in the selecting, the first feature map is selected if the third cost is smaller than the fourth cost and the second feature map is selected if the third cost is larger than the fourth cost. In this example, the selection was out of two filters. However, the present disclosure is not limited to two filters, rather a selection out of a predefined number of filters may be performed in a similar manner, e.g. by estimating the costs for all selectable filters and by selecting the filter minimizing the costs.

The shape of the first filter and the second filter may be any of square, horizontal and vertical oriented rectangular. However, the present disclosure is not limited to these shapes. In general, any arbitrary filter shape may be designed. The filters may further include a filter which may be defined with an arbitrary desired shape. Such shape may be indicated by obtaining a mask, wherein the mask is comprised of flags, wherein the mask represents an arbitrary filter shape, and wherein one of the first and the second filter (in general any of the selectable filters from the filter set) has the arbitrary filter shape.

In an exemplary implementation, to provide the variability, the encoder further comprises pooling between cost tensors obtained with help of filters with mutually different shapes. An index of a selected filter shape is signaled in the bitstream as (a part of) the segmentation information similarly as described above for the motion vectors. For instance for a selection between horizontally and vertically oriented rectangular shapes, the corresponding flag can be signaled in the bitstream. For example, the method of selecting multiple encoding options described with reference to FIG. 17 can be used for selection of different filter shapes at the same resolution layer.

According to a fifth modification, a motion model out of a predefined set of different motion models may be selected in the same resolution layer. In the previous embodiments, specific cases of downsampling and/or upsampling filters have been described. In such cases, motion information may be averaged across a square block, which represents translation motion model. In this fifth modification, in addition to the translational motion mode, other motion models may be employed. Such other motion models may include one or more out of the following:

Affine motion model,

Higher-order motion model, or a CNN layer specifically trained to represent specific motion model, e.g. zoom, rotation, affine, perspective, or the like.

Figure 21:
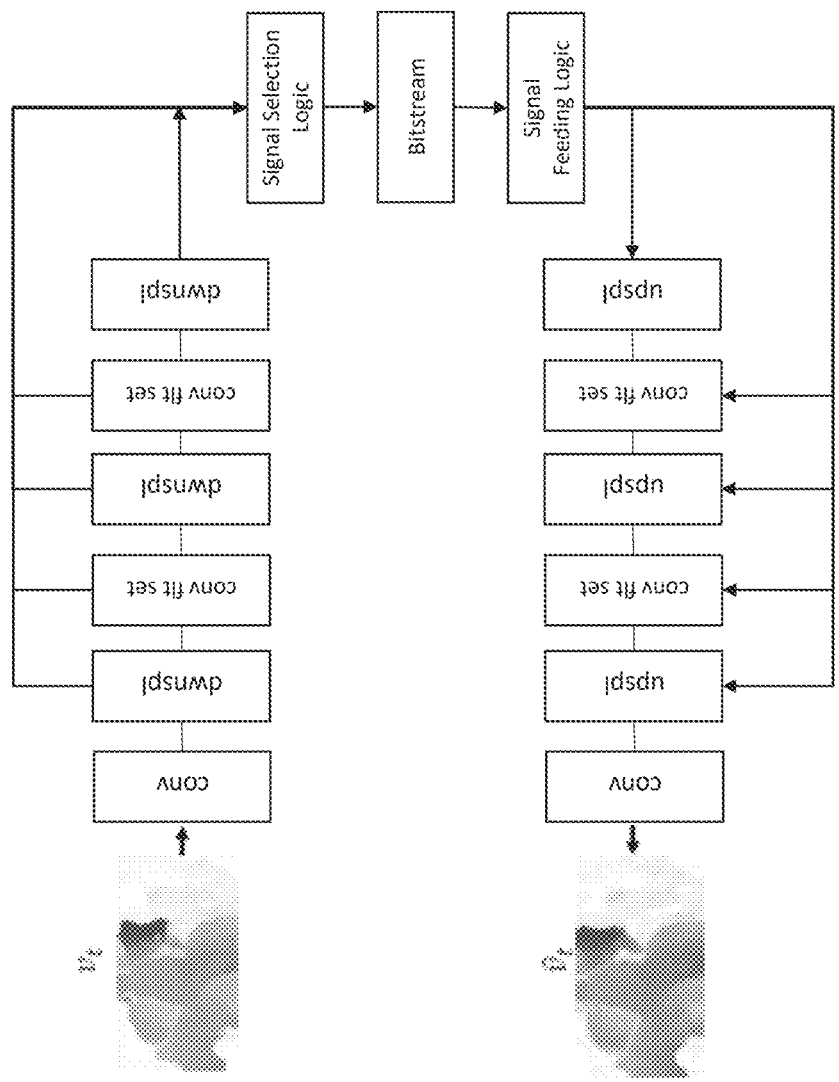
FIG. 21 is a block diagram illustrating a structure of a network transferring information from layers of different resolution in the bitstream with layers enabling convolutional filter selection.

In an exemplary implementation of the fifth modification, an autoencoder further comprises sets of CNN layer and/or "handcrafted" layers representing other than translation motion models. Such autoencoder (and decoder) is illustrated in FIG. 21. In FIG. 21, includes a layers comprising set of filters denoted as "conv fit set" are provided at the encoder side and the decoder side.

For example, at each spatial layer, the encoder selects the appropriate filter(s) corresponding to a certain motion model from the set of filters and inserts an indication into the bitstream. At the receiving side, the signal feeding logic interprets the indicator and uses corresponding filter(s) from the set to perform convolution at the certain layer.

The examples of methods described above uses motion information, particularly motion vectors, as an exemplary input for encoding. It should be noted again that these methods are also applicable for compression of different types of image or video information, such as direct image sample values, prediction residual information, intra- and inter-frame prediction parameters etc.

According to a sixth modification, the RDO exemplified above with reference to FIG. 16 or 17 may be applied to traditional block-based codecs.

Traditional video coding methods, for example state-of-the art video coding standards such as AVC, HEVC, VVC or EVC, use block-based coding concept, according to which the picture is recursively split into blocks of square or rectangular shape. For these blocks signal reconstruction parameters are estimated or evaluated on encoder side and transmitted in the bitstream to the decoder. Normally, encoder aims to find optimum reconstruction parameter for the set of the blocks representing a picture in terms of rate-distortion cost, trying to maximize reconstruction quality (i.e. minimize distortion with original picture) and minimize amount of bits required to transmit parameters for the reconstruction process. This task of parameters selection (or coding mode decisions) is a complex and resource demanding task, which is also a major source of encoder's complexity. Being constrained in processing time, for instance in real-time applications the encoder may sacrifice the quality of mode decision that in turn affects the quality of reconstructed signal. Optimizing mode decision process is always a desirable technical improvement.

One of the coding mode decisions is a decision whether or not to split a current block (or Coding Unit (CU)) into multiple blocks according to a partition method.

Figure 22:
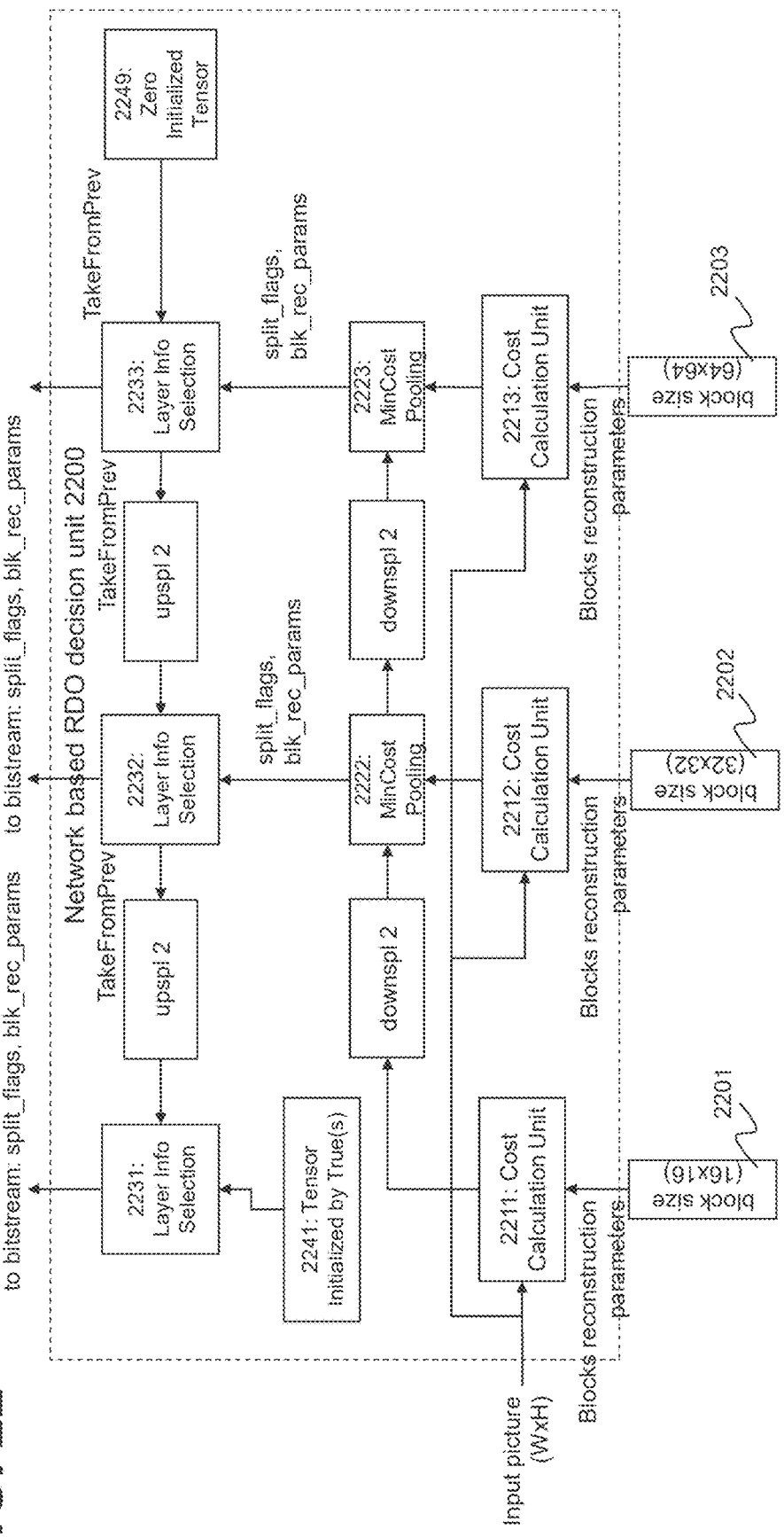
FIG. 22 is a block diagram exemplifying a functional structure of a network based RDO decision unit for selecting a coding mode.

According to the sixth modification, the motion segmentation unit 1310 (or 1810) above, is adapted for split modes decisions based on minimizing the cost (e.g. a rate-distortion optimization criterion). FIG. 22 illustrates an example of such optimization.

As can be seen in FIG. 22, instead of downsampling layers, a block partition structure is used to represent information of different spatial resolutions. For every block of a given size N×N (considering square blocks) of a picture or part of the picture, the cost calculation unit calculates the distortion tensor and downsamples the resolution further by factor 16 (to match original resolution. In given example on FIG. 22, first block size is 16×16; e.g. the downsampling is performed by average pooling operation) in order to obtain a tensor, each element of which represents the average distortion in every 16×16 block. In the first layer, a picture is partitioned in the initial, highest resolution to 16×16 blocks 2201. In the second layer, the resolution is reduced so that the block size 2202 in the picture is 32×32 (corresponding to joining four blocks of the previous layer). In the third layer, the resolution is reduced again so that the block size 2203 id 64×64 (corresponding to joining four blocks of the previous layer). It is noted that the joining of four blocks from the previous layer in this case may be considered as subsampling of the bloc-related information. This is because in the first layer, a block-related information is provided for each 16×16 block, whereas in the second layer, the block-related information is provided only for the 32×32 block, i.e. there are 4 times less parameters provided. Similarly, in the third layer, the block-related information is provided only for 64×64 block, i.e. there are 4 timed less parameters provided than in the second layer and 16 times less than in the first layer.

The block-related information in this context is any information which is coded per block, such as prediction mode; prediction mode specific information such as motion vectors, prediction direction, reference pictures or the like; filtering parameters; quantization parameters; transformation parameters or other settings which may change on block (coding unit) level.

Then, cost calculation units 2211, 2212, and 2213 of the respective first, second, and third layers calculate the costs based on the block reconstruction parameters for the respective block sizes 2201, 2202, and 2203 and based on the input picture with the size W×H.

The output cost tensor is obtained as averaged distortion in every block, combined with estimations of bits required to transmit coding parameters of the N×N (e.g. in the first layer 16×16) blocks using Lagrange multiplier. An exemplary structure of a cost calculation unit 2300 for a block N×N (which may correspond to each or any of cost calculation units 2211, 2212, and 2213) is illustrated in FIG. 23.

Figure 23:
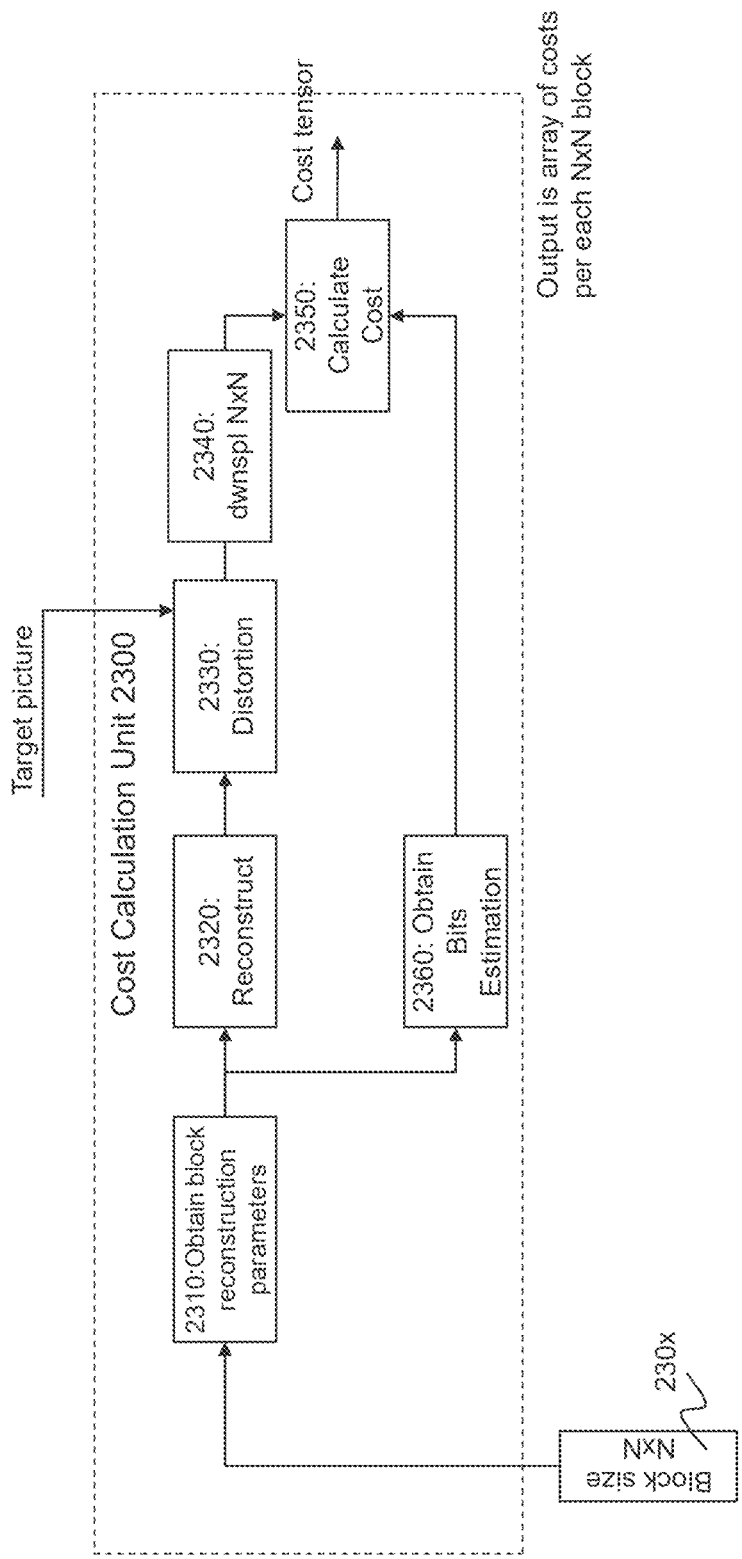
FIG. 23 is a block diagram of an exemplary cost calculation unit which may be used in the network based RDO decision unit for selecting a coding mode.

FIG. 23 shows an exemplary block diagram of the cost calculation unit 2300 for a general block size 230x of N×N. The cost calculation unit 2300 obtains 2310 the block reconstruction parameter (block-related parameter) which are associated with the blocks of size N×N. This obtaining may correspond to fetching the parameter (parameter value) from a memory or the like. For example, the block-related parameters may be a particular prediction mode such as inter prediction mode. In the unit 2310, block reconstruction parameters are obtained, and in the reconstruction unit 2320, the part of the picture is reconstructed using these parameters (in this example all the blocks are reconstructed using inter prediction mode). The, the distortion calculation unit 2330 calculates the distortion of the reconstructed part of the picture by comparing it with the corresponding part of the target picture, which may be the original picture to be encoded. Since the distortion may be calculated per sample, in order to obtain it on a block basis, a downsampling 2340 of the distortion (to one value per N×N block) may be performed. In the lower branch, the rate or number of bits necessary to code the picture is estimated 2360. In particular, the bit estimation unit 2360 may estimate the number of bits to be signaled per block of the N×N size. For example, the number of bits per block necessary for inter prediction mode may be calculated. Having the estimated distortion and amount of bits (or rate), the cost may be calculated 2350, for instance, based on Lagrange optimization mentioned above. The output is a cost tensor.

It is noted that throughout this description, the term "tensor" here may be a matrix, if merely a 2D image of samples such as a gray-scale image is observed. However, there may be a plurality of channels such as color or depth channels for the picture, so that the output may also have more dimensions. General feature maps may also come in more than 2 or three dimensions.

Same cost evaluation procedure is performed for the first layer (with 16×16 block granularity) and for the next level of quadtree splitting into blocks of size 32×32 samples. To make a decision whether it is better to use one 32×32 block for the reconstruction parameters (block-related parameters) or four 16×16 blocks, the cost tensor evaluated for 16×16 blocks is downsampled by factor of 2 (cf. FIG. 22). Then minimum cost pooling operation 2222 provides the optimum decision for every 32×32 block. The indices of pooled cost are passed to Layer Info Selection Unit 2232 to be transmitted in the bitstream as a split_flags. The reconstruction parameters blk_rec_params for best selected blocks according to the pooled indices are also passed to Layer Info Selection Unit 2231. The pooled cost tensor is further passed (downsampled by 2) to the next quadtree aggregation level of blocks having size of 64×64, i.e. to the MinCost Pooling 2223. The MinCost Pooling 2223 also receives the costs calculated for the 64×64 blocks resolution 2203 in the cost calculation unit 2213. It passes indices of the pooled cost as split_flags to the Layer Info Selection Unit 2233 to be indicated in the bitstream. It also passes the reconstruction parameters blk_rec_params for best selected blocks according to the pooled indices to the Layer Info Selection Unit 2233.

To collect pooled information from each block aggregation level, processing is performed in reverse order from higher (in this example highest) aggregation level (64×64 samples) to lower (in this example lowest) aggregation level (16×16 samples) using Layer Info Selection Units 2233, 2232, and 2231 in a way as was described above with reference to FIG. 16.

The result is the bitstream which encodes quad-tree splitting obtained by the optimization alongside with the encoded values and possibly further coding parameters of the resulting partitions (blocks). The above described method allows to take decision about split flags of a block partition. To get reconstruction parameters for each block, traditional methods based on evaluation each or part of possible coding modes can be used.

Figure 24:
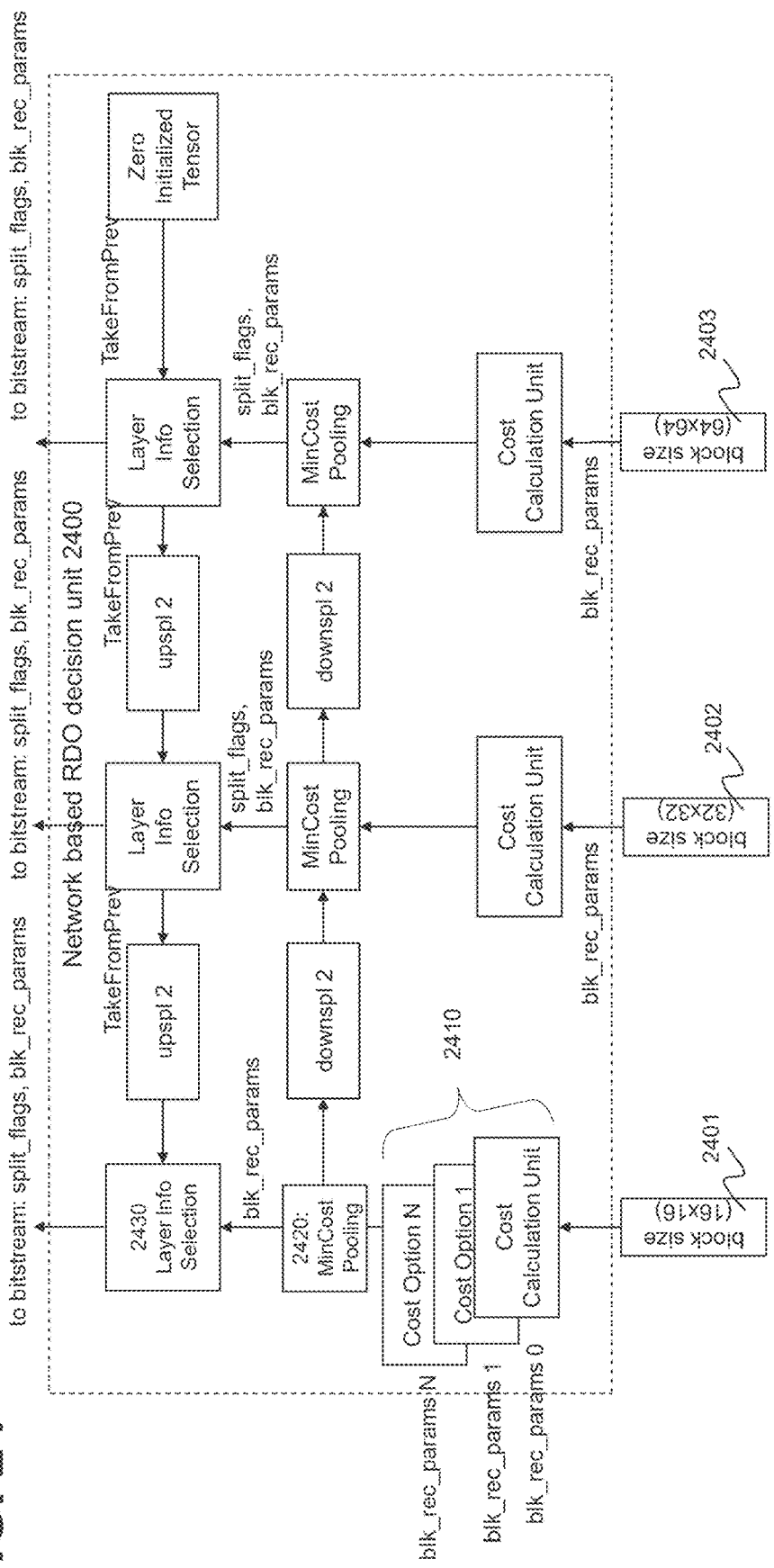
FIG. 24 is a block diagram of an exemplary cost calculation unit which may be used in the network based RDO decision unit for selecting a coding mode supporting a plurality of options.

FIG. 24 illustrates an example of a seventh modification. The seventh modification is an evolution of the sixth modification described above with reference to FIGS. 22 and 23. The seventh modification represent a scheme in which evaluation of coding modes is incorporated in the design. In particular, as can be seen in the figure, the cost calculation unit 710 may evaluate N options. It is noted that the term "N" is a placeholder here for some integer number. This "N" indicating the number of options is not necessarily same as the "N" in "N×N" indicating a general block size. In the cost calculation unit 710, for the same level of block partition splitting e.g. for the block of size 16×16 samples (as in the first layer), the encoder iterates over all possible (or a limited set thereof) coding modes for each block.

Let us consider encoder that has N options to code each 16×16 block denoted, as blk_rec_params 0, blk_rec_params 1, . . . , blk_rec_params N. The parameter combination blk_rec_params k (k being an integer from 0 to N) may be, for instance, a combination of certain prediction mode (e.g. out of inter and intra), certain transformation (e.g. out of DCT and KLT), certain filtering order or filter coefficient sets (among predefined filters), or the like. In some implementations, the blk_rec_params k may be a value k of a single parameter, if only one parameter is optimized. As is clear to those skilled in the art, any one or more parameters may be optimized by checking the cost of their usage.

With each given set of block reconstruction parameters (blk_rec_params k), the cost calculation unit 2410 calculates the tensor representing cost of each block. Then, using the minimum cost pooling 2420, the best coding mode for each block is selected and transferred to layer info selection unit 2430. The best pooled cost tensor is further downsampled by factor of 2, and transferred to the next quadtree aggregation level (in this case the second layer corresponding to aggregation with block size 32×32). Then, splitting (partitioning) decisions are made in the same way as in the above sixth modification. In FIG. 24, the options 0 . . . . N are evaluated only in the first layer (aggregation level 16×16). However, the present disclosure is not limited to such an approach. Rather, the evaluation of 0 . . . . N options may be performed at each aggregation level.

For example, at the next level of quadtree aggregation (32×32, 64×64), the encoder evaluates (by calculating costs in the respective cost units) and pools (by the respective MinCost Pooling units) the best coding mode for each block (not depicted in picture for the sake of intelligibility), which is compared with previous aggregation level. Decisions about best modes and corresponding reconstruction parameters set accordingly are provided to layer info selection units (such as the layer info selection unit 2430 shown for the first layer). In order to collect pooled information from each block aggregation level, a processing is performed in a reverse order—from higher aggregation level (64×64) to lower aggregation level (16×16)—using layer info selection unit in a way as was described in the sixth modification.

Figure 25:
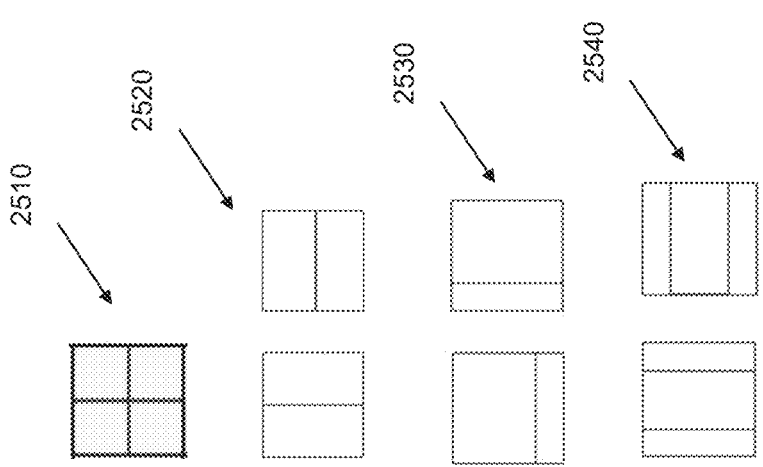
FIG. 25 is a schematic drawing illustrating possible block partitioning or filter shapes.

Different block shapes can be used to represent more advanced partitioning methods such as binary tree, ternary tree, asymmetric and geometric partition. FIG. 25 exemplifies such partitions of a block. In other words, the optimization is not necessarily performed only over the different block sizes, it may be performed (e.g. by means of the corresponding options) also for different partitioning types. FIG. 25 shows examples of:
- a quadtree partitioning 2510. In the quadtree partitioning, a block is split (partitioned) into four blocks of the same size.
- a (symmetric) binary tree partitioning 2520. In the symmetric binary partitioning, a block is split into two blocks of the same size. The splitting may be a vertical splitting or a horizontal splitting. Vertical or horizontal are additional parameters of the splitting.
- an asymmetric binary tree partitioning 2530. In the asymmetric binary partitioning, a block is split into two blocks of different sizes. The size ratio may be fixed (to save overhead caused by signaling) or variable (in which case some ratio options may be also optimized over, i.e. configurable).
- a ternary tree partitioning 2540. In the ternary partitioning, a block is split into three partitions by two vertical or two horizontal lines. Vertical or horizontal are additional parameters of the splitting.

The present disclosure is not limited to these exemplary partitioning modes. It is possible to employ triangular partitions or any other kinds or partitions.

In the seventh modification, hybrid architecture applicable to popular video coding standards is supported and empowered by a powerful (neural) network based approaches. The technical benefits of described method may provide a highly parallelizable GPU/NPU friendly scheme which may allow to speedup calculations required for the mode decision process. It may make possible the global picture optimization, since multiple blocks are considered at the same decision level, incorporate learnable parts to speed up decisions, for instance for evaluating the amount of bits required for reconstruction parameters coding.

In summary, the processing by the cascaded layer structure according to the sixth or seventh modification comprises processing, in the different layers, data relating to the same picture segmented (i.e. split/partitioned) into blocks with respectively different block sizes and/or shapes. The selecting of the layer comprises: selecting the layer based on the cost calculated for a predetermined set of coding modes.

In other words, different layers may process the picture data in different block sizes. Thus, the cascaded layers include at least two layers processing mutually different block sizes. When referring to "block" here, what is meant is a unit, i.e. a portion of the picture for which coding is performed. The block may be also referred to as coding unit or processing unit or the like.

The predetermined set of coding modes corresponds to a combination of coding parameter values. The different block sizes may be evaluated at a one single set of coding modes (combination of values of one or more coding parameters). Alternatively, the evaluation may include various combinations of block sizes and partition shapes (such as those of FIG. 25). However, the present disclosure is not limited thereto, and, as mentioned particularly in the seventh modification, there may be several predetermined sets of coding modes (combinations of coding parameter values) which may further include, e.g. per block, coding modes such as intra/inter prediction type, intra prediction mode, residual skip, residual data, etc.

For example, the processing comprises for at least one layer determining the cost for different sets of coding modes (combinations of values for coding parameters) and selecting one of the set of coding modes based on the determined cost. FIG. 24 shows a case in which only the first layer performs such selection. However, this is not limiting. In fact each cost calculation unit may have the same structure including 0 . . . N options, as the first cost calculation unit 2410. This is not shown in the figure in order to keep the figure simpler.

As mentioned above, this is a GPU friendly RDO which may be performed by a codec, and which selects best coding modes per block. In FIG. 24, the input image (picture) is the same in each layer. However, the coding (to calculate costs) of the picture is performed in each layer with different block sizes. Apart from block size, for one or more of the block sizes, further coding parameters may be tested and selected based on the RDO.

In particular, in these modifications, the indication of data related to the selected layer includes the selected set of coding modes (e.g. blk_rec_params).

In summary, an encoder may be provided in some embodiments, which corresponds in structure to a neural network autoencoder for video or image information coding. Such encoder may be configured to analyze input image or video information by neural network comprising layer of different spatial resolution; transfer in the bitstream latent representation corresponding to lowest resolution layer output; and transfer in the bitstream an output of other than lowest resolution layer.

Decoding

The above described encoder provides a bitstream which includes for the selected layer feature data and/or segmentation information. Correspondingly, the decoder processes the data received from the bitstream in multiple layers. In addition, the selected layer receives an additional (direct) input from the bitstream. The input may be some feature data information and/or segmentation information.

Correspondingly, in the following, embodiments are described which focus on the information related to the selected layer which is feature data. Other described embodiments focus on the information related to the selected layer being segmentation information. There are also mixed embodiments in which the bitstream carries and the layers process both the feature data and the segmentation information.

As a brief example, a decoder of a neural network autoencoder may be provided for video or image information coding. The decoder may be configured to read from a bitstream a latent representation corresponding to a lower resolution layer input; obtain the layer input information based on the corresponding information read from the bitstream for other than the lower resolution layer(s); obtain a combined input for the layer based on the layer information obtained from the bitstream and the output from the previous layer; feed the combined input into the layer; and synthesize image based on the output of the layer.

Here, the term "lower resolution" refers to layers processing feature maps with a lower resolution, for example the feature maps of the latent space provided from the bitstream. The lower resolution may in fact be the lowest resolution of the network.

The decoder may be further configured to obtain a segmentation information based on the corresponding information read from the bitstream; and to obtain the combined input for the layer based on the segmentation information. The segmentation information may be a quadtree, dual (binary) tree or ternary tree data structure or their combination. The layer input information may correspond, for instance, to motion information, image information, and/or to prediction residual information or the like.

In some examples, the information obtained from the bitstream corresponding to layer input information is decoded with usage of a hyperprior neural network. The information obtained from the bitstream corresponding to segmentation information may be decoded with usage of a hyperprior neural network.

The decoder may be readily applied to decoding of motion vectors (e.g. motion vector field or optical flow). Some of those motion vectors may be similar or correlated. For instance, in a video showing an object moving across a constant background, there may be two groups of motion vectors that are similar. A first group being motion vectors may be vectors that are used in the prediction of pixels that show the object and a second group may be vectors that are used to predict pixels of the background. Consequently, instead of signaling all motion vectors in the encoded data, it may be beneficial to signal groups of motion vectors to reduce the amount of data representing the encoded video. This may allow signaling a representation of the motion vector field that requires a smaller amount of data.

FIG. 9 shows the bitstream 930 which is what is received at the decoder, generated by the encoder as described above. On the decoding side, the decoder part of the system 900 comprises the signal feeding logic 940 which, in some embodiments, interprets the segmentation information obtained from the bitstream 930. According to the segmentation information, the signal feeding logic 940 identifies the particular (selected) layer, spatial size (resolution) and position for the part of feature map, to which the corresponding selected information (also obtained from the bitstream) should be placed in.

It is noted that in some embodiments, the segmentation information is not necessarily processed by the cascaded network. It may be provided independently or derived from other parameters in the bitstream. In other embodiments, the feature data is not necessarily processed in the cascaded network, but the segmentation information is. Accordingly, two sections "decoding using feature information" and "decoding using segmentation information" describe examples of such embodiments, as well as combinations of such embodiments.

It is noted that for embodiments of both sections, the above-described encoder-side modifications (first to seventh) apply correspondingly to the decoder side. For better intelligibility, additional features of the modifications are not copied in both sections. However, as is clear to those skilled in the art, they may be applied alternatively or in combination to the decoding approaches of both sections.

Decoding Using Feature Information

In the present embodiment, a method is provided for decoding data for picture or video processing from a bitstream, as illustrated in FIG. 33. Correspondingly, an apparatus is provided for decoding data for picture or video processing from a bitstream. The apparatus may comprise processing circuitry which is configured to perform steps of the method.

The method comprises obtaining 3310, from the bitstream, two or more sets of feature map elements, wherein each set of feature map elements relates to a (respective) feature map. The obtaining may be performed by parsing the bitstream. The bitstream parsing, in some exemplary implementation, may also include entropy decoding. The present disclosure is not limited to any particular way of obtaining the data from the bitstream.

The method further comprises a step of inputting 3320 each of the two or more sets of feature map elements respectively into two or more feature map processing layers out of a plurality of cascaded layers.

The cascaded layers may form a part of a processing network. In the present disclosure, the term "cascaded" means that output of one layer is later processed by another layer. The cascaded layers do not have to be immediately adjacent (output of one of the cascaded layers entering directly the input of the second of the cascaded layers). When referring to FIG. 9, the data from the bitstream 930 is input to the signal feeding logic 940 which feeds the sets of feature map elements to the appropriate layers (indicates by arrows) 953, 952, and/or 951. For example, a first feature element set is inserted into the first layer 953 (first in the processing sequence) and a second feature element set is inserted into the third layer 951. It is not necessary that a set is inserted into the second layer. The number and position (within the processing order) of the layers may vary, the present disclosure is not limited to any particular.

The method further includes obtaining 3330 said decoded data for picture or video processing as a result of the processing by the plurality of cascaded layers. For example, the first set is a latent feature map element set which is processed by all layers of the network. The second set is an additional set provided to another layer. When referring to FIG. 9, the decoded data 911 is obtained after processing the first set by the three layers 953, 952, and 951 (in this order).

In an exemplary implementation, in each of the two or more feature map processing layers a feature map is processed, wherein feature maps processed respectively in the two or more feature map processing layers differ in resolution. For example, a first feature map processed by a first layer has a resolution which differs from the resolution of a second feature map processed by a second layer.

In particular, the processing of the feature map in two or more feature map processing layers includes upsampling.

FIG. 9 illustrates a network, of which the decoding part includes three (directly) cascaded upsampling layers 953, 952, and 951.

In an exemplary implementation, the decoder comprises only upsampling layers of different spatial resolutions and a nearest neighbor approach is used for the upsampling. The nearest neighbor approach repeats the value of a lower resolution in a higher resolution area corresponding to a given shape. For example, if one element of the lower resolution corresponds to four elements of the higher resolution, then the value of the one element is repeated four times in the higher resolution area. In this case, the term "corresponding" means describes the same area in the highest resolution data (initial feature map, initial data). Such way of upsampling allows to transmit information from a lower resolution layer to a higher resolution layer without modification, which can be suitable for some kind of data such as logic flags or indicator information, or information which is desired to keep the same as was obtained on encoder side without, e.g., modification by some convolutional layers. One example of such data is prediction information, for instance motion information which may comprise motion vectors estimated on encoder side, reference index indicating which particular picture from the reference picture set should be used, prediction mode indicating whether to use single or multiple reference frames, or combination of different predictions like combined intra-inter prediction, presence or absence or residual information, etc.

However, the present disclosure is not limited to upsampling performed by nearest neighbor approach. Alternatively, upsampling may be performed by applying some interpolation or extrapolation, or by applying convolution or the like. These approaches may be particularly suitable for upsampling data which are expected to have a smooth characteristics such as motion vectors or residuals or other sample-related data.

In FIG. 9, the encoder (e.g. signs 911-920) and decoder (e.g. signs 940-951) have the same number of downsampling and upsampling layers correspondingly, the nearest neighbor method may be used for upsampling, and average pooling may be used for downsampling. The shape and size of the pooling layers are aligned with scale factor of the upsampling layers. In some other possible implementations, another method of pooling can be used, e.g. max pooling.

As already exemplified in several encoder embodiments, the data for picture or video processing may comprise a motion vector field. For example, FIG. 12 shows encoder and decoder side. At the decoder side, the bitstream 1250 is parsed and motion information 1260 (possibly with segmentation information as will be discussed below) is obtained therefrom. Then, the motion information obtained is provided to a motion generation network 1270. The motion generation network may increase the resolution of the motion information, i.e. densify the motion information. The reconstructed motion vector field (e.g. dense optical flow) 1275 is then provided to the motion compensation unit 1280. The motion compensation unit 1280 uses the reconstructed motion vector field to obtain predicted picture/video data based on reference frame(s) and to reconstruct the motion compensated frame based thereon (e.g. by adding decoded residuals as exemplifies in FIG. 5A-decoder part of the encoder, or in FIG. 7B, reconstruction unit 314).

FIG. 13 also shows the decoder side motion generation (densification) network 1360. The network 1360 includes a signal feeding logic 1370, similar in function to the signal feeding logic 940 of FIG. 9, and three upsampling (processing) layers. The main difference to the embodiment described above with reference to FIG. 9 is that in FIG. 13, the network 1360 is specialized for the motion vector information processing, outputting a motion vector field.

Figure 28:
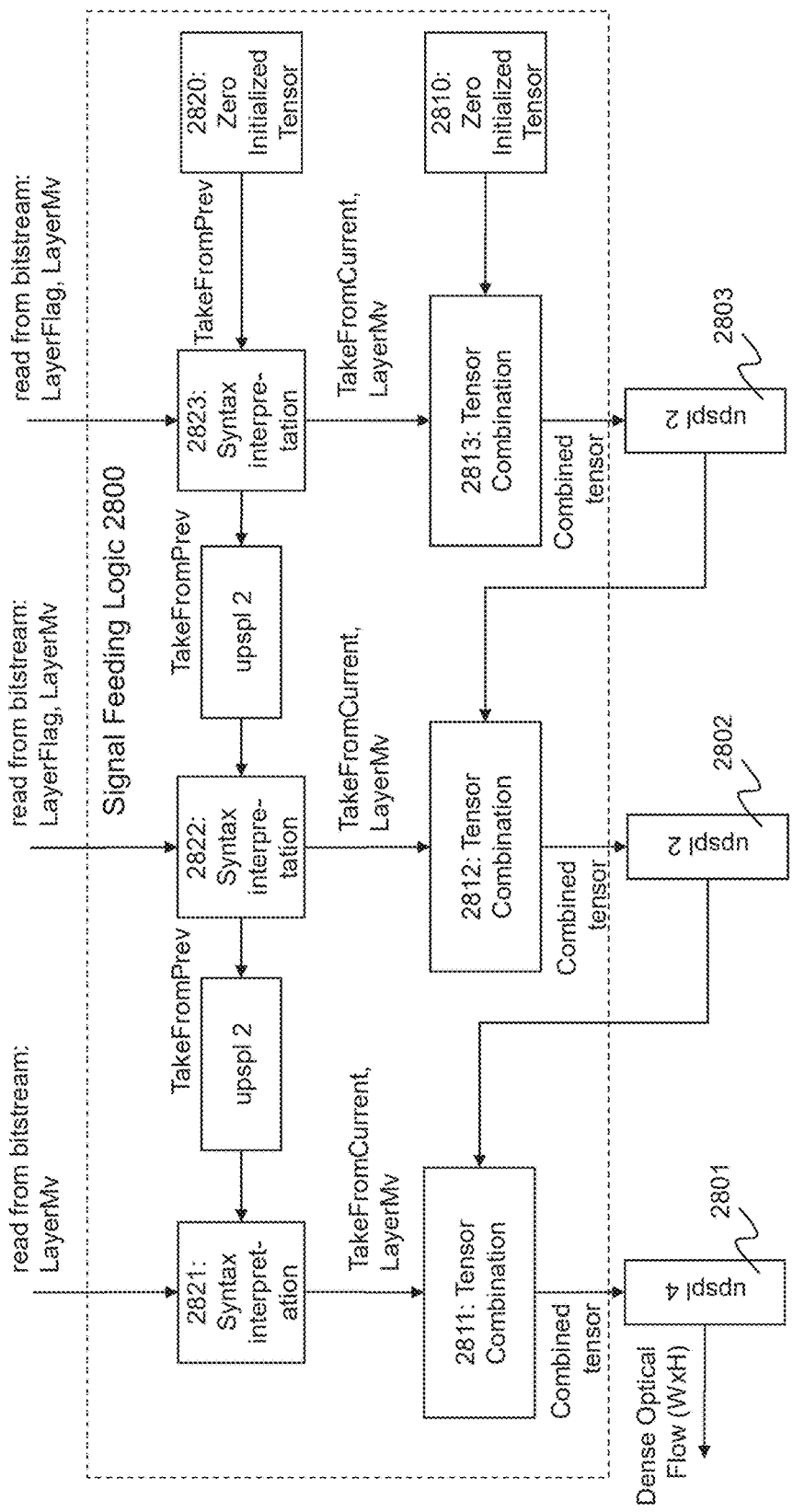
FIG. 28 is a block diagram illustrating an exemplary signal feeding logic for reconstruction of a dense optical flow.
Figure 29:
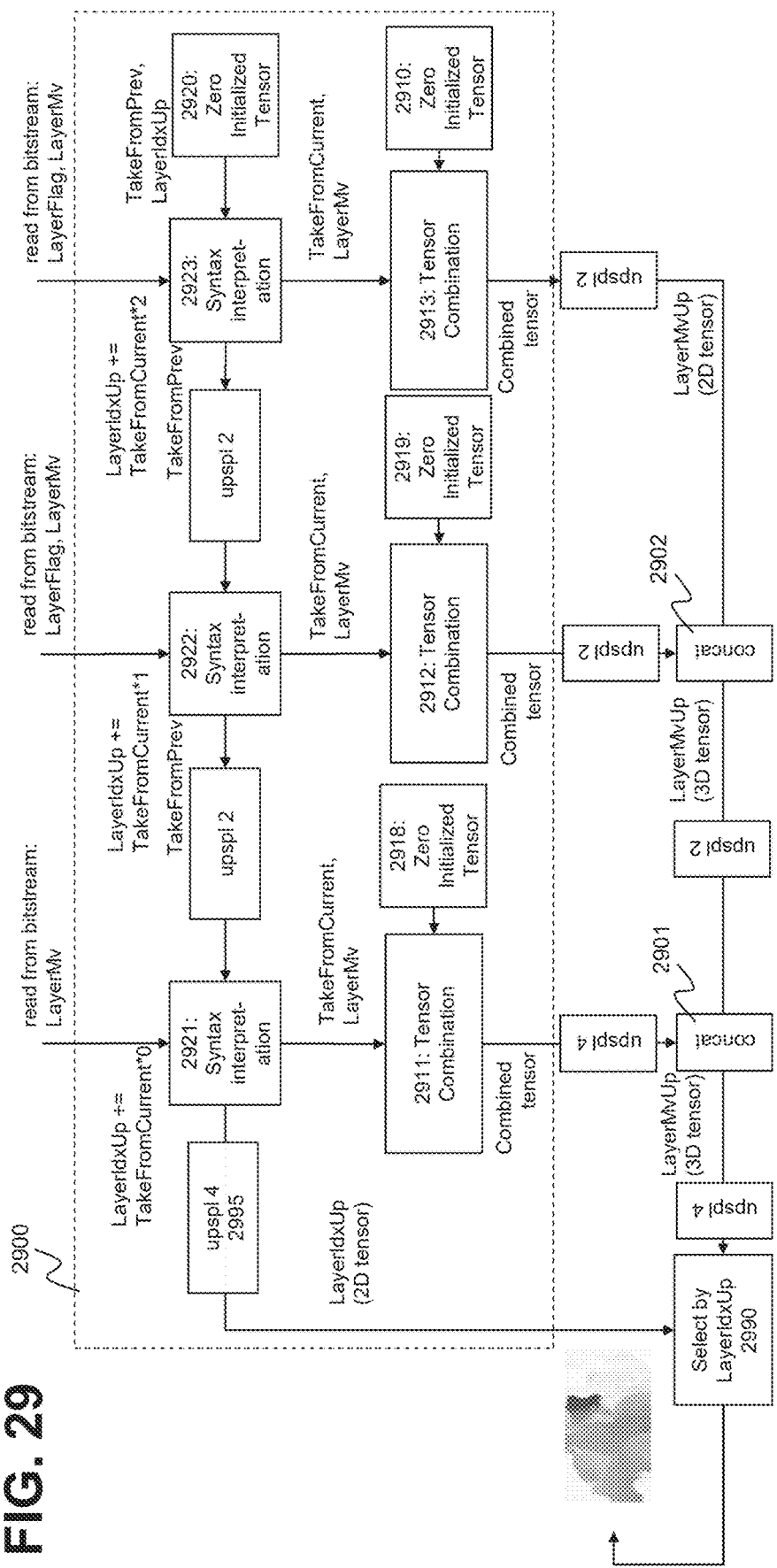
FIG. 29 is a block diagram illustrating an exemplary signal feeding logic for reconstruction of a dense optical flow.

As mentioned above, according to an embodiment, the method further comprises obtaining, from the bitstream, segmentation information related to the two or more layers. Then, the obtaining of the feature map elements from the bitstream is based on the segmentation information. The inputting of the sets of feature map elements respectively into two or more feature map processing layers is based on the segmentation information. Some detailed examples relating to usage of the segmentation information in parsing and processing are provided below in the section relating to Decoding using segmentation information. For example, FIGS. 28 and 29 provide very specific (and merely exemplary) layer processing options.

In some embodiments, the plurality of cascaded layers further comprises a plurality of segmentation information processing layers. The method further comprises processing of the segmentation information in the plurality of segmentation information processing layers. For example, processing of the segmentation information in at least one of the plurality of segmentation information processing layers includes upsampling. Such upsampling of the segmentation information and/or said upsampling of the feature map comprise a nearest neighbor upsampling in some embodiments. In general, the upsampling applied to the feature map information and the upsampling applied to the segmentation information may differ. Moreover, the upsampling within the same network may differ, so that one network (segmentation information processing or feature map processing) may include upsampling layers of different types. Such example is shown, for instance in FIG. 20 or 21. It is noted that the upsampling types other than nearest neighbor may include some interpolation approaches such as polynomial approaches, e.g. bilinear, cubic, or the like.

According to an exemplary implementation, said upsampling of the segmentation information and/or said upsampling of the feature map comprises a (transposed) convolution. This corresponds to the first modification discussed above for the encoder. FIG. 18 shows at the decoder side the motion generation unit 1869 which comprises convolutional operation "conv ↑" instead of the nearest neighbor upsampling. This enables a learnable upsampling process, which, for example, in case of using it for motion information densification, allows to find optimal upsampling transformation and may reduce blocking effect caused by motion compensation with using of block-wise averaged motion vector information as was described above with reference to the encoder. The same is applicable for texture restoration process e.g. for original image intensity values or prediction residual generation. The motion generation unit 1869 also includes a signal feeding logic, which corresponds in function to the signal feeding logic 940 or FIG. 9 or 1370 of FIG. 13.

Figure 30:
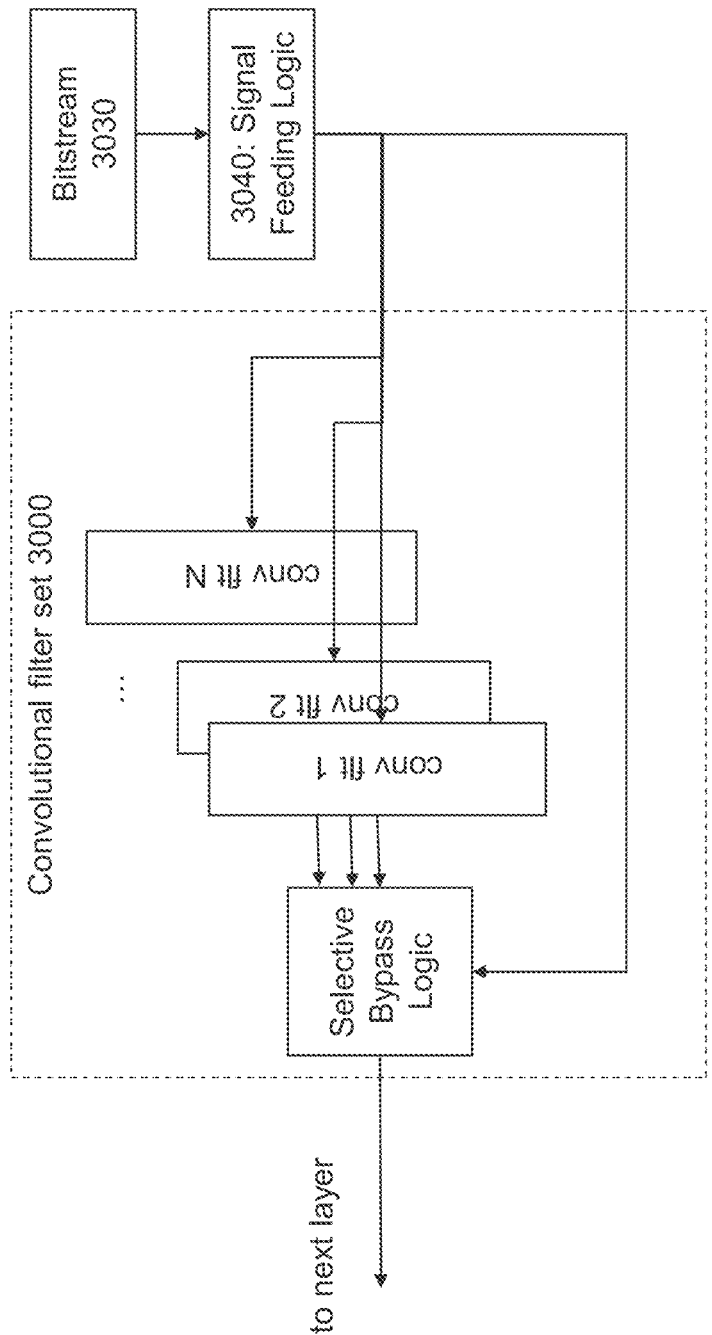
FIG. 30 is a block diagram showing a convolutional filter set.

FIG. 30 illustrates a block diagram of an exemplary decoder side layer processing according to the first modification. In particular, bitstream 3030 is parsed and the signal feeding logic 3040 (corresponds in function to the signal feeding logic 940 or 1370) provides selection instruction to a convolutional upsampling filter 300. In some embodiments, the convolutional filter is selectable out of a set of N filters (indicated as filters 1 to N). The filter selection may be based on an information indicating the selected filter and parsed from the bitstream. The indication of the selected filter may be provided (generated and inserted into the bitstream) by the encoder based on an optimization approach such as an RDO. In particular, an RDO exemplified in FIG. 17 or 24 may be applied (handling filter size/shape/order as one of the options, i.e. coding parameters to be optimized for). However, the present disclosure is not limited thereto, and in general, the filter may be derived based on other signaled parameters (such as coding mode, interpolation direction, or the like).

In summary, the signal feeding logic unit controls the input for different layers with different filter shapes, and selectively bypass the layers output to the next layer according to the segmentation and motion information obtained from bitstream. The convolutional filter unit 3000 corresponds to convolution performed by one layer. Several such convolutional swamping filters may be cascaded as is shown in FIG. 18. It is noted that the present disclosure is not limited to variable or trainable filter setting. In general, a convolutional upsampling may also be performed with a fixed convolution operation.

Aspects of this embodiment can be combined with aspects of other embodiments. For instance, an encoder with motion information averaging in downsampling layers can be used in combination with decoder comprising convolution upsampling layers. An encoder with a convolutional layer aimed to find better latent representation can be combined with motion generation network comprising a nearest neighbor based upsampling layers. Further combinations are conceivable. In other words, the implementation of the encoder and the decoder does not have to be symmetric.

Figure 32A:
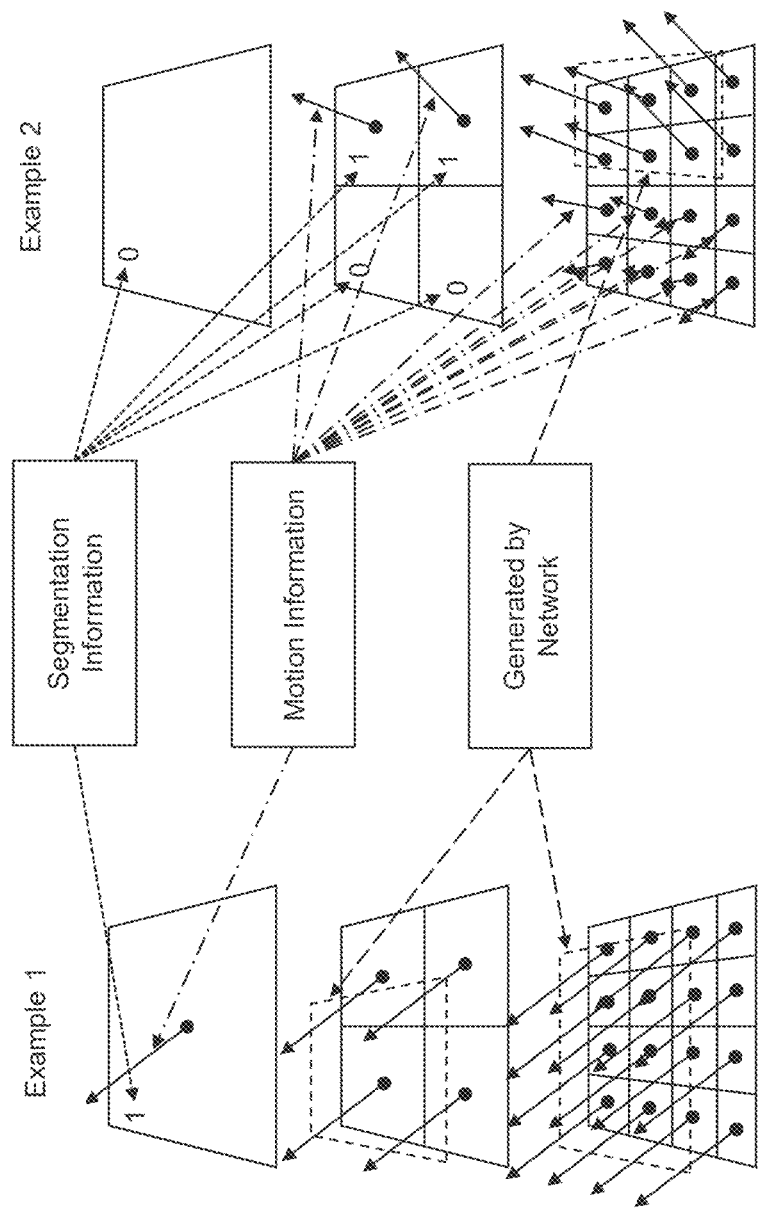
FIG. 32A is a schematic drawing illustrating upsampling processing at the decoder side employing nearest neighbor copying.

FIG. 32A illustrates two examples of a reconstruction applying nearest neighbor approach. In particular, Example 1 shows a case in which the segmentation information for the lowest resolution layer has a value of flag set (to one). Correspondingly, motion information indicates one motion vector. Since motion vector is already indicated in the lowest resolution layer, no further motion vectors and no further segmentation information are signaled in the bitstream. The network generates, from the one signaled motion vector, by copying it during the upsampling by nearest neighbor, the respective motion vector fields with a higher resolution (2×2) and the highest resolution (4×4). A result is the 4×4 area with all 16 motion vectors identical and equal to the signaled motion vector.

Figure 32B:
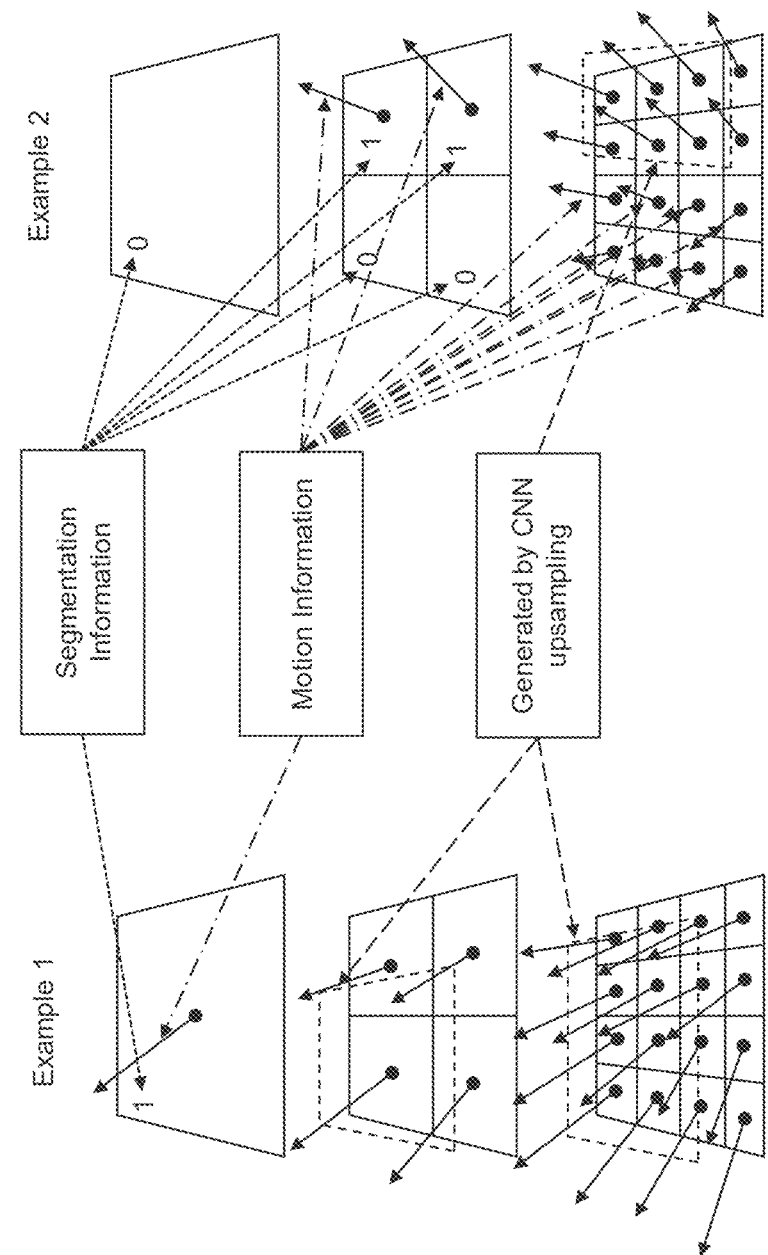
FIG. 32B is a schematic drawing illustrating upsampling processing at the decoder side employing convolution processing.

FIG. 32B illustrates two examples of a reconstruction applying a convolutional layer based approach. Example 1 has the same input as Example 1 of FIG. 32A. In particular, the segmentation information for the lowest resolution layer has a value of flag set (to one). Correspondingly, motion information indicates one motion vector. However, instead of merely copying the one motion vector, after applying a convolutional layer (possibly trained), the motion vectors in the higher and highest layer are not completely identical.

Similarly, Example 2 in FIG. 32A shows a segmentation information of 0 in the lowest resolution layer, and segmentation information 0101 for the following (the higher resolution) layer. Correspondingly, two motion vectors for the position indicated by the segmentation information ones are signaled in the bitstream, as motion information. These are shown in the middle layer. As can be seen in the bottom layer, the signaled motion vectors are copied, each of them four times to cover the highest resolution area. The remaining 8 motion vectors of the highest resolution (bottom) layer are signaled in the bitstream. Example 2 of FIG. 32B applies convolution instead of the nearest neighbor copying. The motion vectors are no longer copied. The transition between the motion vectors which were copied in FIG. 32A is now somewhat smoother, enabling for blocking artifact reduction.

Similarly to the second modification discussed above for the encoder, at the decoder, the plurality of cascaded layers comprises convolutional layers without upsampling between layers with different resolutions. It is noted that encoder and decoder are not necessarily symmetric in this regard: encoder may have such additional layers and decoder not or vice versa. Of course, the encoder and decoder may also be designed symmetrically and have the additional layers between corresponding downsampling and upsampling layers of the encoder and the decoder.

Regarding the combination of the segmentation information processing and the feature map processing, the obtaining of the feature map elements from the bitstream is based on a processed segmentation information processed by at least one of the plurality of segmentation information processing layers. Segmentation layers may parse and interpret the segmentation information as is described below in more detail in the section Decoding using segmentation information. It is noted that the embodiments and examples described therein are applicable in combination with the embodiments in the current section. In particular, the layer processing of the segmentation information described with reference to FIGS. 26 to 32B below may be also performed in combination with the feature map processing described herein.

For example, the inputting of each of the two or more sets of feature map elements respectively into two or more feature map processing layers is based on a processed segmentation information processed by at least one of the plurality of segmentation information processing layers. The obtained segmentation information is represented by a set of syntax elements, wherein the position of an element in the set of syntax elements indicates to which feature map element position the syntax element relates. The set of syntax elements is for instance a bitstream portion which may be binarized using a fixed code, an entropy code such as variable length code or arithmetic code, any of which may be context adaptive. The present disclosure is not limited to any particular coding or form of the bitstream, once it has a pre-defined structure known to both the encoder side and the decoder side. In this way, the parsing and the processing of the segmentation information and the feature map information may be done in association. For instance, the processing of the feature map comprises, for each of the syntax elements: (i) when the syntax element has a first value, parsing from the bitstream an element of the feature map on the position indicated by the position of the syntax element within the bitstream, and (ii) otherwise (or, more generally, when the syntax element has a second value), bypassing parsing from the bitstream the element of the feature map on the position indicated by the position of the syntax element within the bitstream. The syntax elements can be binary flags which are ordered into the bitstream at the encoder and parsed in the correct order from the decoder by a particular layer structure of the processing network.

It is noted that the options (i) and (ii) may be provided also for syntax elements that are not binary. In such case, the first value means parsing and the second value mean bypassing. The syntax element may take some further values apart from the first value and the second value. These may also lead to parsing or bypassing or may indicate a particular type of parsing or the like. The number of parsed feature map elements may correspond to the amount of the syntax elements equal to first value.

According to an exemplary implementation, the processing of the feature map by each layer $1<j<N$ of the plurality of N feature map processing layers further comprises: parsing segmentation information elements for the j-th feature map processing layer from the bitstream; and obtaining the feature map processed by a preceding feature map processing layer, as well as parsing, from the bitstream, a feature map element and associating the parsed feature map element with the obtained feature map, wherein the position of the feature map element in the processed feature map is indicated by the parsed segmentation information element, and segmentation information processed by preceding segmentation information processing layer. The associating can be, for instance, a replacement of previously processed feature map elements, or combining, e.g. addition, subtraction or multiplication. Some exemplary implementations are provided below. The parsing may depend on the previously processed segmentation information, which provides the possibility of a very compact and efficient syntax.

For example, the method may comprise, when the syntax element has a first value, parsing from the bitstream an element of the feature map, and bypassing parsing from the bitstream the element of the feature map, when the syntax element has a second value or segmentation information processed by a preceding segmentation information processing layer has a first value. This means that parsing is bypassed if the relevant parts were parsed on a preceding layer. For instance, the syntax element parsed from the bitstream representing the segmentation information is a binary flag. As mentioned above, it may be beneficial that the processed segmentation information is represented by a set of binary flags. The set of the binary flags is a sequence of the binary flags having each value either 1 or 0 (corresponding to the first value and the second value mentioned above).

In some embodiments, the upsampling of the segmentation information in each segmentation information processing layer j further comprises, for each p-th position in the obtained feature map that is indicated by the inputted segmentation information, determining as upsampled segmentation information, indications for feature map positions that are included in the same area in the reconstructed picture as the p-th position. This provides a spatial relation between the reconstructed image (or reconstructed feature map or generally data), positions in a subsampled feature map and the corresponding segmentation flags.

As already mentioned above, as well as in the encoder embodiments, the data for picture or video processing may comprise picture data (such as picture samples) and/or prediction residual data and/or prediction information data. When referring in the present disclosure to "residuals", it is noted that these may be pixel-domain residuals or transform (spectral) coefficients (i.e. transformed residuals, residuals represented in a domain different from the sample/pixel domain).

Similarly to the fourth modification described for the encoder side above, according to an exemplary implementation, a filter is used in the upsampling of the feature map, and the shape of the filter is any one of square, horizontal rectangular and vertical rectangular. It is noted that the filter shapes may be similar as the partition shapes shown in FIG. 25.

An exemplary decoder side layer processing is shown in FIG. 20. The motion generation network (unit) 2060 includes a signal feeding logic and one or more (here two) upsampling layers using a filter (upsampling filter) which may be selected out of a predetermined or predefined set of filters. The selection may be performed at the encoder side, e.g. by an RDO or by other setting, and signaled in the bitstream. At the decoder side, the indication of the filter selection is parsed from the bitstream and applied. Alternatively, the filter may be selected at the decoder without signaling it explicitly based on other coding parameters derived based on the bitstream. Such parameters may be any parameters correlated with the content such as prediction type, direction, motion information, residuals, loop filtering characteristics or the like.

Figure 31:
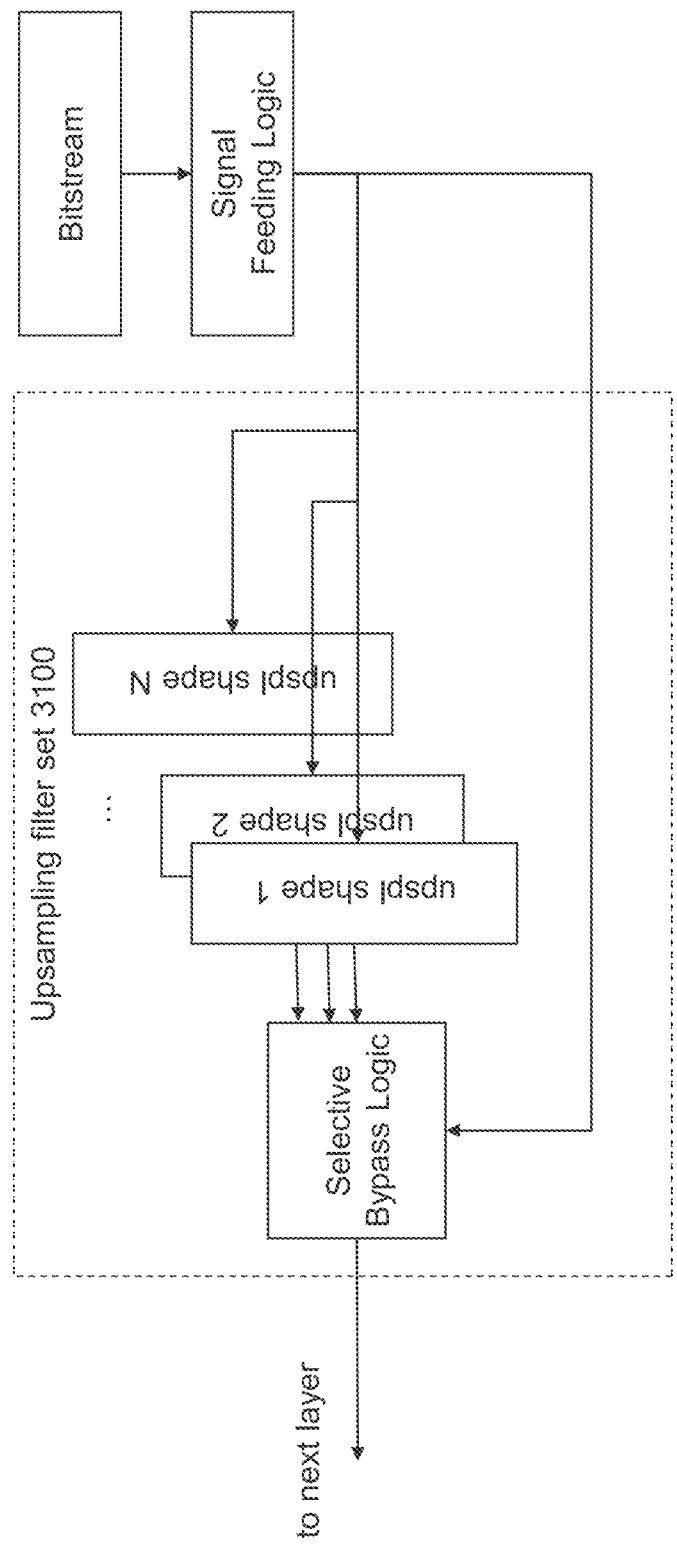
FIG. 31 is a block diagram showing an upsampling filter set.

FIG. 31 shows a block diagram of an upsampling filter unit 3100 which supports selection of one among N filters 1 to N. The signaling of the filter selection may include directly an index of one of the N filters. It may include filter orientation, filter order, filter shape and/or coefficients. At the decoding side, the signal feeding logic interprets the filter selection flag (e.g. an orientation flag to distinguish vertical and horizontal filter or further orientations) and feeds the feature map value(s) to the layer with corresponding filter shape set. In FIG. 31, the direct connection from the signal feeding logic to the selective bypass logic enables not to select any of the filters. The corresponding value of the filter selection indicator may be also signaled in the bitstream or derived.

In general, a filter is used in the upsampling of the feature map, and the inputting information from the bitstream further comprises: obtaining information indicating the filter shape and/or filter orientation and/or filter coefficients from the bitstream. There may be implementations in which each layer has a set of filters to select from, or implementations in which each layer is one filter and the signal feeding logic determined based on the filter selection flag (indicator) which layers are to be selected and which layers are to be bypassed.

In some embodiment, a flexible filter shape may be provided in that said information indicating the filter shape indicate a mask comprised of flags, and the mask represents the filter shape in that a flag having a third value indicates a non-zero filter coefficient and the flag having a fourth value different from the third value indicates a zero filter coefficient. In other words, as also already described for the encoder side, a filter shape may be defined by indicating position of non-zero coefficients. The non-zero coefficient may be derived based on a pre-defined rule or also signaled.

The above decoder embodiments may be implemented as a computer program product stored on a non-transitory medium, which when executed on one or more processors performs the steps of any of the above-described methods. Similarly, she above decoder embodiments may be implemented as a device for decoding an image or video including a processing circuitry which is configured to perform the steps of any of the above-described methods. In particular, a device may be provided for decoding data for picture or video processing from a bitstream, the device comprising: an obtaining unit configured to obtain from the bitstream two or more sets of feature map elements, wherein each set of feature map elements relates to a feature map, an inputting unit configured to input each of the two or more sets of feature map elements respectively into two or more feature map processing layers out of a plurality of cascaded layers, and a decoded data obtaining unit configured to obtain said decoded data for picture or video processing as a result of the processing by the plurality of cascaded layers. These units may be implemented in software or hardware or as a combination of both as is discussed below in more details.

Decoding Using Segmentation Information

On the receiving side the decoder of this embodiment performs parsing and interpretation of segmentation information. Accordingly, a method is provided, as illustrated in FIG. 34, for decoding data for picture or video processing from a bitstream. Correspondingly, an apparatus is provided for decoding data for picture or video processing from a bitstream. The apparatus may comprise processing circuitry which is configured to perform steps of the method.

The method comprises obtaining 3410, from the bitstream, two or more sets of segmentation information elements. The obtaining may be performed by parsing the bitstream. The bitstream parsing, in some exemplary implementation, may also include entropy decoding. The present disclosure is not limited to any particular way of obtaining the data from the bitstream. The method further comprises inputting 3420 each of the two or more sets of segmentation information elements respectively into two or more segmentation information processing layers out of a plurality of cascaded layers. It is noted that segmentation information processing layers may be the same layers or different layers as the feature map processing layers. In other words, one layer may have one or more functionalities.

Furthermore, in each of the two or more segmentation information processing layers, the method comprises processing the respective sets of segmentation information. Obtaining 3430 said decoded data for picture or video processing is based on the segmentation information processed by the plurality of cascaded layers.

Figure 26:
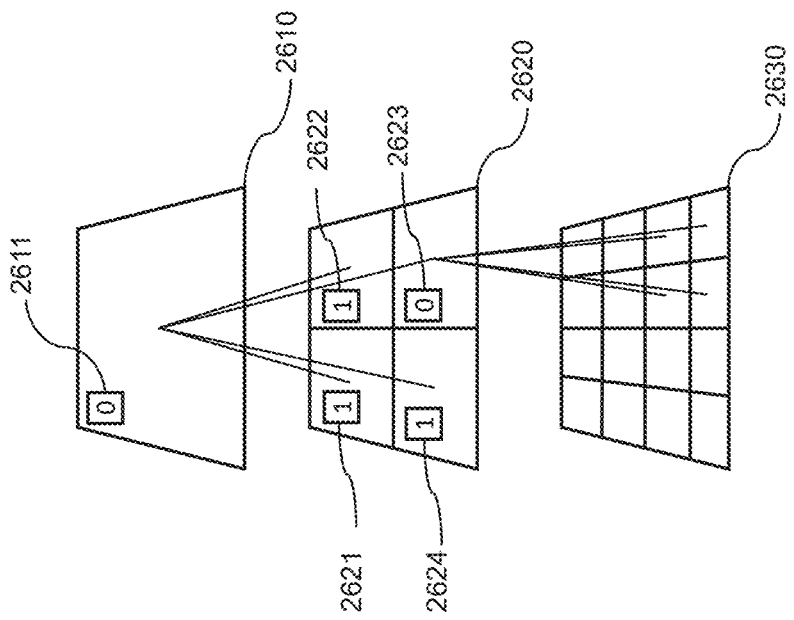
FIG. 26 is a schematic drawing illustrating derivation of segmentation information.

FIG. 26 illustrates an exemplary segmentation information for three-layer decoding. The segmentation information may be seen as selecting (cf. the encoder-side description) layers for which feature map elements are to be parsed or otherwise obtained. Feature map element 2610 is not selected. Accordingly, flag 2611 is set to 0 by the encoder. This means, that the feature map element 2610 with the lowest resolution is not included in the bitstream. However, the flag 2611 indicating that the feature map element is not selected, is included in the bitstream. If, for example, the feature map elements are motion vectors, this may mean that the motion vector 2610 for the largest block is not selected and not included in the bitstream.

In the example shown in FIG. 26, in feature map 2620, out of the four feature map elements that are used to determine the feature map element of feature map 2610, three feature map elements are selected for signaling (indicated by flags 2621, 2622 and 2624) while one feature map element 2623 is not selected. In the example of using motion vectors, this may mean that from feature map 2620, three motion vectors are selected and their respective flags are set to 1, while one feature map element is not selected and its respective flag 2623 is set to 0.

The bitstream may then comprise all four flags 2621 to 2624 and the three selected motion vectors. In general, the bitstream may comprise the four flags 2621 to 2624 and the three selected feature map elements. In feature map 2630, one or more of the elements that determine the non-selected feature map element of feature map 2620 may be selected.

In this example, when a feature map element is selected, none of the elements of the higher resolution feature maps are selected. In this example, none of the feature map elements of feature map 2630 that are used to determine the feature map elements signaled by flags 2621, 2622 and 2624, are selected. In an embodiment, none of the flags of these feature map elements are included in the bitstream. Rather, only flags of feature map elements of feature map 2630 that determine the feature map element with flag 2623 are included in the bitstream.

In an example where the feature map elements are motion vectors, feature map elements 2621, 2622 and 2624 may each be determined by groups of four motion vectors each in feature map 2630. In each of the groups determining the motion vectors with the flags 2621, 2622 and 2624, the motion vectors may have more similarity with each other than the four motion vectors in feature map 2630 that determine the motion vector (feature map element) in feature map 2620 that is not selected (signaled by flag 2623).

FIG. 26 was described above by characteristics of the bitstream. It is noted that the decoder decodes (parses) such bitstream accordingly: it determines which information is included (signaled) based on the value of the flags as described above and parses/interprets the parsed information accordingly.

Figure 27:
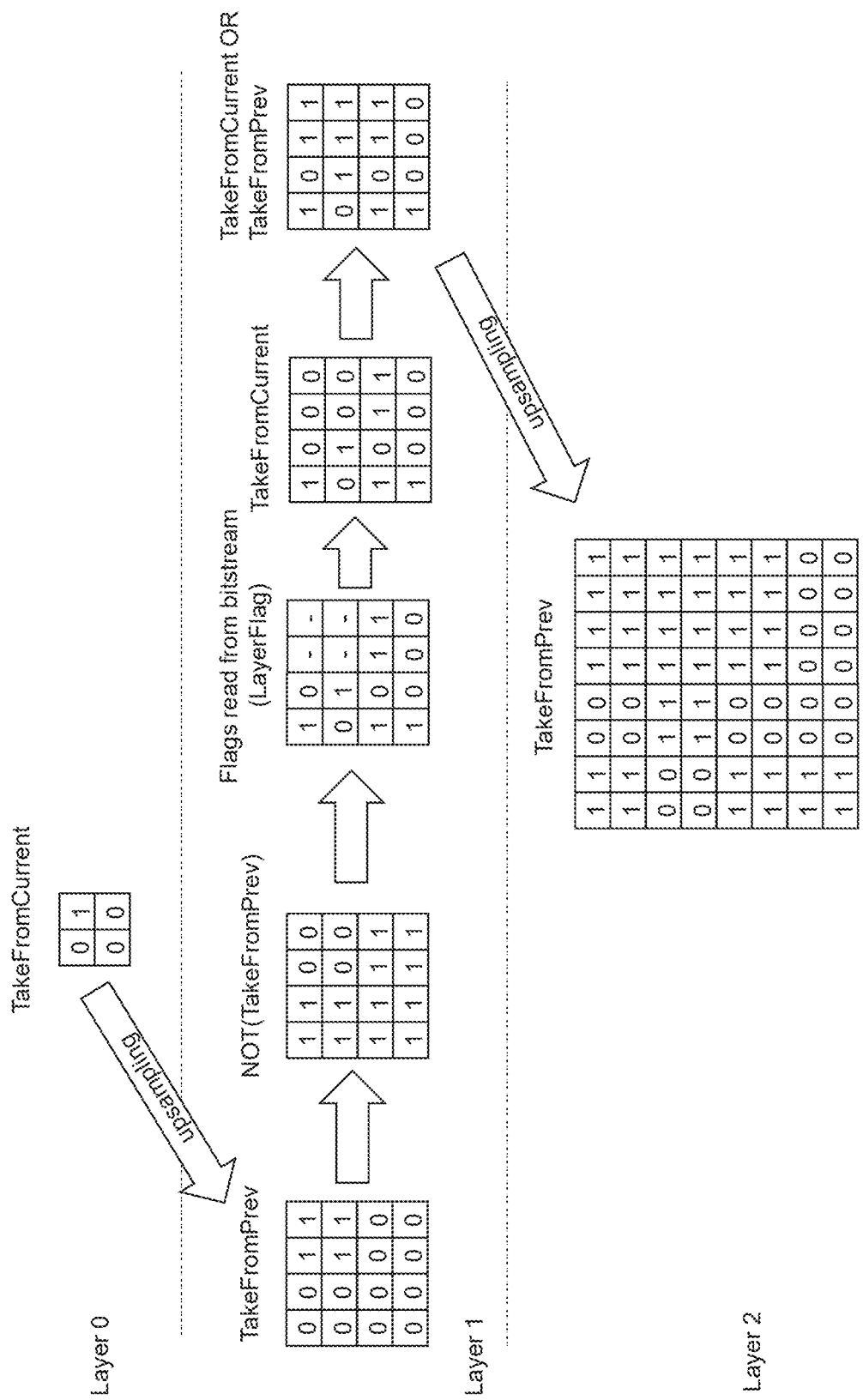
FIG. 27 is a schematic drawing illustrating processing of segmentation information at the decoder side.

In an exemplary implementation, the segmentation Information is organized as illustrated in FIG. 27. For 2D information such as image or video considered as a sequence of images, the feature map of some layer can be represented in a two-dimensional space. The segmentation information comprises indicator (a binary flag) for the positions of the 2D space indicating whether a feature map value corresponding to this position is presented in the bitstream.

In FIG. 27, there is a starting layer (layer 0) for decoding the segmentation information, e.g. layer of the lowest resolution, i.e. latent representation layer. For this starting layer, each 2D position comprises a binary flag. If such flag is equal to 1, then the selected information comprises the feature map value for this position at this particular layer. If, on the other hand, such flag is equal to 0, then there is no information for this position at this particular layer. This set of flags (or tensor of flags in general, here a matrix of flags) will be referred to as TakeFromCurrent. The TakeFromCurrent tensor is upsampled to a next layer resolution, for example using nearest neighbor method. Let us denote this tensor as TakeFromPrev. The flags in this tensor indicate whether the corresponding sample positions were filled at the previous layers (here Layer 0) or not.

As a next step, the signal feeding logic reads flags for the positions of the current resolution layer (LayerFlag). In this exemplary implementation only positions which were not filled at the previous layers (not set to one, not filled with feature map element value(s)) are signaled. Using logical operations it can be expressed as TakeFromPrev==0 or!TakeFromPrev==1, where '!' represents the logical NOT operation (negation).

The amount of flags required for this layer can be calculated as an amount of zero (logical False) elements in TakeFromPrev tensor or amount of values having 1 (logical True) in the inverted (!TakeFromPrev) tensor. No flags are necessary in the bitstream for the non-zero elements in TakeFromPrev tensor. This is indicated in the figure by showing "-" on the positions which do not need to be read. From the implementation point of view it may be easier to calculate sum of elements on the inverted tensor as sum (!TakeFromPrev). The signal feeding logic can use this arithmetic to identify how many flags need to be parsed from the bitstream. Read flags are placed at the positions where the values of!TakeFromPrev are equal to 1 to obtain a LayerFlag tensor. Then TakeFromCurrent tensor of the current resolution layer (here Layer 1) is obtained as a combination of TakeFromPrev and LayerFlag tensors by keeping the flags at the position read from the bitstream for the current resolution layer and zeroing the values for the positions which were read at the previous resolution layers (positions marked by "-" in LayerFlag). That can be expressed and implemented using logical AND operator as follows: TakeFromCurrent=! TakeFromPrev AND LayerFlag. Then, to take into account the positions which were read at the previous resolution layers TakeFromCurrent tensor is obtained using logical OR operation as TakeFromCurrent=TakeFromCurrent OR TakeFromPrev. It should be understood than Boolean operations can be implemented using regular math operation e.g. multiplication for AND and summation for OR. That would give a benefit of preserving and transferring gradients which allows to use described above method in end-to-end training.

The obtained TakeFromCurrent tensor is then upsampled to a next resolution layer (here Layer 2) and the described above operations are repeated.

For the sake of generality and easing the implementation, it is beneficial to unify processing for all resolution layers without special consideration of first resolution layer, for which all flags are parsed from the bitstream. This can be achieved by initializing TakeFromPrev by zeros before processing in the first (lower resolution) layer (Layer 0) and repeating the steps described above for each resolution layer.

To further reduce the signaling overhead, in some further implementations, LayerFlags for the last resolution layer (here the third layer, i.e. Layer 2) do not need to be transferred (included at the encoder, parsed at the decoder) into the bitstream. That means that for the last resolution layer, the feature map values are transmitted in the bitstream as the selected information (cf. 1120 in FIG. 11) for all the positions of the last resolution layer, which were not obtained at (all) the previous resolution layers (at any of the previous resolution layers). In other words, for the last resolution layer, TakeFromCurrent=! TakeFromPrev, i.e. TakeFromCurrent corresponds to the negated TakeFromPrev. Again, for keeping the generality of processing for the last resolution layer, LayerFlag can be initialized by ones, and the same formula can be used: TakeFromCurrent=! TakeFromPrev AND LayerFlag.

In some further possible implementations, the last resolution layer has the same resolution as the original image. If the last resolution layer has no additional processing steps, that implies transmitting some values of the original tensor, bypassing the compression in the autoencoder.

In the following, an example of a signal feeding logic 2800 is described with reference to FIG. 28. In FIG. 28, the signal feeding logic 2800 of the decoder uses the segmentation information (LayerFlag) to obtain and utilize selected information (LayerMv) transmitted in the bitstream. In particular, at each layer, bitstream is parsed to obtain the segmentation information (LayerFlag) and possibly also the selected information (LayerMv) in the respective syntax interpretation units 2823, 2822, and 2821 (in this order). As mentioned above, in order to enable the same operation in the first layer (syntax interpretation 2823) as in the other layers, TakeFromPrev tensor is initialized to all zeros in 2820. The TakeFromPrev tensor is propagated in the order of processing from syntax interpretation of earlier layer (e.g. from 2823) to a syntax interpretation of a later layer (e.g. 2822). The propagation here includes upsampling by two, as was also explained with reference to FIG. 27 above.

During interpreting the segmentation information (LayerFlag) at each resolution layer, the tensor TakeFromCurrent is obtained (generated). This tensor TakeFromCurrent contains flags indicating whether or not feature map information (LayerMv) is present in the bitstream for each particular position of the current resolution layer. The decoder reads the values of the feature map LayerMv from the bitstream, and places them at the positions where the flags of the TakeFromCurrent tensor are equal to 1. The total amount of feature map values contained in the bitstream for the current resolution layer can be calculated based on the amount of non-zero elements in the TakeFromCurrent or as sum (Take-FromCurrent)—a sum over all elements of the TakeFrom-Current tensor. As a next step, a tensor combination logic 2813, 2812, and 2811 in each layer (e.g. at 2812) combines the output of the previous resolution layer (e.g. generated by 2813 and upsampled 2801 to match the resolution of the following layer processing 2812) by replacing feature map values at the positions where values of the TakeFromCurrent tensor are equal to 1 by feature map values (LayerMv) transmitted in the bitstream as the selected information. As mentioned above, in order to enable the same operation in the first layer (tensor combination 2813) as in the other layers, a combined tensor is initialized to all zeros in 2810. After processing of the LayerFlags from all layers and the generation of the output tensor of the last layer (in 2811), the combines tensor is upsampled by 4 in 2801 to obtain the original size of the dense optical flow, which is W×H.

The exemplary implementation of FIG. 28 provides a fully parallelizable scheme which may run on GPU/NPU and enable exploiting parallelism. A fully trainable scheme transferring gradients allows to use it in end-to-end trainable video coding solutions.

FIG. 29 shows another possible and exemplary implementation of the signal feeding logic 2900. This implementation generates a LayerIdx tensor (called LayerIdxUp in FIG. 29), containing indices of layers of different resolutions indicating which layer should be used to take motion information transferred (included at the encoder, parsed at the decoder) in the bitstream. At each syntax interpretation block (2923, 2922, 2923), LayerIdx tensor is updated by adding TakeFromCurrent tensor multiplied by the upsampling layer index numbered from the highest resolution to the lowest resolution. Then the LayerIdx tensor is upsampled and transferred (passed) to the next layer in the processing order, e.g. from 2923 to 2922, and from 2922 to 2921. In order to make the processing in all layers similar, tensor LayerIdx is zero initialized in 2920 and passed to the syntax interpretation 2923 of the first layer.

After the last (here third) layer, the LayerIdx tensor is upsampled to the original resolution (upsampling 2995 by 4). As a result, each position of LayerIdx contains the index of layer to take motion information from. The positions of LayerIdx correspond in the same resolution to the original resolution of the feature map data (here the dense optical flow) and are in this example 2D (matrix). Thus for each position in the reconstructed optical flow, the LayerIdx specifies where (from MayerMV of which layer) to take the motion information from.

The motion information (LayerMv, also referred to as LayerMvUp in FIG. 29) is generated in the following way. At each spatial resolution layer, the tensor combination block (2913, 2912, 2911) combines the LayerMv obtained from the bitstream (passed through the respective syntax interpretation units 2923, 2922, 2921) with an intermediate tensor based on the segmentation Information (LayerFlag) obtained from the bitstream and an intermediate TakeFrom-Current Boolean tensor according to the method described above. The intermediate tensor can be initialized by zeros (cf. initializing units 2910, 2919, 2918) or any other value. The initialization value has no importance, since finally after completing of all the steps, these values are not selected for the dense optical flow reconstruction 2990 according to this method. The combined tensor (output from each of 2913, 2912, 2911) containing motion information is upsampled and concatenated (2902, 2901) with the combined tensor of previous spatial resolution layer. The concatenation is performed along additional dimension which corresponds to the motion information obtained from layers of different resolution (i.e. 2D tensor before concatenation 2902 becomes 3D tensor after the concatenation; 3D tensor before concatenation 2901 remains 43D tensor after the concatenation, but size of the tensor is increased). Finally, after completion of all upsampling steps for LayerIdxUp and LayerMvUp, the reconstructed dense optical flow is obtained by selecting motion information from LayerMvUp, using values of LayerIdxUp as indices on the axis in the LayerMvUp, where axis is a dimension increased during LayerMvUp concatenation step. In other words, the added dimension in the LayerMvUp is the dimension over the number of layers, and LayerIdxUp selects the appropriate layer for each position.

The above-described particular exemplary implementations are not to limit the present disclosure. In general, the segmentation can be performed and signaled within the bitstream in various conceivable ways. In general, the obtaining of the sets of segmentation information elements is based on segmentation information processed by at least one segmentation information processing layer out of the plurality of cascaded layers. Such layer may include, as shown in FIG. 28, the syntax interpretation unit (2823, 2822, 2821) which parses/interprets the meaning (semantic) of the parsed segmentation information LayerFlag.

More specifically, the inputting of the sets of segmentation information elements is based on the processed segmentation information outputted by at least one of the plurality of cascaded layers. This is illustrated e.g. in FIG. 28 by the passing of TakeFromPrev tensor between the syntax interpretation units (2823, 2822, 2821). As already explained in the description for the encoder side, in some exemplary implementations, the segmentation information processed respectively in the two or more segmentation information processing layers differ in resolution.

Moreover, the processing of the segmentation information in the two or more segmentation information processing layers includes upsampling, as already exemplified with reference to FIG. 9, 13 and others. For example, said upsampling of the segmentation information comprises a nearest neighbor upsampling. It is noted that in this embodiment as well as in preceding embodiments, the present disclosure is not limited by applying the nearest neighbor upsampling. The upsampling may include interpolation rather than the simple copying of neighboring sample (element) values. The interpolation may be any known interpolation such as linear or polynomial, e.g. a cubic upsampling or the like. Regarding the copying, it is noted that the copying performed by the nearest neighbor is a copying of an element value from a predefined (available) closest neighbor, e.g. top or left. The predefinition of such neighbor from which it is copied may be necessary if there are neighbors in the same distance from the position to be filled.

As described above for the first modification, in some exemplary implementations, said upsampling comprises a transposed convolution. In addition or alternatively to applying the convolution upsampling to the feature map information, the convolution upsampling may be applied for the segmentation information, too. It is noted that the upsampling type performed for the segmentation information is not necessarily the same upsampling type which is applied to the feature map elements.

In general, for each segmentation information processing layer j of the plurality of N segmentation information processing layers out of the plurality of cascaded layers the inputting comprises:

inputting initial segmentation information from the bitstream (and/or based on an initialization, e.g. initialization to zero in 2820) if j=1, and otherwise inputting segmentation information processed by the (j−1)-th segmentation information processing layer; and outputting the processed segmentation information.

This is the segmentation information relevant for the input layer, not necessarily (still possibly) the entire segmentation information from the bitstream. Upsampled segmentation information in the j-th layer is the segmentation information that was upsampled in the j-th layer, i.e. output by the j-th layer. In general, the processing by a segmentation layer includes upsampling (TakeFromPrev) and including new elements (LayerFlag) from the bitstream.

For example, the processing of the inputted segmentation information by each layer j<N of the plurality of N segmentation information processing layers further comprises parsing, from the bitstream, a segmentation information element (LayerFlag) and associating (e.g. in the syntax interpretation units 282x in FIG. 28) the parsed segmentation information element with the segmentation information (TakeFromPrev) outputted by a preceding layer. The position of the parsed segmentation information element (LayerFlag) in the associated segmentation information is determined based on the segmentation information outputted by the preceding layer. As could be seen in FIGS. 28 and 29, there may be various different ways of associating and propagating the position information. The present disclosure is not limited to any specific implementation.

For example, the amount of segmentation information elements parsed from the bitstream is determined based on segmentation information outputted by the preceding layer. In particular, if some area was already covered by segmentation information from the previous layers, it does not have to be covered again on the following layers. It is notes that this design provides an efficient parsing approach. Each position of the resulting reconstructed feature map data corresponding to the position of the resulting reconstructed segmentation information is only associated with segmentation information pertaining to a single layer (among the N processing layers). This, there is no overlap. However, the present disclosure is not limited to such approaches. It is conceivable, that the segmentation information is overlapping, even though it may lead to maintaining some redundancy.

As already shown in FIG. 27, in some embodiments, the parsed segmentation information elements are represented by a set of binary flags. The ordering of the flags within the bitstream (syntax) may convey the association between the flags and the layer they belong to. The ordering (sequence) may be given by the predefined order of processing at the encoder and—correspondingly—at the decoder. These were exemplified, for instance in FIGS. 16 and 28.

In some exemplary embodiments—for example those mentioned above with reference to seventh modification, obtaining decoded data for picture or video processing comprises determining of at least one of the following parameters based on segmentation information. The segmentation information may, similarly as for the motion information, determine the parsing of the additional information, such as the coding parameters, which may include intra- or inter-picture prediction mode; picture reference index; single-reference or multiple-reference prediction (including bi-prediction); presence or absence prediction residual information; quantization step size; motion information prediction type; length of the motion vector; motion vector resolution; motion vector prediction index; motion vector difference size; motion vector difference resolution; motion interpolation filter; in-loop filter parameters; and/or post-filter parameters or the like. In other words, the segmentation information when processed by the segmentation information processing layers may specify from which processing layer of the coding parameters, the coding parameters may be obtained. For example, in the above described encoder approach of FIG. 22 or 23, the reconstruction (coding) parameters may be received from the bitstream instead of (or in addition to) the motion information (LayerMv). Such reconstruction (coding) parameters blk_rec_params may be parsed in the same way at the decoder as exemplified in FIGS. 28 and 29 for the motion information.

In general, segmentation information is used for feature map elements (motion information or any of the above mentioned reconstruction parameters or sample related data) parsing and inputting. The method may further comprise obtaining, from the bitstream, sets of feature map elements and inputting the sets of feature map elements respectively into a feature map processing layer out of the plurality of layers based on the segmentation information processed by a segmentation information processing layer. Moreover, the method further comprises obtaining the decoded data for picture or video processing based on a feature map processed by the plurality of cascaded layers. In particular, in some embodiments, at least one out of the plurality of cascaded layers is a segmentation information processing layer as well as a feature map processing layer. As mentioned above, the network may be designed with separated segmentation information processing layers and feature map processing layers or with combined layers having both functionalities. In some implementations, each layer out of the plurality of layers is either a segmentation information processing layer or a feature map processing layer.

The above mentioned methods may be embodied as a computer program product stored on a non-transitory medium, which, when executed on one or more processors causes the processors to perform the steps of any of those methods. Similarly, a device is provided for decoding an image or video, including a processing circuitry which is configured to perform the method steps of any of the methods discussed above. The functional structure of the apparatuses also provided by the present disclosure may correspond to the embodiments mentioned above and to the functions provided by the steps. For example, a device is provided for decoding data for picture or video processing from a bitstream, the device comprising: an obtaining unit configured to obtain, from the bitstream, two or more sets of segmentation information elements; an inputting unit configured to input each of the two or more sets of segmentation information elements respectively into two or more segmentation information processing layers out of a plurality of cascaded layers; a processing unit, configured to process, in each of the two or more segmentation information processing layers, the respective sets of segmentation information; and a decoded data obtaining unit configured to obtain said decoded data for picture or video processing based on the segmentation information processed in the plurality of cascaded layers. These units and further units may perform all functions of the methods mentioned above.

BRIEF SUMMARY OF SOME EMBODIMENTS

Embodiment Regarding Encoding Using Feature Information or Segmentation Information According to an aspect of the present disclosure, a method is provided for encoding data for image or video processing into a bitstream, the method comprising: processing the data, the processing comprising, in a plurality of cascaded layers, generating feature maps, each feature map comprising a respective resolution, wherein the resolutions of at least two of the generated feature maps differ from each other, selecting, among the plurality of layers, a layer different from the layer generating the feature map of the lowest resolution; and generating the bitstream including inserting into the bitstream information related to the selected layer.

Such method may provide an improved efficiency of such encoding, as it enabled data from different layers to be encoded, and thus features or other kind of layer related information of different resolutions to be included into the bitstream.

According to an aspect of the present disclosure, a device for encoding data for image or video processing into a bitstream, the device comprising: a processing unit configured to process the data, the processing comprising, in a plurality of cascaded layers, generating feature maps of mutually different resolution, each feature map comprising a respective resolution, a selecting unit configured to select, among the plurality of layers, a layer different from the layer generating the feature map of the lowest resolution; and a generating unit configured to generate the bitstream including inserting into the bitstream an indication of data related to the selected layer. The processing unit, selecting unit, and generating unit may be implemented by a processing circuitry such as one or more processors or any combination of software and hardware.

Such device may provide an improved efficiency of such decoding, as it enabled data from different layers to be decoded and used for reconstruction, and thus enabled the usage of features or other kind of layer related information of different resolutions.

In an exemplary implementation, the processing further comprising downsampling by one or more of the cascaded layers. Application of downsampling enables on one hand reduction of complexity of processing and, on the other hand, may also reduce data to be provided within the bitstream. Still further, layers processing different resolutions may in this way focus on features at different scales. Accordingly, networks processing pictures (still or video) may operate efficiently.

For example, the one or more downsampling layer comprises average pooling or max pooling for the downsampling. Average pooling and max pooling operations are part of several frameworks, they provide efficient means for downsampling with low complexity.

In another example, a convolution is used in the downsampling. Convolution may provide some more sophisticated way of downsampling with kernels that may be selected suitably for particular applications, or even trainable. This enables learnable downsampling process allowing to find more appropriate latent representation of motion information and keep the advantage of representing and transfer information of different spatial resolution which increases adaptivity.

In an exemplary implementation, the information related to the selected layer includes an element of a feature map of that layer.

By providing features with different resolution, scalability of the encoding/decoding is increased and the bitstream so produced may provide more flexibility to meet the optimization criteria such as rate, distortion, complexity or the like, ultimately providing the possibility of increased coding efficiency.

In any of the above examples, for instance, the information related to the selected layer includes information indicating from which layer and/or from which part of the feature map of that layer the element of the feature map of that layer was selected.

Signaling the segmentation information may provide for an efficient coding of the feature map from different layers so that each area of the original (to be coded) feature map (data) may be covered only by information from one layer. Although this is not to limit the invention which may, in some cases, also provide overlap between layers for a particular area in the feature map (data) to be encoded.

The method mentioned above comprises in an exemplary implementation a step of obtaining data to be encoded; wherein the processing of the data to be encoded includes processing by each layer j of the plurality N of cascaded layers comprising: obtaining as layer input the data to be encoded if j=1, and otherwise obtaining as layer input a feature map processed by the (j−1)-th layer; processing the obtained layer input, the processing including downsampling; and outputting the downsampled feature map.

Correspondingly, the apparatus mentioned above, in an exemplary implementation, has the processing unit which is configured to obtain the data to be encoded and to perform the processing of the data to be encoded including processing by each layer j of the plurality N of cascaded layers comprising: obtaining as layer input the data to be encoded if j=1, and otherwise obtaining as layer input a feature map processed by the (j−1)-th layer; processing the obtained layer input, the processing including downsampling; and outputting the downsampled feature map.

The method according to any of previous examples comprises in some embodiments selecting information for inserting into the bitstream, the information relating to a first area in a feature map processed by a layer j>1, wherein the first area corresponds to an area in the feature map or initial data to be encoded in a layer smaller than j that includes a plurality of elements; and excluding, from selection in feature maps processed by layers k, wherein k is an integer equal to or larger than 1 and k<j, areas that correspond to the first area from being selected.

The apparatus according to any of previous examples comprises in some embodiments the processing circuitry further configured for selecting information for inserting into the bitstream, the information relating to a first area in a feature map processed by a layer j>1, wherein the first area corresponds to an area in the feature map or initial data to be encoded in a layer smaller than j that includes a plurality of elements; and excluding, from selection in feature maps processed by layers k, wherein k is an integer equal to or larger than 1 and k<j, areas that correspond to the first area from being selected.

Such selection in certain layer does not cover areas of the original feature map covered by other layers may be particularly efficient in terms of coding overhead.

In any of the above examples, for instance, the data to be encoded comprises image information and/or prediction residual information and/or prediction information.

Alternatively, the information related to the selected layer includes prediction information.

In any of the above examples, for instance, the data related to the selected layer includes an indication of the position of the feature map element in the feature map of the selected layer.

Such indication enables to associate the feature map elements of different resolutions properly with the input data areas.

In any of the above examples, for instance, the positions of selected and non-selected feature map elements are indicated by a plurality of binary flags, the indicating being based on the positions of the flags in the bitstream.

The binary flags provide particularly efficient manner of coding the segmentation information.

According to an embodiment, in the method or in the apparatus mentioned above, the processing by a layer j of the plurality N of cascaded layers comprises: determining a first cost resulting from reconstructing a portion of a reconstructed picture using a feature map element output by the j-th layer, determining a second cost resulting from reconstructing the portion of the picture using feature map elements output by the (j−1)-th layer; if the first cost is higher than the second cost, selecting the (j−1)-th layer and selecting information relating to said portion in the (j−1)-th layer.

Provision of an optimization including distortion provides efficient means to achieve the desired quality.

For example, the first cost and the second cost include an amount of data and/or distortion. Optimization by considering rate (amount of data generated by the encoder) and the distortion of the reconstructed picture enables to flexibly meet requirements of various applications or users.

Alternatively, or in addition, the data to be encoded is a motion vector field. The above described methods are readily applicable for compressing the motion vector field such as dense optical flow or a subsampled optical flow. Application of these methods may provide for efficient (in terms of rate and distortion or other criteria) coding of the motion vectors and enable reducing the bitstream size of the encoded picture or video data further.

In some embodiments, the prediction information include a reference index and/or prediction mode. In addition or alternatively to the motion vector field, further information related to prediction may be processed. Reference index and prediction mode may be, similarly to motion vector field, is correlated with the content of the picture and thus, encoding of the feature map elements having different resolution can improve efficiency.

For example, the amount of data includes the amount of data required to transmit the data related to the selected layer. In this way, the overhead generated by providing the information related to a layer different from the output layer can be accounted for during the optimization.

In addition or alternatively, the distortion is calculated by comparing a reconstructed picture with a target picture. Such end-to-end quality comparison ensures that the distortion in the reconstructed image is properly considered. Accordingly, the optimization may be capable of selecting the coding approach in an efficient way and meet the quality requirements posed by the application or user in a more accurate manner.

In any of the above examples, for instance, the processing comprises additional convolutional layers between the cascaded layers with different resolutions.

Provision of such additional layer in the cascaded layer network enables to introduce additional processing such as various types of filtering in order to enhance the quality or efficiency of the coding.

According to an exemplary implementation, the method or the processing circuitry of the apparatus according to preceding embodiments comprise: in the downsampling by a layer, downsampling the input feature map using a first filter to obtain a first feature map, and downsampling the input feature map using a second filter to obtain a second feature map, determining a third cost resulting from reconstructing a portion of a reconstructed picture using the first feature map, determining a fourth cost resulting from reconstructing the portion of reconstructed picture using the second feature map; in the selecting, selecting the first feature map if the third cost is smaller than the fourth cost.

Application of different downsampling filters may help to adapt to different characteristics of the content.

For example, the shape of the first filter and the second filter may be any out of square, horizontal oriented rectangular and vertical oriented rectangular.

These filters are still of a simple shape, but may provide additional improvement in terms of adapting to the object borders.

The method steps or steps performed by the processing circuitry of an apparatus may further comprise obtaining a mask, wherein the mask is comprised of flags, wherein the mask represents an arbitrary filter shape, and wherein one of the first and the second filter has the arbitrary filter shape.

This provides a flexibility to design filter of any shape.

The method steps or steps performed by the processing circuitry of an apparatus may further comprise processing in the different layers data relating to the same picture segmented into blocks with different block sizes and shapes, and wherein the selecting comprises: selecting the layer based on the cost calculated for a predetermined set of coding modes.

In some exemplary implementations, the processing comprises for at least one layer determining the cost for different sets of coding modes and selecting one of the set of coding modes based on the determined cost.

Application of the optimization to coding modes may enable for efficient rate distortion optimization and thus to improved coding efficiency.

For instance, the indication of data related to the selected layer includes the selected set of coding modes.

According to an aspect of the present disclosure, a computer program stored on a non-transitory medium comprising code which when executed on one or more processors performed steps of any of methods presented above.

According to an aspect of the present disclosure, a device is provided for encoding an image or video including a processing circuitry which is configured to perform the method according to any of the examples presented above.

Any of the above mentioned apparatuses may be embodied on an integrated chip. The invention can be implemented in hardware (HW) and/or software (SW). Moreover, HW-based implementations may be combined with SW-based implementations.

It is noted that the present disclosure is not limited to a particular framework. Moreover, the present disclosure is not restricted to image or video compression, and may be applied to object detection, image generation, and recognition systems as well.

For the purpose of clarity, any one of the foregoing embodiments may be combined with any one or more of the other foregoing embodiments to create a new embodiment within the scope of the present disclosure.

Embodiment Regarding Decoding Using Feature Map Elements

According to an embodiment, a method is provided for decoding data for picture or video processing from a bitstream, the method comprising: obtaining, from the bitstream, two or more sets of feature map elements, wherein each set of feature map elements relates to a feature map, inputting each of the two or more sets of feature map elements respectively into two or more feature map processing layers out of a plurality of cascaded layers, and obtaining said decoded data for picture or video processing as a result of the processing by the plurality of cascaded layers.

Such method may provide an improved efficiency, as it enables data from different layers to be used in decoding, and thus features or other kind of layer related information to be parsed from the bitstream.

For example, in each of the two or more feature map processing layers a feature map is processed, wherein the feature maps processed respectively in the two or more feature map processing layers differ in resolution.

In some embodiments, the processing of the feature map in two or more feature map processing layers includes upsampling.

Application of upsampling enables on one hand reduction of complexity of processing (since the first layers have lower resolution) and, on the other hand, may also reduce data to be provided within the bitstream and parsed at the decoder. Still further, layers processing different resolutions may in this way focus on features at different scales. Accordingly, networks processing pictures (still or video) may operate efficiently.

In an exemplary implementation, the method further comprises the steps of obtaining, from the bitstream, segmentation information related to the two or more layers, wherein the obtaining the feature map elements from the bitstream is based on the segmentation information; and the inputting of the sets of feature map elements respectively into two or more feature map processing layers is based on the segmentation information.

Using the segmentation information may provide for an efficient decoding of the feature map from different layers so that each area of the original resolution (to be reconstructed) may be covered only by information from one layer. Although this is not to limit the invention which may, in some cases, also provide overlap between layers for a particular area in the feature map (data).For example, the plurality of cascaded layers further comprises a plurality of segmentation information processing layers, and the method further comprises processing of the segmentation information in the plurality of segmentation information processing layers. Such approach provides the possibility to control parsing of feature elements from different layers.

In some embodiments, the processing of the segmentation information in at least one of the plurality of segmentation information processing layers includes upsampling. Hierarchic structure of segmentation information may provide small amount of side information to be inserted into the bitstream, thus increasing efficiency and/or processing time.

For instance, said upsampling of the segmentation information and/or said upsampling of the feature map comprises a nearest neighbor upsampling. Nearest neighbor upsampling has a low computational complexity and may be implemented easily. Still, it is efficient, especially for logic indications such as flags.

In some embodiments and examples, said upsampling of the segmentation information and/or said upsampling of the feature map comprises a transposed convolution. Usage of convolution may help in reducing blocking artifacts and may enable for trainable solutions, in which the upsampling filter is selectable.

In an exemplary implementation, the obtaining of the feature map elements from the bitstream is based on a processed segmentation information processed by at least one of the plurality of segmentation information processing layers.

In an exemplary implementation, the inputting of each of the two or more sets of feature map elements respectively into two or more feature map processing layers is based on a processed segmentation information processed by at least one of the plurality of segmentation information processing layers.

According to an embodiment, the obtained segmentation information is represented by a set of syntax elements, wherein the position of an element in the set of syntax elements indicates to which feature map element position the syntax element relates, wherein the processing of the feature map comprises, for each of the syntax elements: when the syntax element has a first value, parsing from the bitstream an element of the feature map on the position indicated by the position of the syntax element within the bitstream, and otherwise, bypassing parsing from the bitstream the element of the feature map on the position indicated by the position of the syntax element within the bitstream.

Such relation between the segmentation information and feature map information enables coding of frequency information efficiently and parsing both in the layered structure by considering different resolutions.

For example, the processing of the feature map by each layer $1<j<N$ of the plurality of N feature map processing layers further comprises: parsing segmentation information elements for the j-th feature map processing layer from the bitstream; and obtaining the feature map processed by a preceding feature map processing layer, parsing, from the bitstream, a feature map element and associating the parsed feature map element with the obtained feature map, wherein the position of the feature map element in the processed feature map is indicated by the parsed segmentation information element, and segmentation information processed by preceding segmentation information processing layer.

In particular, when the syntax element has a first value, parsing from the bitstream an element of the feature map, and bypassing parsing from the bitstream the element of the feature map, when the syntax element has a second value or segmentation information processed by a preceding segmentation information processing layer has a first value.

For instance, the syntax element parsed from the bitstream representing the segmentation information is a binary flag. In particular, the processed segmentation information is represented by a set of binary flags.

Provision of binary flags enables an efficient coding. At the decoder side, processing of logical flags may be performed with low complexity.

According to an exemplary implementation, the upsampling of the segmentation information in each segmentation information processing layer j further comprises: for each p-th position in the obtained feature map that is indicated by the inputted segmentation information, and determining as upsampled segmentation information, indications for feature map positions that are included in the same area in the reconstructed picture as the p-th position.

For example, the data for picture or video processing comprise a motion vector field. As the dense optical flow or motion vector field with a resolution similar to the resolution of a picture is desirable to model the motion, the present layered structure is readily applicable and efficient to reconstruct such motion information. With the layer processing and signaling, a good tradeoff between the rate and the distortion may be achieved.

For example, the data for picture or video processing comprise picture data and/or prediction residual data and/or prediction information data. The present disclosure may be used for various different parameters. However, picture data and/or prediction residual data and/or prediction information data may still have some redundancy in spatial domain and the layered approach described herein may provide for efficient decoding from the bitstream using different resolutions.

In some embodiments and examples, a filter is used in the upsampling of the feature map, and the shape of the filter is any one of square, horizontal rectangular and vertical rectangular.

Application of different upsampling filters may help to adapt to different characteristics of the content. For example, a filter is used in the upsampling of the feature map, and the inputting information from the bitstream further comprises obtaining information indicating the filter shape and/or filter coefficients from the bitstream.

Correspondingly, the decoder may provide a better reconstruction quality based on the information from the encoder conveyed in the bitstream.

For example, said information indicating the filter shape indicate a mask comprised of flags, and the mask represents the filter shape in that a flag having a third value indicates a non-zero filter coefficient and the flag having a fourth value different from the third value indicates a zero filter coefficient. This provides a flexibility to design filter of any shape.

For instance, the plurality of cascaded layers comprises convolutional layers without upsampling between layers with different resolutions.

Provision of such additional layer in the cascaded layer network enables to introduce additional processing such as various types of filtering in order to enhance the quality or efficiency of the coding.

According to an embodiment, a computer program product is provided, stored on a non-transitory medium, which when executed on one or more processors performs the method according to any of the above mentioned methods.

According to an embodiment, a device is provided for decoding an image or video including a processing circuitry which is configured to perform the method according to any of the above described embodiments and examples.

According to an aspect, a device is provided for decoding data for picture or video processing from a bitstream, the device comprising: an obtaining unit configured to obtain from the bitstream two or more sets of feature map elements, wherein each set of feature map elements relates to a feature map, an inputting unit configured to input each of the two or more sets of feature map elements respectively into two or more feature map processing layers out of a plurality of cascaded layers, a decoded data obtaining unit configured to obtain said decoded data for picture or video processing as a result of the processing by the plurality of cascaded layers.

Any of the above mentioned apparatuses may be embodied on an integrated chip. The invention can be implemented in hardware (HW) and/or software (SW). Moreover, HW-based implementations may be combined with SW-based implementations.

It is noted that the present disclosure is not limited to a particular framework. Moreover, the present disclosure is not restricted to image or video compression, and may be applied to object detection, image generation, and recognition systems as well.

Some Exemplary Implementations in Hardware and Software

Figure 35:
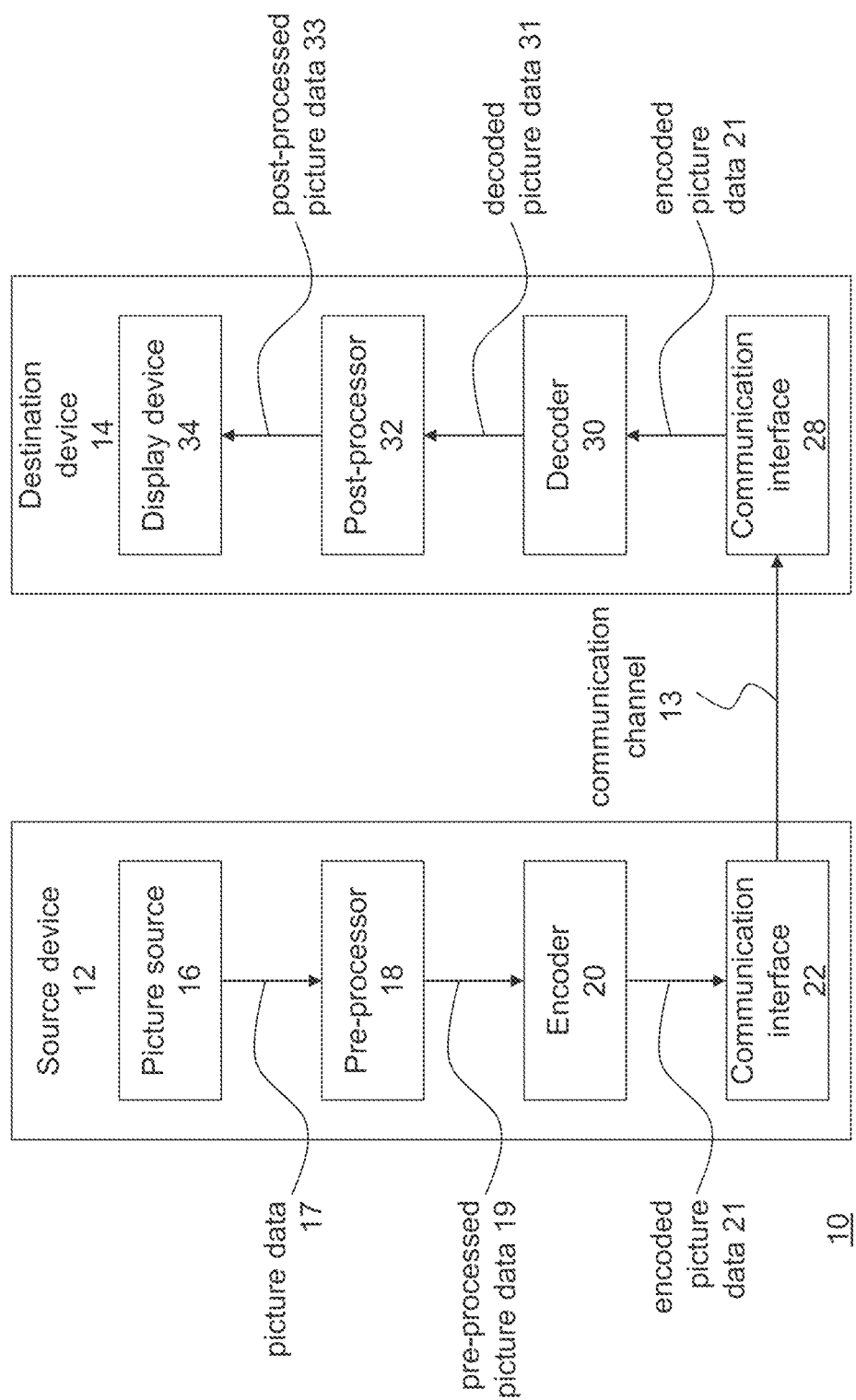
FIG. 35 is a block diagram showing an example of a video coding system configured to implement embodiments of the invention.

The corresponding system which may deploy the above-mentioned encoder-decoder processing chain is illustrated in FIG. 35. FIG. 35 is a schematic block diagram illustrating an example coding system, e.g. a video, image, audio, and/or other coding system (or short coding system) that may utilize techniques of this present application. Video encoder 20 (or short encoder 20) and video decoder 30 (or short decoder 30) of video coding system 10 represent examples of devices that may be configured to perform techniques in accordance with various examples described in the present application. For example, the video coding and decoding may employ neural network or in general a processing network such as those described in the above embodiments and examples.

As shown in FIG. 35, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component. It is noted that the pre-processing may also employ a neural network.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 35 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission. The decoder 30 is configured to receive the encoded picture data 21 and provide decoded picture data 31 or a decoded picture 31 (e.g., employing a neural network as described in the above mentioned embodiments and examples).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 35 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 35 may vary depending on the actual device and application.

Figure 36:
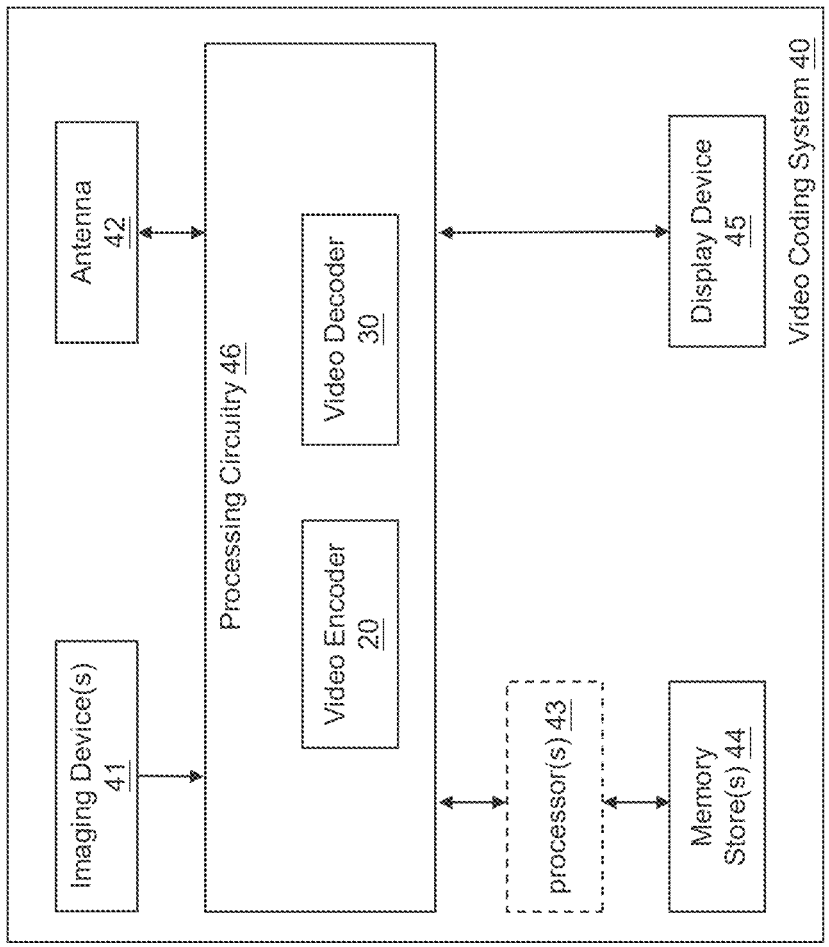
FIG. 36 is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules including the neural network. The decoder 30 may be implemented via processing circuitry 46 to embody the various modules as discussed in the above embodiments and examples. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 36.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 35 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 37:
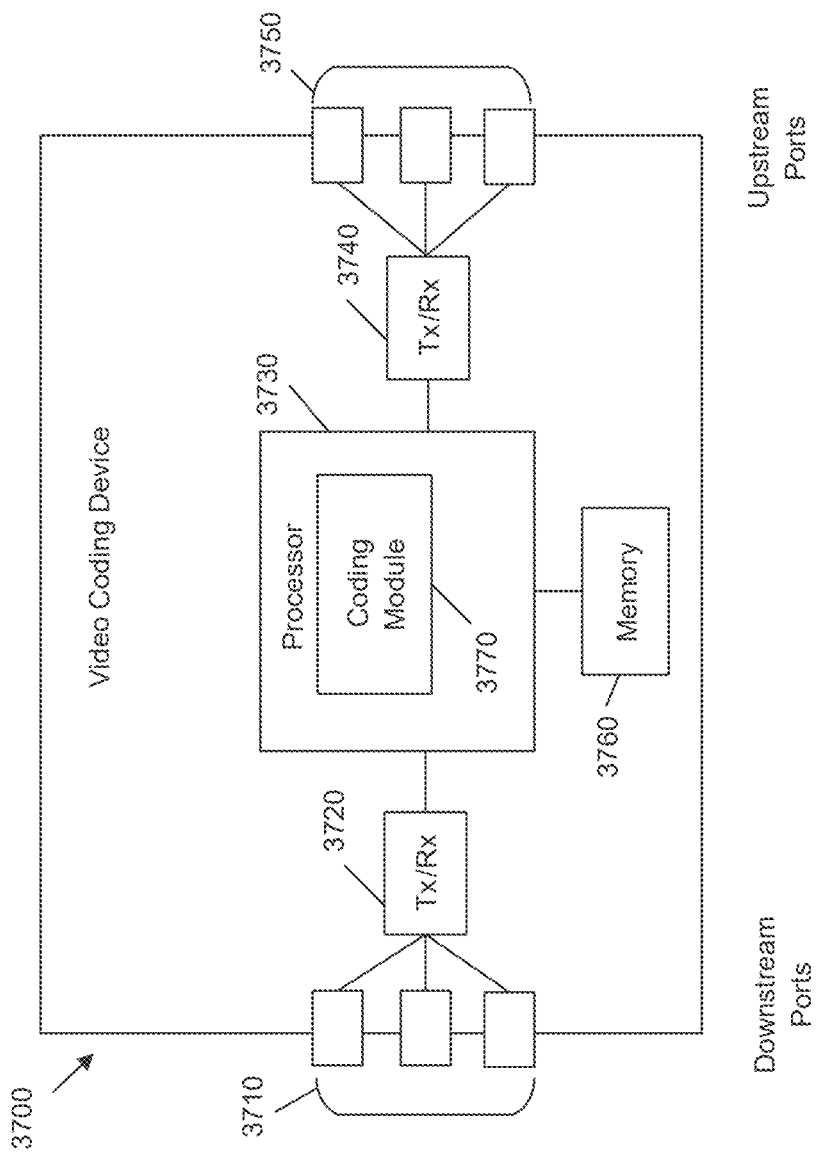
FIG. 37 is a block diagram illustrating an example of an encoding apparatus or a decoding apparatus.

FIG. 37 is a schematic diagram of a video coding device 3700 according to an embodiment of the disclosure. The video coding device 3700 is suitable for implementing the disclosed embodiments as described herein. In an embodiment, the video coding device 3700 may be a decoder such as video decoder 30 of FIG. 35 or an encoder such as video encoder 20 of FIG. 35.

The video coding device 3700 comprises ingress ports 3710 (or input ports 3710) and receiver units (Rx) 3720 for receiving data; a processor, logic unit, or central processing unit (CPU) 3730 to process the data; transmitter units (Tx) 3740 and egress ports 3750 (or output ports 3750) for transmitting the data; and a memory 3760 for storing the data. The video coding device 3700 may also comprise optical-to-electrical (OE) components and electrical-to-optical (EO) components coupled to the ingress ports 3710, the receiver units 3720, the transmitter units 3740, and the egress ports 3750 for egress or ingress of optical or electrical signals.

The processor 3730 is implemented by hardware and software. The processor 3730 may be implemented as one or more CPU chips, cores (e.g., as a multi-core processor), FPGAs, ASICs, and DSPs. The processor 3730 is in communication with the ingress ports 3710, receiver units 3720, transmitter units 3740, egress ports 3750, and memory 3760. The processor 3730 comprises a coding module 3770. The coding module 3770 implements the disclosed embodiments described above. For instance, the coding module 3770 implements, processes, prepares, or provides the various coding operations. The inclusion of the coding module 3770 therefore provides a substantial improvement to the functionality of the video coding device 3700 and effects a transformation of the video coding device 3700 to a different state. Alternatively, the coding module 3770 is implemented as instructions stored in the memory 3760 and executed by the processor 3730.

The memory 3760 may comprise one or more disks, tape drives, and solid-state drives and may be used as an overflow data storage device, to store programs when such programs are selected for execution, and to store instructions and data that are read during program execution. The memory 3760 may be, for example, volatile and/or non-volatile and may be a read-only memory (ROM), random access memory (RAM), ternary content-addressable memory (TCAM), and/or static random-access memory (SRAM).

Figure 38:
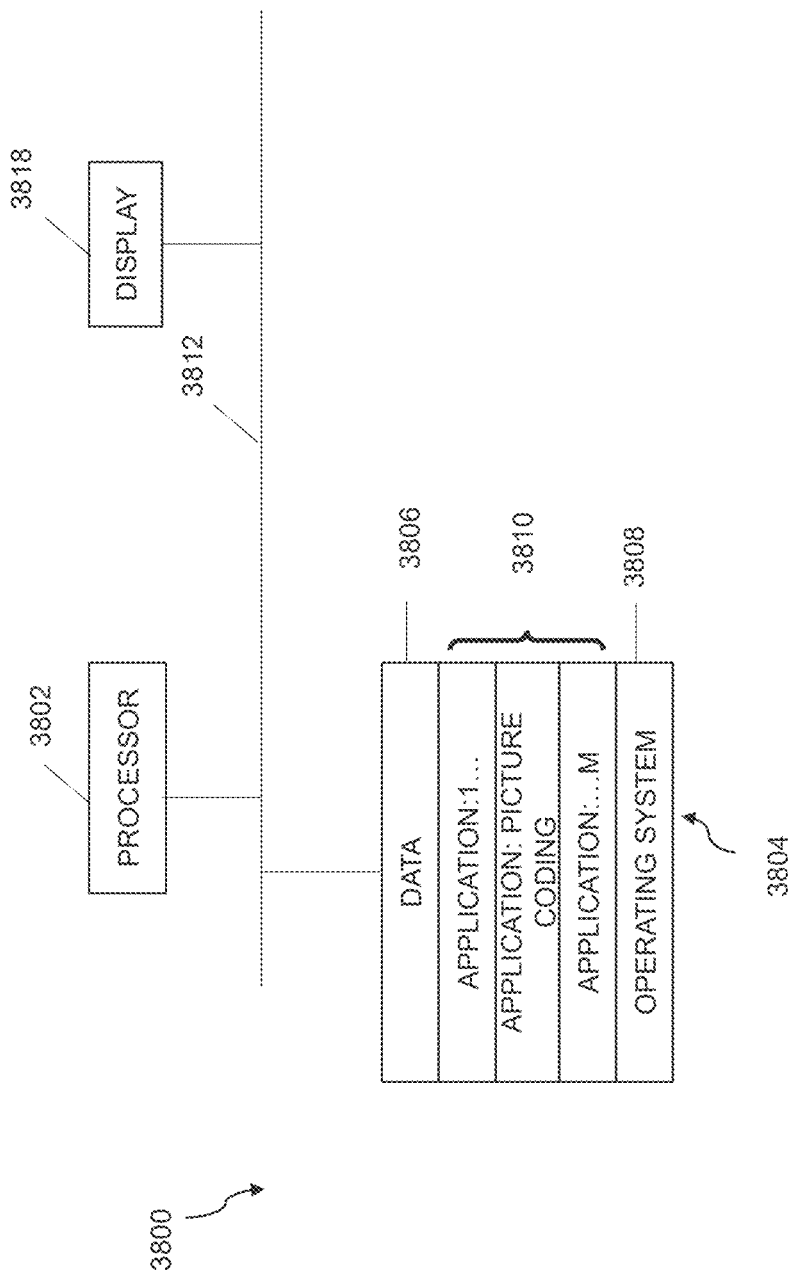
FIG. 38 is a block diagram illustrating another example of an encoding apparatus or a decoding apparatus.

FIG. 38 is a simplified block diagram of an apparatus 3800 that may be used as either or both of the source device 12 and the destination device 14 from FIG. 35 according to an exemplary embodiment.

A processor 3802 in the apparatus 3800 can be a central processing unit. Alternatively, the processor 3802 can be any other type of device, or multiple devices, capable of manipulating or processing information now-existing or hereafter developed. Although the disclosed implementations can be practiced with a single processor as shown, e.g., the processor 3802, advantages in speed and efficiency can be achieved using more than one processor.

A memory 3804 in the apparatus 1100 can be a read only memory (ROM) device or a random access memory (RAM) device in an implementation. Any other suitable type of storage device can be used as the memory 3804. The memory 3804 can include code and data 3806 that is accessed by the processor 3802 using a bus 3812. The memory 3804 can further include an operating system 3808 and application programs 3810, the application programs 3810 including at least one program that permits the processor 3802 to perform the methods described here. For example, the application programs 3810 can include applications 1 through N, which further include a picture coding (encoding or decoding) application that performs the methods described herein.

The apparatus 3800 can also include one or more output devices, such as a display 3818. The display 3818 may be, in one example, a touch sensitive display that combines a display with a touch sensitive element that is operable to sense touch inputs. The display 3818 can be coupled to the processor 3802 via the bus 3812.

Although depicted here as a single bus, the bus 3812 of the apparatus 3800 can be composed of multiple buses. Further, a secondary storage can be directly coupled to the other components of the apparatus 3800 or can be accessed via a network and can comprise a single integrated unit such as a memory card or multiple units such as multiple memory cards. The apparatus 3800 can thus be implemented in a wide variety of configurations.

Summarizing, the present disclosure relates to methods and apparatuses for encoding data for (still or video processing into a bitstream). In particular, the data are processed by a network which includes a plurality of cascaded layers. In the processing, feature maps are generated by the layers. The feature maps processed (output) by at least two different layers have different resolutions. In the processing, a layer is selected, out of the cascaded layers, which is different from the layer generating the feature map of the lowest resolution (e.g. latent space). The bitstream includes information related to the selected layer. With this approach, scalable processing which may operate on different resolutions is provided so that the bitstream may convey information relating to such different resolutions. Accordingly, the data may be efficiently coded within the bitstream, depending on the resolution which may vary depending on the content of the picture data coded.

The present disclosure further relates to methods and apparatuses for decoding data for (still or video processing into a bitstream). In particular, two or more sets of feature map elements are obtained from the bitstream. Each set of feature map elements relates to a feature map. Each of the two or more sets of feature map elements is then respectively inputted into two or more feature map processing layers out of a plurality of cascaded layers. The decoded data for picture or video processing is then obtained as a result of the processing by the plurality of cascaded layers. Accordingly, the data may be decoded from the bitstream in an efficient manner in the layered structure.

The present disclosure further relates to methods and apparatuses for decoding data for (still or video processing into a bitstream). Two or more sets of segmentation information elements are obtained from the bitstream. Then, each of the two or more sets of segmentation information elements are inputted respectively into two or more segmentation information processing layers out of a plurality of cascaded layers. In each of the two or more segmentation information processing layers, the respective sets of segmentation information are processed. The decoded data for picture or video processing are obtained based on the segmentation information processed by the plurality of cascaded layers. Accordingly, the data may be decoded from the bitstream in an efficient manner in the layered structure.

What is claimed is:

1. A method for decoding data for picture or video processing from a bitstream, the method comprising:
   obtaining, from the bitstream, two or more sets of segmentation information elements, wherein at least one set of segmentation information elements of the two or more sets of segmentation information elements are represented by a set of binary flags;
   inputting each of the two or more sets of segmentation information elements respectively into two or more segmentation information processing layers out of a plurality of cascaded layers;
   processing, in each of the two or more segmentation information processing layers, the respective sets of segmentation information, wherein the segmentation information processed respectively in the two or more segmentation information processing layers differ in resolution, wherein the processing of the segmentation information in the two or more segmentation information processing layers includes upsampling, wherein obtaining the decoded data for picture or video processing is based on the segmentation information processed by the plurality of cascaded layers for motion estimation, and wherein for each segmentation information processing layer j of the plurality of N segmentation information processing layers out of the plurality of cascaded layers:

the inputting comprises, inputting initial segmentation information from the bitstream if j=1, and otherwise inputting segmentation information processed by the (j−1)-th segmentation information processing layer; and outputting the processed segmentation information, wherein the processed segmentation information comprises an upsampled set of binary segmentation flags corresponding to the at least one set of segmentation information elements.

2. The method according to claim 1, wherein the obtaining of the sets of segmentation information elements is based on segmentation information processed by at least one segmentation information processing layer out of the plurality of cascaded layers.

3. The method according to claim 1, wherein the inputting of the sets of segmentation information elements is based on the processed segmentation information outputted by at least one of the plurality of cascaded layers.

4. The method according to claim 1, wherein said upsampling of the segmentation information comprises a nearest neighbor upsampling.

5. The method according to claim 1, wherein said upsampling of the segmentation information comprises a transposed convolution.

6. The method according to claim 1, wherein the processing of the inputted segmentation information by each layer j<N of the plurality of N segmentation information processing layers further comprises:

parsing, from the bitstream, a segmentation information element and associating the parsed segmentation information element with the segmentation information outputted by a preceding layer, wherein the position of the parsed segmentation information element in the associated segmentation information is determined based on the segmentation information outputted by the preceding layer.

7. The method according to claim 6, wherein the amount of segmentation information elements parsed from the bitstream is determined based on segmentation information outputted by the preceding layer.

8. The method according to claim 1, wherein obtaining decoded data for picture or video processing comprises determining of at least one of:
intra- or inter-picture prediction mode;
picture reference index;
single-reference or multiple-reference prediction (including bi-prediction);
presence or absence prediction residual information;
quantization step size;
motion information prediction type;
length of the motion vector
motion vector resolution;
motion vector prediction index
motion vector difference size
motion vector difference resolution
motion interpolation filter
in-loop filter parameters
post-filter parameters;
based on segmentation information.

9. The method according to claim 1, further comprising:
obtaining, from the bitstream, sets of feature map elements and inputting the sets of feature map elements respectively into a feature map processing layer out of the plurality of layers based on the segmentation information processed by a segmentation information processing layer; and
obtaining the decoded data for picture or video processing based on a feature map processed by the plurality of cascaded layers.

10. The method according to claim 9, wherein at least one out of the plurality of cascaded layers is a segmentation information processing layer and a feature map processing layer.

11. The method according to claim 9, wherein, each layer out of the plurality of layers is either a segmentation information processing layer or a feature map processing layer.

12. A computer program product stored on a non-transitory medium, which when executed on one or more processors performs the method according to claim 1.

13. A device for decoding an Image or video including a processing circuitry which is configured to perform the method according to claim 1.

* * * * *